(12) United States Patent
Dorta-Quinones et al.

(10) Patent No.: US 12,470,304 B2
(45) Date of Patent: Nov. 11, 2025

(54) PHOTONIC COMMUNICATION PLATFORM AND RELATED CIRCUITS

(71) Applicant: Lightmatter, Inc., Boston, MA (US)

(72) Inventors: Carlos Dorta-Quinones, Medford, MA (US); Ryan Braid, Cambridge, MA (US); Anthony Kopa, Somerville, MA (US); Michael Gould, La Honda, CA (US); Nathaniel Bowman, Peoria, AZ (US); Karl C. Buckenmaier, Milford, MA (US); Joseph Stadolnik, III, Stow, MA (US); Shashank Gupta, Newton, MA (US); James Carr, Tewksbury, MA (US); Nicholas C. Harris, Boston, MA (US); Darius Bunandar, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 235 days.

(21) Appl. No.: 18/190,940

(22) Filed: Mar. 27, 2023

(65) Prior Publication Data
US 2023/0308188 A1  Sep. 28, 2023

Related U.S. Application Data

(60) Provisional application No. 63/428,003, filed on Nov. 25, 2022, provisional application No. 63/397,609, (Continued)

(51) Int. Cl.
*H04B 10/70* (2013.01)
*G02B 6/124* (2006.01)
(Continued)

(52) U.S. Cl.
CPC ............ *H04B 10/70* (2013.01); *G02B 6/124* (2013.01); *G02B 6/13* (2013.01); *G02B 6/4215* (2013.01);
(Continued)

(58) Field of Classification Search
CPC .. H04B 10/70; H04B 10/07953; H04B 10/40; H04B 10/50; H04B 10/803;
(Continued)

(56) References Cited

U.S. PATENT DOCUMENTS 5,416,861 A  5/1995  Koh et al.
5,771,323 A  6/1998  Trott
(Continued)

FOREIGN PATENT DOCUMENTS

EP  2 212 887 B1  4/2013
EP  3 159 721 A1  4/2017
(Continued)

OTHER PUBLICATIONS

Invitation to Pay Additional Fees dated Aug. 25, 2023, in connection with International Application No. PCT/US2023/065007.
(Continued)

*Primary Examiner* — Mohamed A. Wasel
(74) *Attorney, Agent, or Firm* — Wolf, Greenfield & Sacks, P.C.

(57) ABSTRACT

Photonic interposers that enable low-power, high-bandwidth inter-chip (e.g., board-level and/or rack-level) as well as intra-chip communication are described. Described herein are techniques, architectures and processes that improve upon the performance of conventional computers. Some embodiments provide photonic interposers that use photonic tiles, where each tile includes programmable photonic circuits that can be programmed based on the needs of a particular computer architecture. Some tiles are instantiations of a common template tile that are stitched together in a 1D or a 2D arrangement. Some embodiments described herein provide a programmable physical network designed to connect pairs of tiles together with photonic links.

16 Claims, 59 Drawing Sheets

Related U.S. Application Data filed on Aug. 12, 2022, provisional application No. 63/355,275, filed on Jun. 24, 2022, provisional application No. 63/332,518, filed on Apr. 19, 2022, provisional application No. 63/327,717, filed on Apr. 5, 2022, provisional application No. 63/325,113, filed on Mar. 29, 2022, provisional application No. 63/324,598, filed on Mar. 28, 2022.

(51) Int. Cl.
| | | |
|---|---|---|
| G02B 6/13 | (2006.01) | |
| G02B 6/42 | (2006.01) | |
| G02B 6/43 | (2006.01) | |
| H04B 10/079 | (2013.01) | |
| H04B 10/40 | (2013.01) | |
| H04B 10/50 | (2013.01) | |
| H04B 10/80 | (2013.01) | |
| H04J 14/02 | (2006.01) | |

(52) U.S. Cl.
CPC .............. *G02B 6/4249* (2013.01); *G02B 6/43* (2013.01); *H04B 10/07953* (2013.01); *H04B 10/40* (2013.01); *H04B 10/50* (2013.01); *H04B 10/803* (2013.01); *H04B 10/808* (2013.01); *H04J 14/0212* (2013.01)

(58) Field of Classification Search
CPC ........ H04B 10/808; G02B 6/124; G02B 6/13; G02B 6/4215; G02B 6/4249; G02B 6/43; H04J 14/0212
See application file for complete search history.

(56) References Cited

U.S. PATENT DOCUMENTS

| | | | |
|---|---|---|---|
| 5,930,429 | A | 7/1999 | Trott |
| 6,202,165 | B1 | 3/2001 | Pine |
| 6,477,285 | B1 | 11/2002 | Shanley |
| 7,251,386 | B1 | 7/2007 | Dickinson et al. |
| 7,310,459 | B1 | 12/2007 | Rahman |
| 7,894,699 | B2 | 2/2011 | Beausoleil |
| 8,450,186 | B2 | 5/2013 | Rong et al. |
| 9,325,419 | B1* | 4/2016 | Kato .................. H04B 10/506 |
| 9,671,572 | B2 | 6/2017 | Decker et al. |
| 9,922,887 | B2 | 3/2018 | Vermeulen et al. |
| 10,847,467 | B2 | 11/2020 | Collins et al. |
| 11,036,002 | B2 | 6/2021 | Harris et al. |
| 11,754,783 | B2 | 9/2023 | Harris et al. |
| 11,860,413 | B2 | 1/2024 | Harris et al. |
| 2002/0028045 | A1 | 3/2002 | Yoshimura et al. |
| 2004/0258408 | A1 | 12/2004 | Ramaswami et al. |
| 2005/0224946 | A1 | 10/2005 | Dutta |
| 2007/0280585 | A1 | 12/2007 | Warashina et al. |
| 2008/0044128 | A1 | 2/2008 | Kish, Jr. et al. |
| 2008/0089640 | A1 | 4/2008 | Beausoleil |
| 2009/0103345 | A1 | 4/2009 | Mclaren et al. |
| 2009/0103855 | A1 | 4/2009 | Binkert et al. |
| 2010/0054671 | A1 | 3/2010 | Ban et al. |
| 2011/0052120 | A1 | 3/2011 | Tan et al. |
| 2011/0073989 | A1 | 3/2011 | Rong et al. |
| 2011/0128790 | A1 | 6/2011 | Sarin et al. |
| 2011/0269456 | A1 | 11/2011 | Krishnaswamy et al. |
| 2012/0149148 | A1 | 6/2012 | Dallesasse et al. |
| 2012/0177381 | A1 | 7/2012 | Dobbelaere et al. |
| 2012/0203695 | A1 | 8/2012 | Morgan et al. |
| 2013/0051725 | A1 | 2/2013 | Shinoda et al. |
| 2013/0071121 | A1 | 3/2013 | Sharapov et al. |
| 2013/0156366 | A1 | 6/2013 | Raj et al. |
| 2013/0209112 | A1 | 8/2013 | Witzens |
| 2013/0243429 | A1 | 9/2013 | Whelihan et al. |
| 2013/0292840 | A1 | 11/2013 | Shoemaker et al. |
| 2013/0308893 | A1 | 11/2013 | Zuffada et al. |
| 2014/0040698 | A1 | 2/2014 | Loh et al. |
| 2014/0043050 | A1 | 2/2014 | Stone et al. |
| 2014/0264400 | A1 | 9/2014 | Lipson et al. |
| 2014/0268980 | A1 | 9/2014 | Kim et al. |
| 2014/0294342 | A1 | 10/2014 | Offrein et al. |
| 2014/0300008 | A1 | 10/2014 | Duan et al. |
| 2014/0363124 | A1 | 12/2014 | Pelley et al. |
| 2014/0363172 | A1 | 12/2014 | Pelley et al. |
| 2015/0381273 | A1 | 12/2015 | Gloeckner et al. |
| 2016/0085038 | A1 | 3/2016 | Decker et al. |
| 2016/0181322 | A1 | 6/2016 | Mazed et al. |
| 2016/0191188 | A1 | 6/2016 | Butler |
| 2016/0216445 | A1 | 7/2016 | Thacker et al. |
| 2016/0252688 | A1 | 9/2016 | Barwicz et al. |
| 2017/0108655 | A1 | 4/2017 | Zarbock et al. |
| 2017/0160474 | A1 | 6/2017 | Mahmoodian et al. |
| 2017/0194309 | A1 | 7/2017 | Evans et al. |
| 2018/0045885 | A1 | 2/2018 | Canali et al. |
| 2018/0210241 | A1* | 7/2018 | Seyedi .................. G02F 1/0147 |
| 2019/0162901 | A1 | 5/2019 | Yu et al. |
| 2019/0189603 | A1 | 6/2019 | Wang et al. |
| 2019/0285815 | A1* | 9/2019 | Sugiyama .............. G02B 6/125 |
| 2019/0310433 | A1 | 10/2019 | Yoo et al. |
| 2019/0335252 | A1 | 10/2019 | Ryan |
| 2019/0363797 | A1 | 11/2019 | Peterson et al. |
| 2020/0006304 | A1 | 1/2020 | Chang et al. |
| 2020/0111720 | A1 | 4/2020 | Wan et al. |
| 2020/0284981 | A1 | 9/2020 | Harris et al. |
| 2021/0096311 | A1 | 4/2021 | Yu et al. |
| 2021/0103199 | A1* | 4/2021 | Wu ........................ G01S 7/4818 |
| 2021/0118853 | A1 | 4/2021 | Harris et al. |
| 2021/0202562 | A1 | 7/2021 | Chang et al. |
| 2021/0215897 | A1 | 7/2021 | Epitaux et al. |
| 2021/0278590 | A1 | 9/2021 | Harris et al. |
| 2021/0375829 | A1 | 12/2021 | Or-Bach et al. |
| 2022/0109075 | A1 | 4/2022 | Byrd et al. |
| 2022/0148627 | A1 | 5/2022 | Meade et al. |
| 2023/0085268 | A1 | 3/2023 | Harris et al. |
| 2023/0114842 | A1 | 4/2023 | Harris et al. |
| 2023/0114847 | A1 | 4/2023 | Harris et al. |
| 2023/0308188 | A1 | 9/2023 | Dorta-Quinones et al. |
| 2023/0314711 | A1 | 10/2023 | Eslampour et al. |
| 2023/0358957 | A1 | 11/2023 | Harris et al. |
| 2023/0400632 | A1 | 12/2023 | Harris et al. |
| 2023/0408764 | A1 | 12/2023 | Harris et al. |

FOREIGN PATENT DOCUMENTS

| | | |
|---|---|---|
| JP | H07-98463 A | 4/1995 |
| JP | 2005-502127 A | 1/2005 |
| JP | 2011-501238 A | 1/2011 |
| JP | 2011-503760 A | 1/2011 |
| JP | 2015-062027 A | 4/2015 |
| JP | 2018-506072 A | 3/2018 |
| JP | 2018-093007 A | 6/2018 |
| JP | 2018-195723 A | 12/2018 |
| KR | 20100095515 A | 8/2010 |
| TW | 508834 B | 11/2002 |
| WO | 2011/143548 A2 | 11/2011 |
| WO | 2016/008771 A1 | 1/2016 |
| WO | WO 2019/132970 A1 | 7/2019 |

OTHER PUBLICATIONS

International Search Report and Written Opinion mailed Nov. 29, 2023, in connection with International Application No. PCT/US23/65007.

Singapore Search Report and Written Opinion dated Dec. 1, 2023, in connection with Singapore Application No. 11202108868T.

Orcutt et al., Open foundry platform for high-performance electronic-photonic integration. Optics Express. May 21, 2012;20(11).11 Pages.

Bell, Shane et al., TILE64—Processor: A 64-Core SoC with Mesh Interconnect, 2008 IEEE. International Solid-State Circuits Conference—Digest of Technical Papers, 200802, pp. 1-3, DOI:10.1109/ISSCC.2008.4523070.

International Search Report and Written Opinion mailed Jan. 18, 2023, in connection with International Application No. PCT/US2022/046379.

(56) References Cited

OTHER PUBLICATIONS

International Search Report and Written Opinion mailed Jan. 26, 2023, in connection with International Application No. PCT/US2022/043209.

International Search Report and Written Opinion for International Application No. PCT/US2020/021209, mailed Jul. 6, 2020.

International Preliminary Report on Patentability for International Application No. PCT/US2020/021209, mailed Sep. 16, 2021.

Invitation to Pay Additional Fees for International Application No. PCT/US2020/021209 mailed May 1, 2020.

Invitation to Pay Additional Fees mailed Nov. 7, 2022, in connection with International Application No. PCT/US2022/043209.

Extended European Search Report dated Nov. 4, 2022, in connection with European Application No. 20766814.6.

Beausoleil et al., Nanoelectronic and nanophotonic interconnect. Proceedings of the IEEE. Feb. 2008;96(2):230-47. doi:10.1109/JPROC.2007.911057.

Fujikata et al., LSI on-chip optical interconnection with Si nanophotonics. Extended Abstracts of the 2007 International Conference on Solid State Devices and Materials. 2007. pp 276-277.

Grigalunas, Tell Me—What Is Wafer Dicing? Eastern States Components, LLC. Sep. 26, 2017. 2 pages. URL:https://www.escomponents.com/blog/2017/9/26/tell-me-what-is-wafer-dicing [retrieved Jul. 13, 2020].

Udipi et al., Combining memory and a controller with photonics through 3D-stacking to enable scalable and energy-efficient systems. 38th Annual International Symposium on Comupter Architecture (ISCA). Jun. 8, 2011;425-436.

Wada, Electronics and Photonics Convergence on Si CMOS Platform. Proc. of SPIE. 2004;5357:16-24.

Young et al., Optical technology for energy efficient I/O in high performance computing. IEEE Communications Magazine. Oct. 2010;48:184-91.

International Search Report and Written Opinion dated Feb. 28, 2024, in connection with International Application No. PCT/US23/80883.

Extended European Search Report dated Feb. 19, 2024, in connection with European Application No. 21750009.9.

U.S. Appl. No. 17/313,415, filed May 6, 2021, Harris et al.
U.S. Appl. No. 18/070,889, filed Nov. 29, 2022, Harris et al.
U.S. Appl. No. 17/964,337, filed Oct. 12, 2022, Harris et al.
U.S. Appl. No. 18/190,926, filed Mar. 27, 2023, Eslampour.
U.S. Appl. No. 18/190,931, filed Mar. 27, 2023, Tymchenko.
U.S. Appl. No. 18/190,941, filed Mar. 27, 2023, Dorta-Quinones.
PCT/US2022/046379, Jan. 18, 2023, International Search Report and Written Opinion.
PCT/US2022/043209, Jan. 26, 2023, International Search Report and Written Opinion.
PCT/US2020/021209, Jul. 6, 2020, International Search Report and Written Opinion.
PCT/US2020/021209, Sep. 16, 2021, International Report on Patentability.
PCT/US2020/021209, May 1, 2020, Invitation to Pay Additional Fees.
PCT/US2022/043209, Nov. 7, 2022, Invitation to Pay Additional Fees.
EP 20766814.6, Nov. 4, 2022, Extended European Search Report.

* cited by examiner

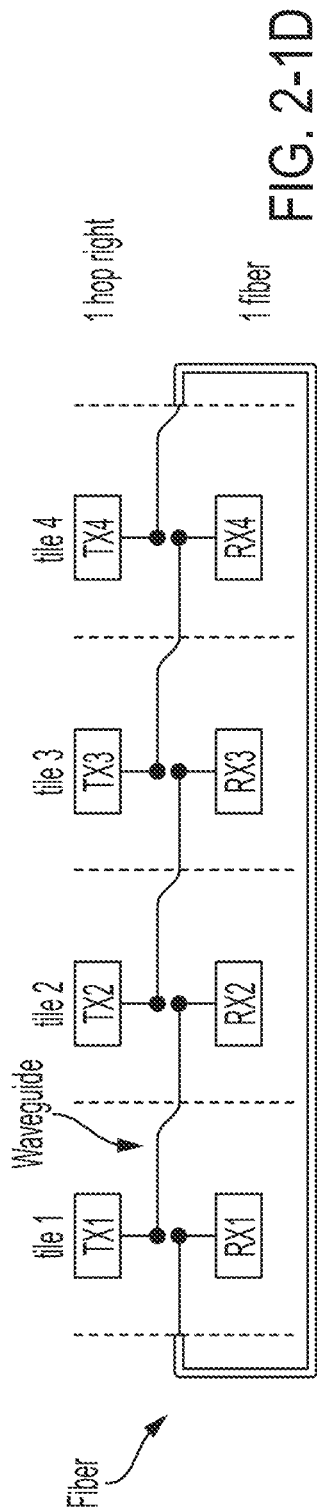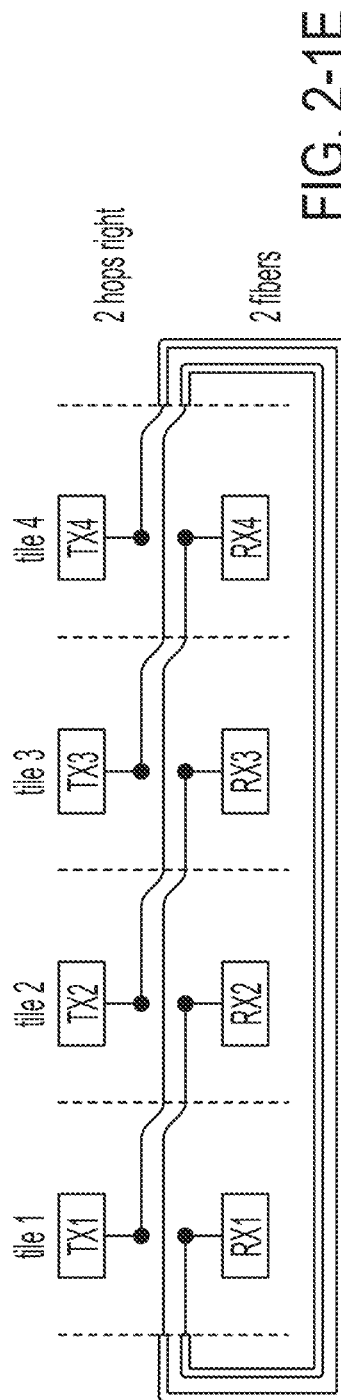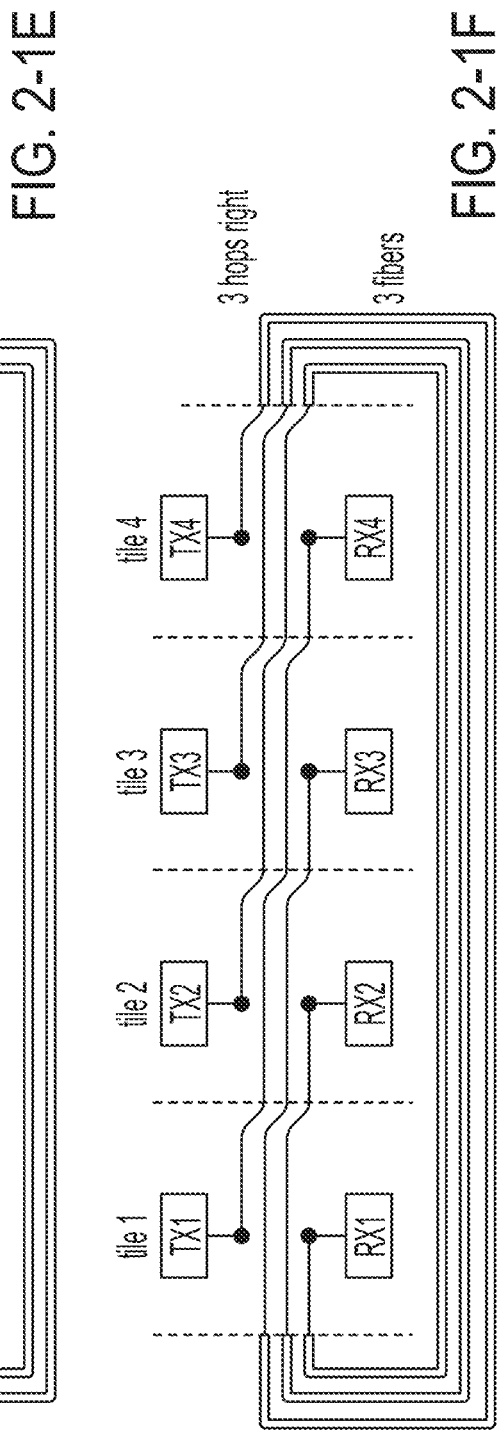

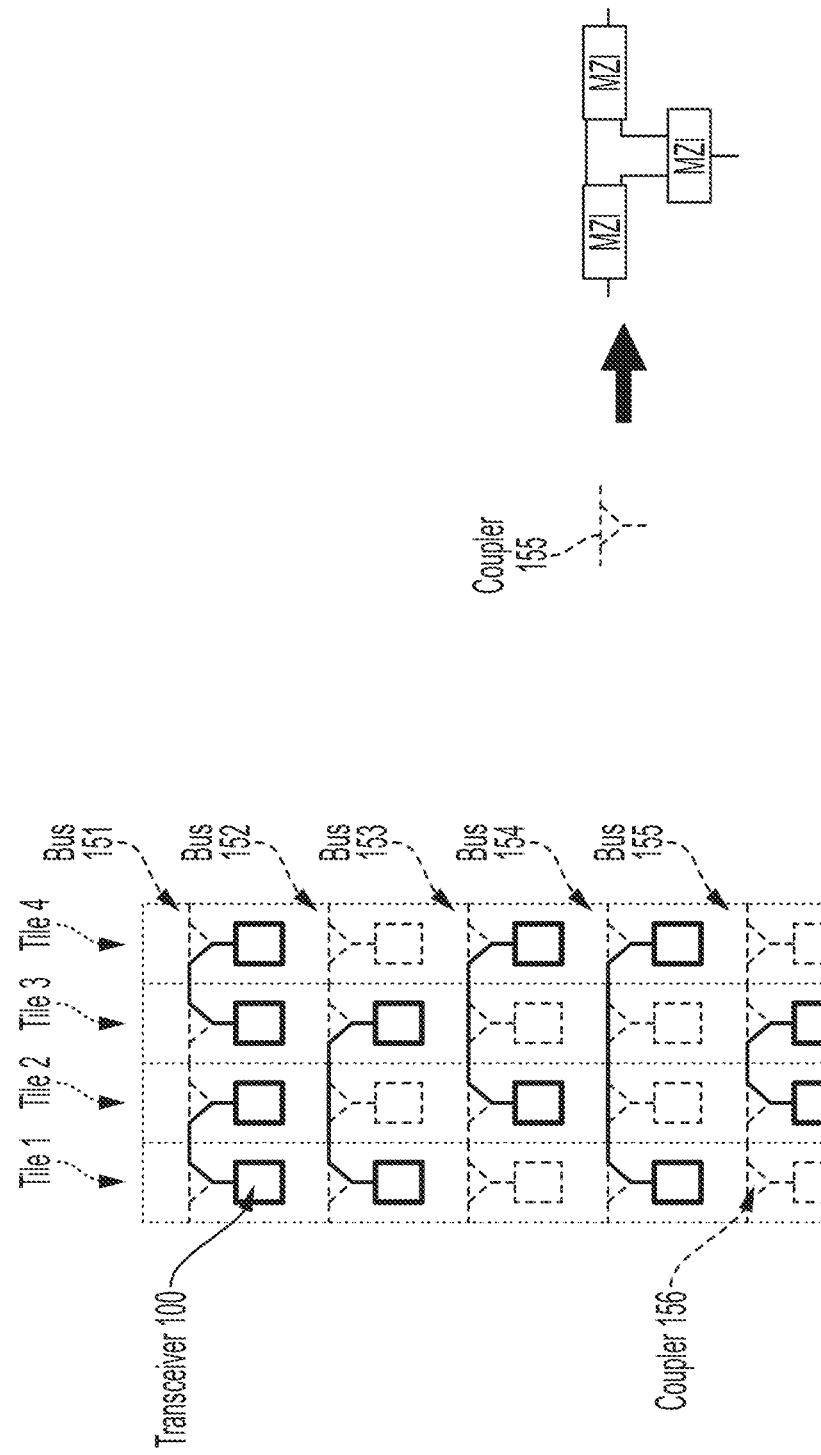

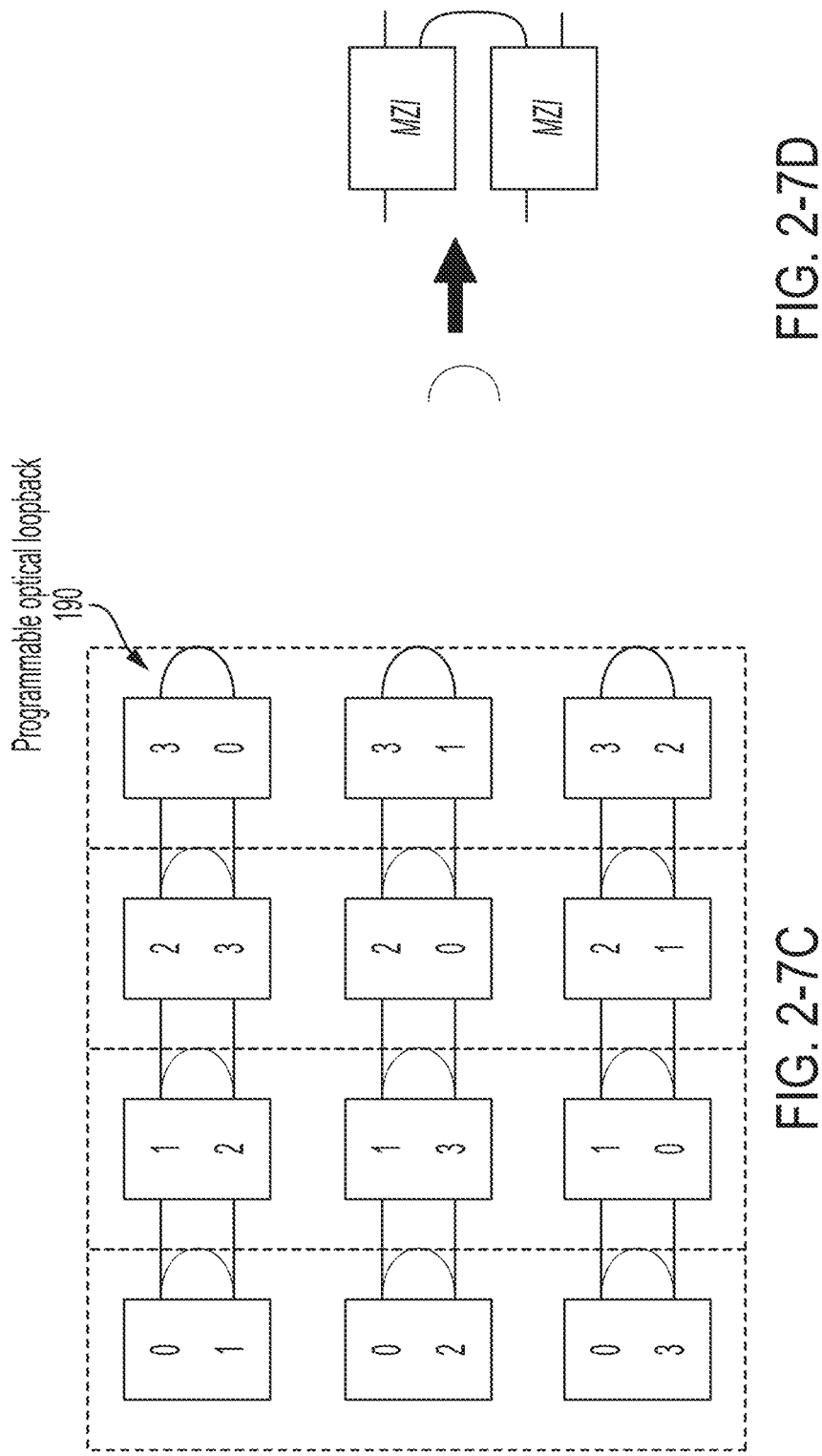

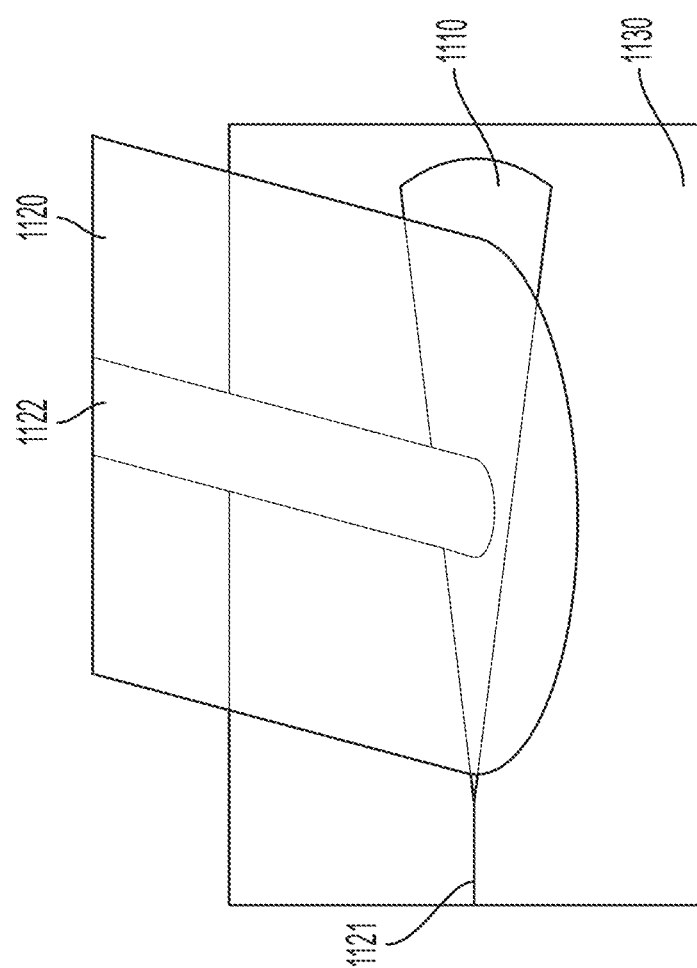

ND RELATED CIRCUITS

PHOTONIC COMMUNICATION PLATFORM AND RELATED CIRCUITS

CROSS-REFERENCE TO RELATED APPLICATIONS

This Application claims the benefit of U.S. Provisional Application Ser. No. 63/324,598, filed on Mar. 28, 2022, entitled "PACKAGE ASSEMBLY FLOW AND MATERIALS," U.S. Provisional Application Ser. No. 63/325,113, filed on Mar. 29, 2022, entitled "PACKAGE ASSEMBLY FLOW AND MATERIALS," U.S. Provisional Application Ser. No. 63/332,518, filed on Apr. 19, 2022, entitled "PACKAGE ASSEMBLY FLOW AND MATERIALS," U.S. Provisional Application Ser. No. 63/327,717, filed on Apr. 5, 2022, entitled "METHOD FOR OPTICAL FIBER ATTACH ON 3D STACKED WAFER," U.S. Provisional Application Ser. No. 63/355,275, filed on Jun. 24, 2022, entitled "WAFER-SCALE HETEROGENEOUS COMPUTING SYSTEMS," U.S. Provisional Application Ser. No. 63/397,609, filed on Aug. 12, 2022, entitled "INCREASING THE YIELD OF FIBER ATTACH BY REDUNDANCY," and U.S. Provisional Application Ser. No. 63/428,003, filed on Nov. 25, 2022, entitled "PHOTONIC PROGRAMMABLE INTERCONNECT CONFIGURATIONS," each of which is hereby incorporated herein by reference in its entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are place in electrical communication with processors. Typically, these electrical communications are implemented as metal traces formed on the substrates on which the memories and the processors are disposed.

SUMMARY OF THE DISCLOSURE

Some embodiments relate to a photonic interposer comprising a plurality of photonics tiles that are instantiations of a template photonic tile, each of the plurality of photonics tiles comprising: a transceiver comprising a transmitter and a receiver; electrical connections, coupled to the transceiver, configured to permit electrical communication between the transceiver and an electronic chip when the electronic chip is attached to the photonic interposer in correspondence with the photonic tile; an optical distribution network comprising a first set of bus waveguides optically coupled to the transceiver, a second set of bus waveguides, and a plurality of programmable interconnections, each programmable interconnection being configured to selectively place a bus waveguide of the first set of bus waveguides in optical communication with a bus waveguide of the second set of bus waveguides, wherein each programmable interconnection comprises a waveguide crossing and an active coupler.

In some embodiments, the transceiver comprises a plurality of modulators, coupled to a first bus waveguide of the first set of bus waveguides, tuned at different wavelengths relative to one another; and a plurality of drop filters, coupled to a second bus waveguide of the first set of bus waveguides, tuned at different wavelengths relative to one another.

In some embodiments, the plurality of modulators are resonant modulators, and the plurality of drop filters are resonant drop filters.

In some embodiments, the transmitter is configured to transmit data along a first bus waveguide of the first set of bus waveguides either in a first direction or a second direction.

In some embodiments, each of the plurality of photonics tiles further comprises a 2×2 coupler coupling the transceiver to the first bus waveguide of the first set of bus waveguides.

In some embodiments, the 2×2 coupler comprises first, second, third and fourth terminals, wherein: the first terminal is coupled to an output of the transmitter, the second terminal is coupled to an input of the receiver, and the third and fourth terminals are coupled to the first bus waveguide of the first set of bus waveguides.

In some embodiments, each of the plurality of photonics tiles further comprises an interferometer having an input and first and second outputs, and a resonant filter, wherein:
 the transmitter is coupled to the input of the interferometer, and the first and second outputs of the interferometer are coupled to the resonant filter, and the resonant filter is coupled to the first bus waveguide of the first set of bus waveguides.

In some embodiments, each of the plurality of photonics tiles further comprises an interferometer having an output and first and second inputs, and a resonant filter, wherein the resonant filter is coupled to the first bus waveguide of the first set of bus waveguides, the first and second inputs of the interferometer are coupled to the resonant filter, and the receiver is coupled to the output of the interferometer.

In some embodiments, the waveguide crossing comprises a first waveguide patterned in a first waveguide layer, a second waveguide patterned in a second waveguide layer, and a third waveguide layer patterned in a third waveguide layer, wherein the second waveguide layer is between the first and third waveguide layers, and the first waveguide is evanescently coupled with the second waveguide and the second waveguide is evanescently coupled with the third waveguide.

In some embodiments, the first waveguide layer is made of silicon, and both the second and the third waveguide layers are made of silicon nitride.

In some embodiments, the active coupler comprises a first terminal coupled to a first additional active coupler, a second terminal coupled to a first additional active coupler, and a third terminal coupled to the waveguide crossing.

In some embodiments, the active coupler comprises first and second Mach Zehnder interferometers (MZI), wherein the first terminal corresponds to a first output of the first MZI, the second terminal corresponds to a second output of the first MZI, and the third terminal corresponds to an output of the second MZI, In some embodiments, the bus waveguides of the second set of bus waveguides traverse multiple photonic tiles.

Some embodiments relate to a photonic interposer comprising a plurality of photonics tiles that are instantiations of a template photonic tile, the plurality of photonic tiles including first, second, third and fourth photonic tiles, each of the plurality of photonics tiles comprising: a first transceiver; and electrical connections, coupled to the first transceiver, configured to permit electrical communication between the first transceiver and an electronic chip when the electronic chip is attached to the photonic interposer in correspondence with the photonic tile; first and second bus waveguides each traversing the first and second photonic tiles; third and fourth bus waveguides each traversing the third and fourth photonic tiles; and first and second fibers, wherein: the first fiber, the first bus waveguide and the fourth bus waveguide place the first transceiver of the first photonic tile in optical communication with the first transceiver of the fourth photonic tile, and the second fiber, the second bus waveguide and the third bus waveguide place the first transceiver of the second photonic tile in optical communication with the first transceiver of the third photonic tile.

In some embodiments, each of the plurality of photonics tiles further comprises a second transceiver, wherein the second transceiver of the first photonic tile is in optical communication with the second transceiver of the second photonic tile.

In some embodiments, the second transceiver of the third photonic tile is in optical communication with the second transceiver of the fourth photonic tile.

In some embodiments, the photonic interposer further comprises a third fiber, wherein the third fiber, the first bus waveguide and the fourth bus waveguide place the first transceiver of the first photonic tile in further optical communication with the first transceiver of the fourth photonic tile.

In some embodiments, the first fiber, the third fiber, the first bus waveguide, the fourth bus waveguide, the first transceiver of the first photonic tile and the first transceiver of the fourth photonic tile form a closed loop.

In some embodiments, the photonic interposer further comprises a fourth fiber, wherein the fourth fiber, the second bus waveguide and the third bus waveguide place the first transceiver of the second photonic tile in further optical communication with the first transceiver of the third photonic tile.

In some embodiments, the second fiber, the fourth fiber, the second bus waveguide, the third bus waveguide, the first transceiver of the second photonic tile and the first transceiver of the third photonic tile form a closed loop.

Some embodiments relate to A computing system comprising: a photonic interposer comprising a plurality of photonics tiles that are instantiations of a template photonic tile, first and second application-specific integrated circuits (ASICs) mounted on the photonic interposer, wherein the first ASIC is coupled with a first photonic tile of the plurality of photonic tiles and the second ASIC is coupled with a second photonic tile of the plurality of photonic tiles; a data path placing the first ASIC in communication with the second ASIC, the data path comprising: a first die-to-die (D2D) interface, embedded with the first ASIC, comprising of plurality of wires; a first plurality of SerDes coupled to the plurality of wires; a plurality of optical modulators, coupled with the plurality of SerDes, formed in the first photonic tile; a plurality of optical detectors, coupled with the plurality of optical modulators, formed in the second photonic tile; a second plurality of SerDes coupled to the plurality of optical detectors; and a second D2D interface, embedded with the second ASIC.

In some embodiments, the plurality of optical detectors are coupled with the plurality of optical modulators via waveguides formed on the photonic interposer.

In some embodiments, the plurality of optical detectors are coupled with the plurality of optical modulators via fibers.

In some embodiments, the first and second D2D interfaces comprise Advanced Interface Bus (AIB) interfaces.

In some embodiments, the first and second D2D interfaces comprise Universal Chiplet Interconnect Express (UCIe) interfaces.

In some embodiments, the data path spans a length greater than 2.5 cm from the first D2D interface to the second D2D interface.

Some embodiments relate to a method for fabricating a photonic package, comprising: obtaining a photonic interposer having a grating coupler formed on a first surface of the photonic interposer; attaching an electronic chip to the first surface of the photonic interposer; encapsulating the electronic chip with an encapsulation material; placing a protective material on the first surface of the photonic interposer to cover the grating coupler; subsequent to placing the protective material, forming electronic connections on a second surface of the photonic interposer opposite the first surface; and subsequent to forming the electronic connections, removing the protective material from the first surface of the photonic interposer to expose the grating coupler to air.

In some embodiments, the method further comprises cleaning the first surface of the photonic interposer subsequent to removing the protective material from the first surface of the photonic interposer.

In some embodiments, the method further comprises attaching a fiber to the first surface of the photonic interposer subsequent to removing the protective material so that the fiber, when attached, is optically coupled to the grating coupler.

In some embodiments, the fiber is at a non-zero angle with respect to the first surface of the photonic interposer when the fiber is optically coupled to the grating coupler.

In some embodiments, attaching the electronic chip to the first surface of the photonic interposer is performed subsequent to placing the protective material on the first surface of the photonic interposer.

In some embodiments, the protective material comprises a photo-imagable dielectric.

In some embodiments, placing the protective material on the first surface of the photonic interposer is performed subsequent to attaching the electronic chip to the first surface of the photonic interposer.

In some embodiments, placing the protective material on the first surface of the photonic interposer is performed subsequent to encapsulating the electronic chip with the encapsulation material.

In some embodiments, the protective material comprises a glass lid with a releasable adhesive.

Some embodiments relate to a method for fabricating a photonic package, comprising: obtaining a photonic interposer having a grating coupler formed on a first surface of the photonic interposer; attaching an electronic chip to the first surface of the photonic interposer; encapsulating the electronic chip with an encapsulation material so that the encapsulation material leaves the grating coupler exposed to air; placing the photonic interposer on a carrier mount to cover the grating coupler; subsequent to placing photonic interposer on the carrier mount, forming electronic connections on a second surface of the photonic interposer opposite the first surface; and subsequent to forming the electronic connections, removing the carrier mount.

In some embodiments, encapsulating the electronic chip is performed subsequent to attaching the electronic chip to the first surface of the photonic interposer.

In some embodiments, the method further comprises separating the photonic interposer into a plurality of systems each comprising an electronic chip and a grating coupler subsequent to removing the carrier mount.

In some embodiments, the method further comprises attaching a fiber to the first surface of the photonic interposer subsequent to removing the protective material so that the fiber, when attached, is optically coupled to the grating coupler.

In some embodiments, the fiber is at a non-zero angle with respect to the first surface of the photonic interposer when the fiber is optically coupled to the grating coupler.

Some embodiments relate to a photonic package comprising: a photonic interposer; a first electronic chip disposed on the photonic interposer; a circuit board having a first surface and a second surface opposite the first surface, wherein the photonic interposer is coupled to the first surface of the circuit board; a voltage regulator module (VRM) coupled to the second surface of the circuit board; and a connection configured to provide an output voltage of the VRM to the first electronic chip, wherein the connection traverses the circuit board and the photonic interposer.

In some embodiments, the photonic package further comprises a substrate and a socket, wherein the photonic interposer is disposed on the substrate and the substrate is disposed on the socket.

In some embodiments, the connection further traverses the substrate and the socket.

In some embodiments, the photonic package further comprises a power bus configured to provide an input voltage to the voltage regulator module.

In some embodiments, the voltage regulator module receives the input voltage from the power bus and regulates the output voltage to the first electronic chip.

In some embodiments, the first electronic chip is in contact with the photonic interposer.

In some embodiments, the photonic package further comprises a lid covering the photonic interposer and a cold plate covering the lid, wherein the lid is in thermal contact with the first electronic chip.

Some embodiments relate a photonic device, comprising: a photonic circuit; a plurality of optical channels having a plurality of chip-to-fiber couplers and a plurality of waveguides coupled to respective chip-to-fiber couplers; an optical switch coupled between the plurality of optical channels and the optical circuit; and a controller configured to: determine information indicative of a performance associated with each of the plurality of optical channels; identify a subset of the plurality of optical channels using the information indicative of the performance associated with each of the plurality of optical channels; and control the optical switch to selectively couple the subset of the plurality of optical channels to the photonic circuit.

In some embodiments, the plurality of optical channels further comprise a plurality of photodetectors coupled to respective waveguides, and wherein determining the information indicative of the performance associated with each of the plurality of optical channels comprises determining an output of each of the plurality of photodetectors.

In some embodiments, the plurality of photodetectors are coupled to the respective waveguides via tap couplers.

In some embodiments, determining information indicative of the performance associated with each of the plurality of optical channels comprises determining a bit error rate (BER) associated with each of the plurality of optical channels.

In some embodiments, the photonic circuit comprises a plurality of tiles that are patterned in accordance with a template tile, wherein each tile comprises: a transmitter; a receiver; a network of programmable optical connections; and electrical connections configured for vertical die-to-die connection with an electronic chip, the electrical connections being coupled to the transmitter, the receiver and the network of programmable optical connections.

In some embodiments, identifying the subset of the plurality of optical channels using the information comprises identifying the subset of the plurality of optical channels exhibiting best performance among the optical channels.

In some embodiments, the chip-to-fiber couplers comprise edge couplers or grating couplers.

In some embodiments, the controller is further configured to control the photonic circuit to transmit data outside the photonic device using the subset of the plurality of optical channels selected by the optical switch.

Some embodiments relate to a method for transmitting data using a photonic device comprising an optical switch and a plurality of optical channels having a plurality of chip-to-fiber couplers and a plurality of waveguides coupled to respective chip-to-fiber couplers, the method comprising: determining information indicative of a performance associated with each of the plurality of optical channels; identifying a subset of the plurality of optical channels using the information indicative of the performance associated with each of the plurality of optical channels; controlling the optical switch to select the subset of the plurality of optical channels, and transmitting the data outside the photonic device using the subset of the plurality of optical channels selected by the optical switch.

In some embodiments, the plurality of optical channels further comprise a plurality of photodetectors coupled to respective waveguides, and wherein determining the information indicative of the performance associated with each of the plurality of optical channels comprises determining an output of each of the plurality of photodetectors.

In some embodiments, determining information indicative of the performance associated with each of the plurality of optical channels comprises determining a bit error rate (BER) associated with each of the plurality of optical channels.

In some embodiments, identifying the subset of the plurality of optical channels using the information comprises identifying the subset of the plurality of optical channels exhibiting best performance among the optical channels.

Some embodiments relate to a photonic interposer, comprising: a plurality of photonic tiles including a redundant tile, each photonic tile comprising: a transmitter; a receiver; a network of programmable optical connections; electrical connections configured for vertical die-to-die connection with an electronic chip, the electrical connections being coupled to the transmitter, the receiver and the network of programmable optical connections; a monitoring photodetector; and a controller configured to: determine information indicative of a performance of each of the plurality of photonic tiles using an output of the respective monitoring photodetector; identify, among the plurality of tiles, a defective tile using the information indicative of the performance of each of the plurality of photonic tiles; and functionally swap the defective tile with the redundant tile.

In some embodiments, functionally swap the defective tile with the redundant tile comprises redirecting, to the redundant tile, data directed to the defective tile.

In some embodiments, redirecting the data comprises programming a network of programmable photonic connections.

Some embodiments relate to a photonic interposer comprising: a bus waveguide; a plurality of photonic transmitters coupled to the bus waveguide; a plurality of photonic receivers coupled to the bus waveguide; and a controller configured to lock a first photonic transmitter of the plurality of photonic transmitters to a first photonic receiver of a plurality of photonic receivers by: dithering a photonic component of the first photonic transmitter at a first frequency; and dithering a photonic component of the first photonic receiver at the first frequency.

In some embodiments, each of the plurality of photonic transmitters comprises a resonant modulator and each of the plurality of photonic receivers comprises a resonant drop filter coupled to the bus waveguide, wherein: dithering the photonic component of the first photonic transmitter comprises dithering the resonant modulator of the first photonic transmitter, and dithering the photonic component of the first photonic receiver comprises dithering the resonant drop filter of the first photonic receiver.

In some embodiments, each of the plurality of photonic transmitters comprises a resonant add filter coupled to the bus waveguide and each of the plurality of photonic receivers comprises a resonant drop filter coupled to the bus waveguide, wherein: dithering the photonic component of the first photonic transmitter comprises dithering the resonant add filter of the first photonic transmitter, and dithering the photonic component of the first photonic receiver comprises dithering the resonant drop filter of the first photonic receiver.

In some embodiments, the first frequency is between 1 KHz and 1000 KHz.

In some embodiments, the photonic interposer further comprises a plurality of photonics tiles that are instantiations of a template photonic tile, each of the plurality of photonics tiles comprising a photonic transmitter of the plurality of photonic transmitters and a photonic receiver of the plurality of photonic receivers, wherein the bus waveguide traverses more than one photonic tile.

Some embodiments relate to a photonic transmitter comprising: a resonant modulator configured to modulate light received from a laser using input data; a Mach-Zehnder interferometer (MZI) coupled to the resonant modulator, the MZI having a first output and a second output; a resonant add filter coupled to a bus waveguide; and a controller configured to transmit the modulated light along the bus waveguide either in a first direction or in a second direction by selectively couple either the first output or the second output of the MZI to the resonant add filter.

In some embodiments, the photonic transmitter further comprises a heater thermally coupled to the resonant modulator and a first monitoring detector coupled to the first output of the MZI, wherein the controller is further configured to lock the resonant modulator to the laser by: applying a first ramped signal to the heater; and maximizing an output produced by the first monitoring detector.

In some embodiments, selectively couple either the first output or the second output of the MZI to the resonant add filter comprises: applying a second ramped signal to the MZI; and minimizing the output produced by the first monitoring detector.

In some embodiments, selectively couple either the first output or the second output of the MZI to the resonant add filter further comprises: applying a third ramped signal to the resonant add filter; and minimizing the output produced by a second monitoring detector coupled to the second output of the MZI.

In some embodiments, the resonant add filter comprises a second order filter.

Some embodiments relate to a photonic interposer comprising: first and second photonic tiles that are instantiations of a template photonic tile, each of the first and second photonics tiles comprising a transceiver and a receiver; an optical channel coupling the transmitter of the first photonic tile to the receiver of the second photonic tile; an encoder, coupled to the transmitter of the first photonic tile, configured to perform an Xb/Yb encoding scheme; a decoder, coupled to the receiver of the second photonic tile, configured to perform an Xb/Yb decoding scheme; and clock recovery circuitry configured to time the receiver of the second photonic tile using an output of the decoder.

In some embodiments, the photonic interposer further comprises a first local oscillator coupled to the encoder and a second local oscillator coupled to the decoder.

In some embodiments, the photonic interposer further comprises an equalizer coupled to the receiver of the second photonic tile, wherein the equalizer is configured to perform a linear combination of the output of the receiver of the second photonic tile.

In some embodiments, the equalizer is further configured to determine a characteristic of the optical channel during runtime, and is configured to adjust the number of taps associated with the equalizer based on the characteristic of the optical channel determined by the equalizer.

In some embodiments, the equalizer is further configured to determine a characteristic of the optical channel during runtime, and is configured to adjust coefficients associated with the equalizer based on the characteristic of the optical channel determined by the equalizer.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 1-2A illustrates a semiconductor wafer, in accordance with some embodiments.

FIG. 1-2B illustrates a set of photomasks, in accordance with some embodiments.

FIG. 1-2C illustrates an example photomask for forming optical waveguides, in accordance with some embodiments.

FIG. 1-2D illustrates the wafer of FIG. 1-2A patterned in accordance with the photomask set of FIG. 1-2B, in accordance with some embodiments.

FIG. 1-2E identifies photonic circuits formed on the patterned wafer of FIG. 1-2D, in accordance with some embodiments.

FIG. 1-3A illustrates an example tile of the patterned wafer of FIG. 1-2E, in accordance with some embodiments.

FIG. 1-3B illustrates a group of tiles of the type illustrated in FIG. 1-3A, in accordance with some embodiments.

FIG. 1-4A illustrates a group of tiles sharing the same pattern of metal traces, in accordance with some embodiments.

FIG. 1-4B illustrates a group of tiles sharing the same pattern of metal traces and creating a moisture barrier, in accordance with some embodiments.

FIG. 2-1A illustrates an architecture in which tiles of a photonic interposer are interconnected using static connections, in accordance with some embodiments.

FIG. 2-1B illustrates another architecture in which tiles of a photonic interposer are interconnected using static connections, in accordance with some embodiments.

FIG. 2-1C illustrates yet another architecture in which tiles of a photonic interposer are interconnected using static connections, in accordance with some embodiments.

FIG. 2-1D illustrates an architecture in which tiles of a photonic interposer are interconnected using static connections and a fiber, in accordance with some embodiments.

FIG. 2-1E illustrates an architecture in which tiles of a photonic interposer are interconnected using static connections and two fibers, in accordance with some embodiments.

FIG. 2-1F illustrates an architecture in which tiles of a photonic interposer are interconnected using static connections and three fibers, in accordance with some embodiments.

FIG. 2-1G illustrates another architecture in which tiles of a photonic interposer are interconnected using static connections and two fibers, in accordance with some embodiments.

FIG. 2-1H illustrates another architecture in which tiles of a photonic interposer are interconnected using static connections and four fibers, in accordance with some embodiments.

FIG. 2-1I illustrates yet another architecture in which tiles of a photonic interposer are interconnected using static connections and four fibers, in accordance with some embodiments.

FIG. 2-2A illustrates an architecture in which tiles of a photonic interposer are interconnected using programmable connections, in accordance with some embodiments.

FIG. 2-2B illustrates another architecture in which tiles of a photonic interposer are interconnected using programmable connections, in accordance with some embodiments.

FIG. 2-2C illustrates yet another architecture in which tiles of a photonic interposer are interconnected using programmable connections, in accordance with some embodiments.

FIG. 2-2D illustrates a tile of the photonic interposer illustrated in FIG. 2-2C in additional detail, in accordance with some embodiments.

FIG. 2-2E illustrates an example of a programmable photonic interconnection, in accordance with some embodiments.

FIG. 2-2F illustrates an example of an active coupler, in accordance with some embodiments.

FIG. 2-3A illustrates an architecture having bi-directional buses, in accordance with some embodiments.

FIG. 2-3B illustrates another architecture having bi-directional buses, in accordance with some embodiments.

FIG. 2-4A illustrates a photonic circuit for coupling a transmitter to a bi-directional bus, in accordance with some embodiments.

FIG. 2-4B illustrates a photonic circuit for coupling a receiver to a bi-directional bus, in accordance with some embodiments.

FIG. 2-5 illustrates an example of a waveguide crossing, in accordance with some embodiments.

FIG. 2-6A illustrates yet another architecture in which tiles of a photonic interposer are interconnected using programmable connections, in accordance with some embodiments.

FIG. 2-6B illustrates an example of the coupler used in the example of FIG. 2-6A, in accordance with some embodiments.

FIG. 2-6C illustrates an architecture in which tiles of a photonic interposer are interconnected using programmable connections, in accordance with some embodiments.

FIG. 2-6D illustrates another architecture in which tiles of a photonic interposer are interconnected using programmable connections and fibers, in accordance with some embodiments.

FIG. 2-7A illustrates an architecture using wavelength-based tile identification, in accordance with some embodiments.

FIG. 2-7B and FIG. 2-7B-1 illustrate another architecture using wavelength-based tile identification, in accordance with some embodiments.

FIG. 2-7C illustrates yet another architecture using wavelength-based tile identification, in accordance with some embodiments.

FIG. 2-7D illustrates an example of the programmable optical loopback used in the example of FIG. 2-7C, in accordance with some embodiments.

FIG. 2-8A illustrates an ASIC having an Advanced Interface Bus (AIB) interface, in accordance with some embodiments.

FIG. 2-8B illustrates ASIC-ASIC connections using an AIB interface and optical links, in accordance with some embodiments.

FIG. 2-8C illustrates a photonic interposer hosting multiple ASICs in communication with each other via AIB interfaces, in accordance with some embodiments.

FIG. 2-9A is a block diagram illustrating a pair of ASICs interconnected using a Bunch of Wires (WoR) interface, in accordance with some embodiments.

FIG. 2-9B is a block diagram illustrating another pair of ASICs interconnected using a Bunch of Wires (WoR) interface, in accordance with some embodiments.

FIG. 2-10A is a schematic diagram illustrating a computing network architecture using photonic interposers, in accordance with some embodiments.

FIG. 2-10B is a schematic diagram illustrating another computing network architecture using photonic interposers, in accordance with some embodiments.

FIG. 2-10C is a schematic diagram illustrating yet another computing network architecture using photonic interposers, in accordance with some embodiments.

FIG. 2-10D is a schematic diagram illustrating yet another computing network architecture using photonic interposers, in accordance with some embodiments.

FIG. 3-1 is a block diagram illustrating a plesiochronous clock distribution scheme, in accordance with some embodiments.

FIG. 3-2 is a block diagram illustrating a mesochronous clock distribution scheme, in accordance with some embodiments.

FIG. 3-3A is a block diagram illustrating a portion of a photonic interposer configured to perform equalization, in accordance with some embodiments.

FIG. 3-3B is a block diagram illustrating an example of an adaptive equalizer, in accordance with some embodiments.

FIGS. 3-4A through 3-4C illustrate a sequence for tuning a transmitter, in accordance with some embodiments.

FIGS. 3-5A and 3-5B illustrate a sequence for tuning a receiver, in accordance with some embodiments.

FIG. 3-6A illustrates a technique for locking a receiver to a particular transmitter using dithering, in accordance with some embodiments.

FIG. 3-6B illustrates an optical channel supporting communication between multiple transmitter-receiver pairs, in accordance with some embodiments.

FIG. 4-1A illustrates a photonic integrated circuit (PIC) having photonic circuits and multiple fiber attaches, in accordance with some embodiments.

FIG. 4-1B is a block diagram illustrating a pair of PICs connected to one another using k fibers, some of which are provided solely for redundancy, in accordance with some embodiments.

FIG. 4-1C illustrates the overall system yield (in %) of a system with 16 fiber attach sites as a function of the number of attaches on each site, in accordance with some embodiments.

FIG. 4-2 illustrates a photonic interposers having multiple tiles, one of which is provided for redundancy, in accordance with some embodiments.

FIG. 4-3 is a schematic diagram illustrating a power monitoring grid embedded in a photonic interposer, in accordance with some embodiments.

FIG. 5-1 is a schematic diagram illustrating a fiber coupled to a grating coupler, in accordance with some embodiments.

FIG. 5-2A is a schematic diagram illustrating a wafer patterned with multiple photonic circuits, in accordance with some embodiments.

FIG. 5-2B is a cross sectional view of the wafer of FIG. 5-2A, in accordance with some embodiments.

FIG. 5-3A is a side view of a photonic interposer, in accordance with some embodiments.

FIG. 5-3B is a side view of a packaged photonic interposer, in accordance with some embodiments.

FIG. 5-4 is a flowchart illustrating a process for fabricating a packaged photonic interposer, in accordance with some embodiments.

FIG. 5-5 is a flowchart illustrating another process for fabricating a packaged photonic interposer, in accordance with some embodiments.

FIG. 5-6 is a flowchart illustrating yet another process for fabricating a packaged photonic interposer, in accordance with some embodiments.

FIG. 5-7 is a schematic diagram illustrating a packaged photonic interposer including Voltage Regulator Modules (VRM), in accordance with some embodiments.

FIG. 5-8A is a block diagram illustrating a VRM, in accordance with some embodiments.

FIG. 5-8B is a schematic diagram illustrating a package where power delivery to electronic chips is performed using VRMs, in accordance with some embodiments.

DETAILED DESCRIPTION

I. Overview

Figure 1:
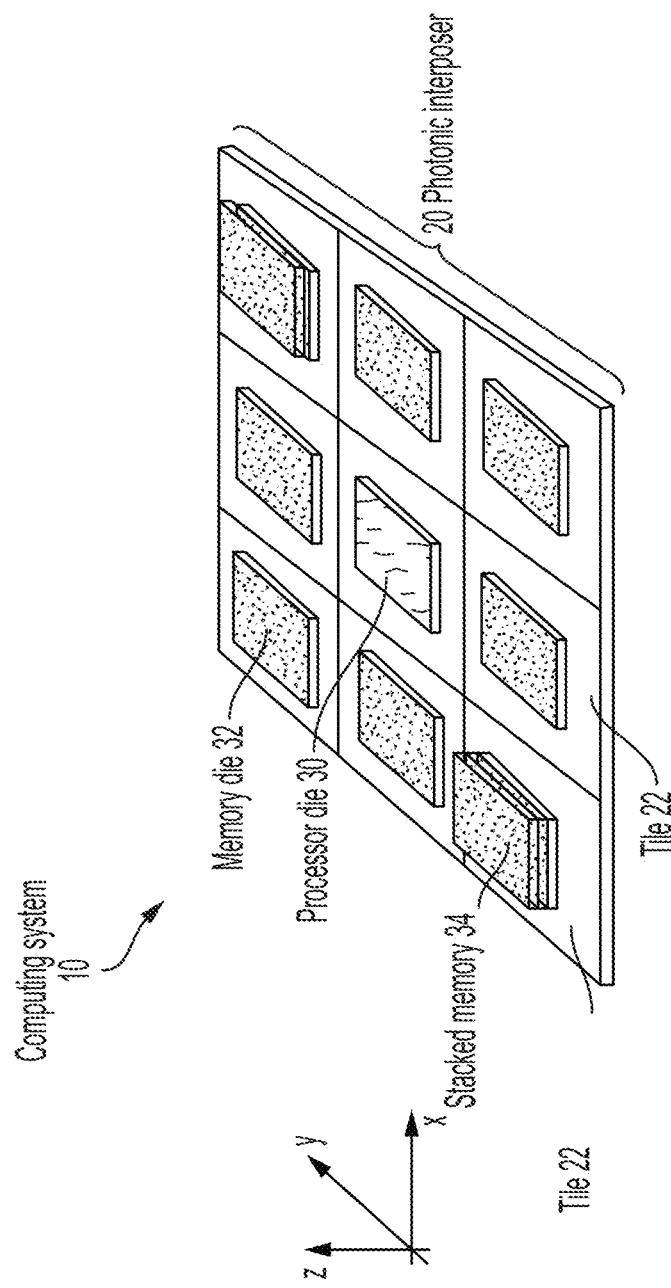
FIG. 1-1 illustrates a computing system based on a photonic interposer, in accordance with some embodiments.

The inventors have recognized and appreciated several challenges that limit the scalability of modern digital computing. First, current designs are power-limited. The trend in modern computing leads to ever increasing power consumption, which limits its scalability. Additionally, the power-hungry nature of modern chips lead to hot spots of high temperature, often in excess of 100° C. High temperature limits the performance of computers substantially. Second, modern computing architectures are bandwidth-limited. These architectures rely on multiple memory chips to provide the hundreds of gigabytes or terabytes of capacity required by modern applications. Unfortunately, providing connectivity among the several memory chips is challenging. The physical space available on a board or a rack to accommodate the interconnects is limited, thus limiting the overall bandwidth. Additionally, maintaining coherence and consistency across several memory chips (e.g., memory-memory and processor-memory) is difficult to achieve. Some architectures rely on Peripheral Component Interconnect (PCI), Compute Express Link (CXL), or Ethernet for inter-chip communication. However, these interfaces involve board-level or rack-level communication, which increases power usage and reduces bandwidth. Wafer-scale electrical communication has also been explored, but this approach suffers from reliability issues and power inefficiency.

The inventors have developed photonic interposers that enable low-power, high-bandwidth inter-chip (e.g., board-level and/or rack-level) as well as intra-chip communication. Described herein are techniques, architectures and processes that improve upon the performance of conventional multi-chip computers. Some embodiments provide photonic interposers that use "photonic modules" (also referred to herein as "photonic tiles" or simply as "tiles"). Each tile includes programmable photonic circuits that can be programmed based on the needs of a particular computer architecture. Some photonic interposers are arranged according to 1-dimensional schemes, such as in blocks of 3×1 tiles, in blocks of 5×1 tiles, in blocks of 10×1 modules, 20×1 tiles, etc. Some interposers are arranged according to 2-dimensional schemes, such as in blocks of 3×3 tiles, in blocks of 5×3 tiles, in blocks of 5×5 tiles, in blocks of 10×10 tiles, etc. More generally, photonic interposers enable any block of N×M tiles, where N≥1 and M≥1, and any topology, such as T-topologies, L-topologies, X-topologies, etc. Each tile can serve as a node of a computing system. At each node, there may be one or more digital processor chips, one or more analog accelerators, one or more photonic accelerators, one or more memory chips, one or more networking chips, or other devices.

The photonic interposers described herein are engineered in a way that limits manufacturing costs. These platforms may rely on the use of common photomask sets (or at least one common photomask) to fabricate multiple tiles. This approach reduces costs in two ways. First, it reduces additional costs that would otherwise be incurred in procuring several different photomask sets. Second, it enables fabrication of tiles using standard semiconductor foundries that require that the same photomask set (or at least one photomask) be used across an entire wafer. Designing tiles that share at least one photomask enables fabrication of many tiles on the same semiconductor wafer while leveraging standard, low-cost step-and-repeat manufacturing processes. Thus, in some embodiments, the tiles are instantiations (copies) of a common template tile that are stitched together in a 1D or a 2D arrangement. Some embodiments involve two template tiles, so that each tile of an interposer is formed either as an instantiation of the first template tile or an instantiation of the second template tile. Tiles of different templates may alternate in a checkerboard-like fashion, for example, such that each tile of the first type neighbors with tiles of the second type. Other arrangements are also possible.

In one example, a photonic interposer includes a 6×8 array of tiles, with each tile being an instantiation of a reticle shot in a step-and-repeat fabrication process. Each tile is 24.8 mm×32 mm in size, and can support heterogeneous technologies (e.g., general-purpose processors, GPUs, DRAM/HBM stacks, or custom accelerators). With a waveguide pitch of 3 μm, the photonic interposer can support well over 10,000 optical links escaping each tile.

Some embodiments described herein provide a programmable physical network designed to connect pairs of tiles together with photonic links. Communicating tiles do not need to be adjacent. For example, the physical network can be programmed such that the tile located in the top-left corner can directly communicate with the tile in the bottom-right corner without re-transmission at intermediary tiles. The network configuration time may be less than 10 µs, and communication between any two tiles—whether adjacent to each other or not—may have a transit latency of less than 5 ns. The photonic interposers described herein provide the flexibility to form various logical network topologies (from a low-radix high-diameter mesh topology to a high-radix low-diameter bus topology, for example). For example, a 4×4 photonic interposer can map an all-to-all logical network with dedicated channels between each tile pair, and this network can provide a bandwidth up to 14.4 Tbps per channel (between any two tiles) with a total bisection bandwidth up to 1851 Tbps. As another example, a photonic interposer can offer a bandwidth of up to 231 Tbps per channel for a 2-ary, 4-fly butterfly network.

The photonic interposers described herein enable an efficient heterogeneous architecture solution whereby chips designed from different technology nodes and performing different functions can be housed together onto a single wafer, while providing high-bandwidth and low-latency between chips via photonics links. Further, the photonic interposers described herein can address thermal constraints associated with large, power-hungry chips as a photonic interposer permits slicing of a large chip into multiple smaller chiplets. The photonic interposer can host these smaller chiplets and provide energy-efficient communication (similar to on-chip communication) between these smaller chiplets.

In a multi-chip system, each chip is typically connected to a dedicated main memory. Typically, data is shared between multiple chips using Remote Direct Memory Access (RDMA) (e.g., via Last Level Cache (LLC) or L2). The photonic interposers described herein can aggregate the main memory of all the chips to form a shared global main memory. This global shared main memory is accessible to all the chips via photonic links. For example, the LLC can be sliced out from each chip, and the LLCs can be moved next to a common global-shared main memory, while enabling low-latency and high-bandwidth communication between L2 and LLC pairs of each chip. Keeping all LLCs together enables coherency management across LLCs with low overhead. In some embodiments, the photonic interposers described herein can reduce the overhead of using standard cache coherence protocols (e.g., IV, MESI, and MOESI) across chips, for example by enabling efficient design of cache coherent non-uniform memory access machines (NUMA) architectures.

In traditional architectures, processor chips communicate with memory chips (e.g., DRAM and HBM) using high-speed electrical links. However, the capacitance associated with electrical links limit the available bandwidth and lead to power consumption. Recently, Co-Packaged Optics (CPO) has risen as a potential alternative to electrical links. CPO provides communication between processor and memory using optical fiber-based communication links. Unfortunately, CPO is not a scalable solution in that use of fiber links to support communication between one processor chip and multiple memory chips and vice versa remains challenging. By contrast, the photonic interposers described herein can host processor chips and memory chips on the same substrate, enabling high-bandwidth density communication. Leveraging their wafer-scale nature, photonic interposers can spread a processor across multiple tiles such that there is sufficient area for the processor components and the many memory controllers. This enables architectures that require multiple memory controllers on each processor chip, such as one processor chip to multiple memory chips and one memory chip to multiple processor chips.

The photonic interposers described herein can be used in a wide variety of applications, including in machine learning, privacy preservation and graph applications. Photonic interposers may be used to support communication between analog computing chips (e.g., photonic, memristors) and memory chips, communication between digital computing chips (e.g., processors, FPGAs, GPUs) and memory chips, networking chips, digital switch chips, and communication between digital computing chips and analog computing chips.

Current machine learning models involve large amounts of data (e.g., often in the hundreds of GBs to tens of TBs). Large amounts of memory are therefore required to store the model and the data. Current technologies do not provide sufficient memory in a single chip. The photonic interposers described herein provide a solution to integrate multiple memory chips into a single substrate while providing high-bandwidth, low-latency communication between memory chips and computing chips. The result is a reduction in the execution time, both during training and inference operation.

As data privacy is becoming a first order concern when designing systems, various privacy preserving computing approaches have been proposed. One of these approaches is homomorphic encryption (HE). Memory bandwidth and latency are the key bottlenecks in HE-based applications. The photonic interposers described herein can alleviate this problem by providing access to memory with high-bandwidth and low-latency.

Graph applications involve irregular access to memory. Moreover, graph applications involve small data granularity as they typically do not use all the data present in a cache line. The photonic interposers described herein can overcome this bottleneck by enabling efficient access to memory through high-bandwidth, low-latency photonic links.

Described herein are architectures, systems and processes that involve tile-based photonic interposers.

II. Tiled Photonic Interposers

FIG. 1-1 illustrates an example computing system based on a photonic interposer with nine tiles arranged in a 3×3 topology, in accordance with one example. Computing system 10 includes a photonic interposer 20 patterned with nine tiles 22. This photonic interposer supports one processor die (30) positioned in the middle of photonic interposer 20, and eight memory nodes surrounding the processor die. Some of the memory nodes include a single memory chip (see for example memory die 32). Other memory nodes include a stacked memory including multiple vertically-stacked memory dies (see for example stacked memory 34). The dies are stacked on top of the wafer that defines the tiles. A die can communicate with the underlying tile electronically (e.g., using through-silicon vias, copper pillars, microbumps, ball-grid arrays or other electrical interconnects) and/or optically (e.g., using grating couplers, prisms, lenses or other optical couplers).

As described in detail further below, tiles may be patterned with optical waveguides and optical distribution networks. The optical distribution network of a tile can selectively place the die of that particular node in optical communication with any other die of the computing system. For example, the optical distribution network of the tile positioned under processor die 30 may be reconfigured depending on the needs of the processor. At the beginning of a routine, the processor may need to access data stored in a first memory node. This read operation involves configuring the respective optical distribution networks to place the processor in optical communication with the first memory node. Later in the routine, the processor may need to write data into a second memory node. This write operation involves reconfiguring the optical distribution networks to place the processor in optical communication with the second memory node.

Manufacturing tiles in large scales can be costly. The photonic interposers described herein are engineered in a way that limits manufacturing costs. These platforms rely on the use of (a subset of) common photomask sets to fabricate multiple tiles. This approach reduces costs in two ways. First, it reduces additional costs that would otherwise be incurred in procuring several different photomask sets. Second, it enables fabrication of tiles using standard semiconductor foundries, some of which require that the same photomask set (or at least one photomask) be used across an entire wafer. Designing tiles that share at least one photomask enables fabrication of many tiles on the same semiconductor wafer while leveraging standard, low-cost step-and-repeat manufacturing processes.

The tiles described herein may be manufactured using microfabrication techniques, including for example complementary metal-oxide-semiconductor (CMOS) microfabrication techniques. Accordingly, some embodiments relate to silicon photonics-based optical interposers. Some particular microfabrication techniques involve step-and-repeat approaches—whereby stepper machines are used to pattern a semiconductor wafer with multiple copies of a template layout (e.g., a reticle). Each tile that results from the step-and-repeat approach may correspond to a reticle. FIGS. 1-2A through FIG. 1-2E illustrate microfabrication techniques for manufacturing tiles. FIGS. 1-3A and 1-3B illustrate examples of tiles patterned using these microfabrication techniques.

Figures 1, 2, 2A:
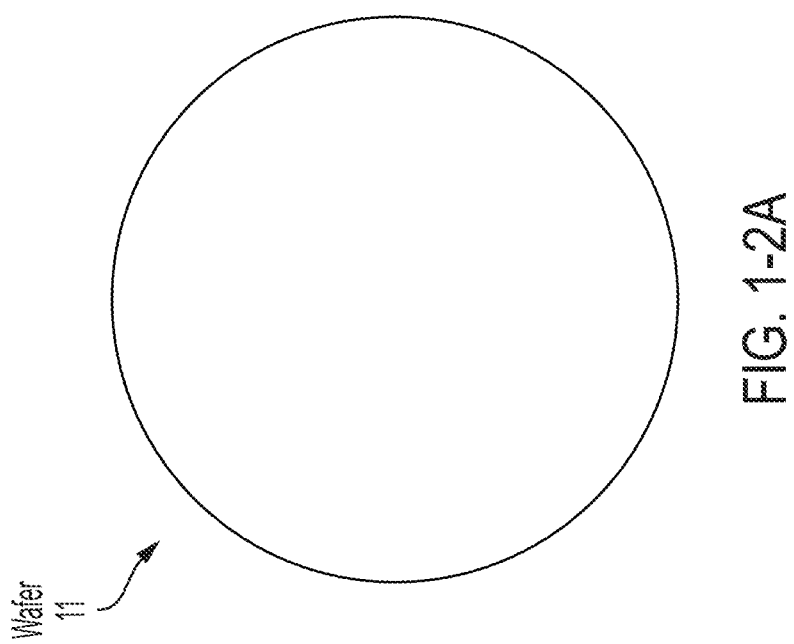

Referring first to FIG. 1-2A, this figure illustrates a semiconductor wafer 11. Wafer 11 may be made of any material. For example, wafer 11 may be made of (or otherwise include) silicon. In one example, wafer 11 is a silicon-on-insulator (SOI) wafer. In another example, wafer 11 is a bulk silicon wafer. Wafer 11 may have any size. For example, the diameter of wafer 11 may be 150 mm, 300 nm, or 450 mm, among other possible values. However, not all wafers need to have a circular shape.

Figures 1, 2, 2B:
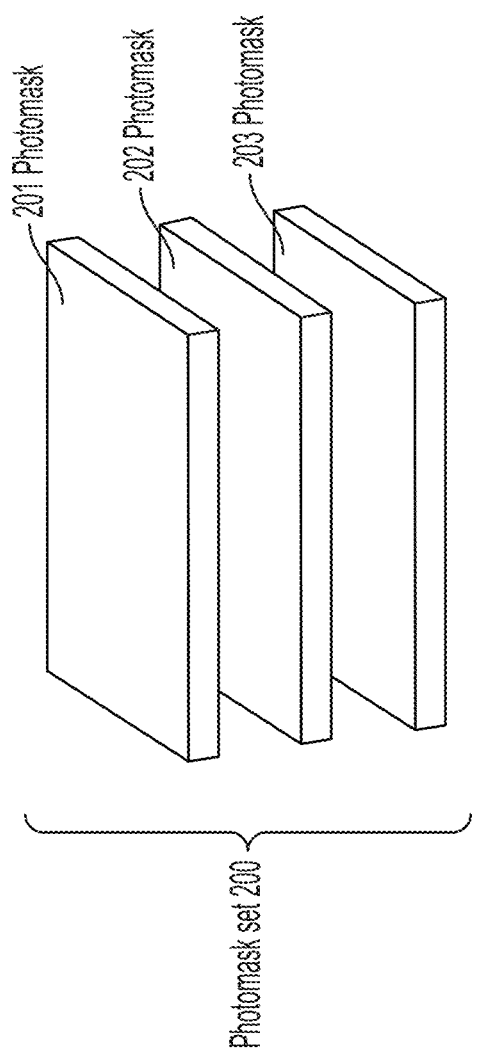

FIG. 1-2B illustrates a set of photomasks that may be used for patterning wafer 11 using photolithographic techniques. Photomask set 200 includes three photomasks (201, 202 and 203), though other sets may include more or fewer photomasks. Each photomask has a particular pattern of opaque and transparent regions. When the photomask is exposed to light, the opaque regions block the light, thereby preventing it from shining a wafer, and the transparent regions allow passage of the light. The result is that the pattern of the photomask is transferred to the wafer.

Figures 1, 2, 2C:
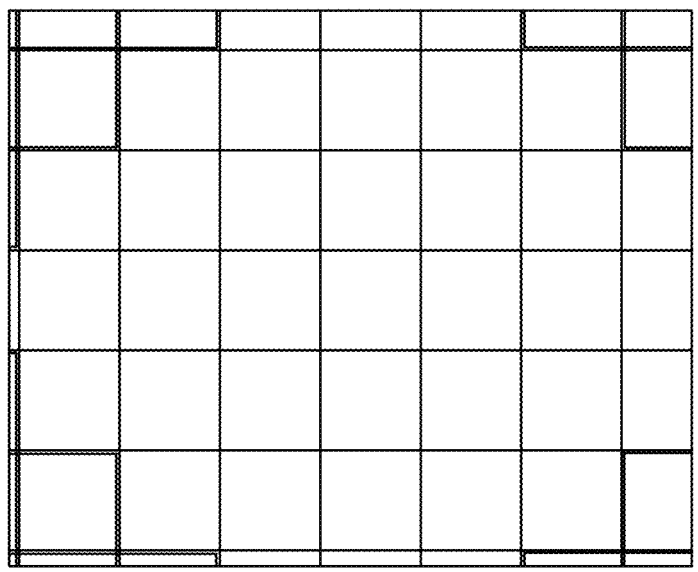

Each photomask may define a particular layer of a tile. One photomask may be used to define optical waveguides. When the wafer goes through an etch process, only the exposed regions (or only the non-exposed regions) are etched away, while the other regions remain un-etched. This photomask may be patterned to form a network of optical waveguides when the wafer is exposed to light through this photomask. FIG. 1-2C illustrates a portion of a photomask that may be used to form waveguides on wafer 11. The lines of photomask 201 represent opaque regions. The background of photomask 201 is transparent. Exposure of photomask 201 to light so that an image of the photomask is projected onto wafer 11 enables patterning of waveguides in the shapes of the opaque regions. In this particular example, the pattern of lines of the photomask results in a grid of waveguides.

Some tiles involve use of different levels of optical waveguides. In some such embodiments, photomask set 200 may include a dedicated photomask for each waveguide level. Another photomask may be used to define n-doped regions. When the wafer goes through an ion implantation or dopant diffusion process, only the exposed regions (or only the non-exposed regions) receive the doping, while the other regions remain undoped. Another photomask may be used to define p-doped regions using a similar process. Some tiles involve use of different doping concentrations. In some such embodiments, photomask set 200 may include a dedicated photomask for each doping concentration. In other embodiments, photomask set 200 may include photomasks used to define deposition of semiconductor materials other than silicon, such as germanium and/or other materials of the periodic table, such as Groups III or V. Another photomask may be used to define metal contacts. Another photomask may be used to define metal traces. Some tiles involve use of different levels of metal traces. In some such embodiments, photomask set 200 may include a dedicated photomask for each metal trace level.

In some embodiments, wafer 11 is patterned in a step-and-repeat fashion. When wafer 11 is processed in a stepper machine, the pattern of a photomask is exposed repeatedly across the surface of the wafer, in a grid. This process involves moving the wafer in steps back and forth and left and right under the lens of the stepper, and exposing the photomask at each step. The result is that wafer 11 is patterned with multiple copies of the pattern defined by a photomask. This operation may be repeated for each photomask (or at least some photomasks) of the set. Thus, in some embodiments, the tiles are copies of a common template tile that are stitched together in a 1D or a 2D arrangement. Other embodiments involve two template tiles, so that each tile of an interposer is formed either as an instantiation of the first template tile or an instantiation of the second template tile. Tiles of different templates may alternate in a checkerboard-like fashion, for example, such that each tile of the first type only neighbors with tiles of the second type. Other arrangements are also possible.

Figures 1, 2, 2D:
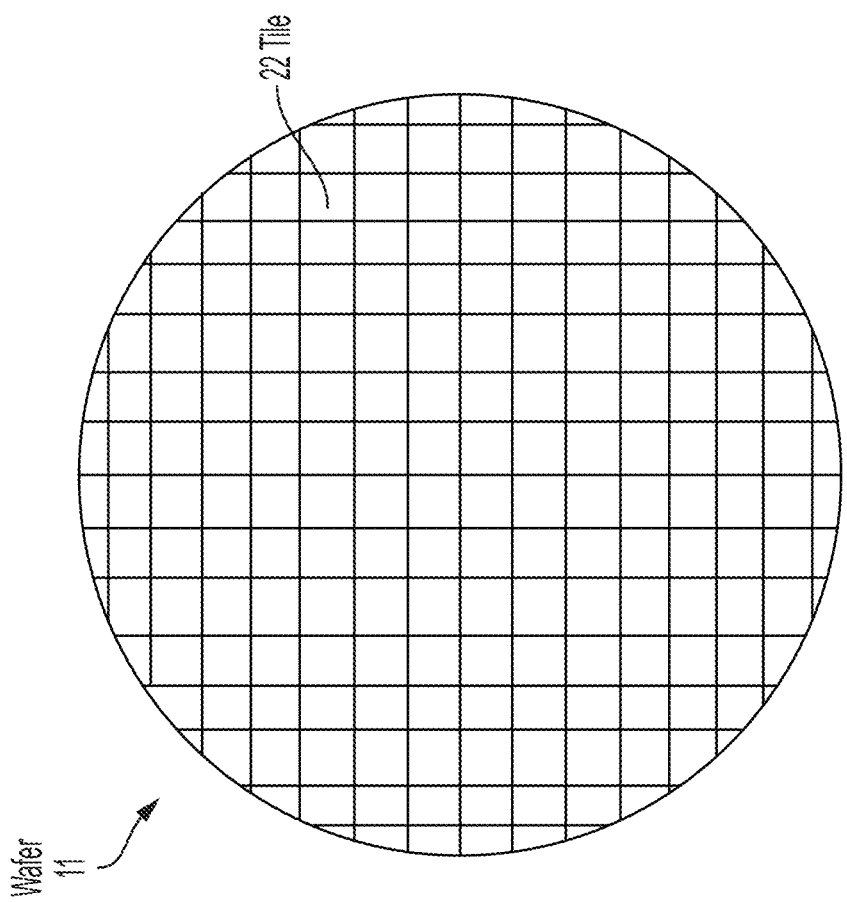

In the example of FIG. 1-2D, wafer 11 has been patterned with a grid of tiles 22. The tiles may share the pattern of one or more photomasks of set 200. For example, the tiles may share the pattern of the same waveguide photomask(s) and/or the same m trace photomask(s). In other embodiments, the tiles share the pattern of all the photomasks of set 200. For example, the tiles may share the same optical waveguide pattern, the same n-doping pattern, the same p-doping pattern, the same contact pattern, the same metal trace pattern, etc.

In some embodiments, the entire surface of wafer 11 is patterned using photomask set 200. However, not all embodiments are limited in this respect as some portions of wafer 11 may be patterned using a first photomask set and other portions of wafer 11 may be patterned using a second photomask set. The first photomask set may correspond to a first reticle and the second photomask set may correspond to a second reticle. The first and second types of reticles may alternate in a checkerboard-like fashion.

Once patterned, wafer 11 may include multiple photonic circuits. In one example, the wafer of FIG. 1-2E has been marked to obtain six photonic circuits from wafer 11. The photonic circuits are monolithically integrated with the wafer. This figure identifies a 1×1 photonic circuit having only one tile 22, a 2×2 photonic circuit having four tiles 22, a 2×3 photonic circuit having six tiles 22, and three 3×3 photonic circuits having nine tiles 22 each. Separation of a photonic circuit from the wafer involves dicing the wafer along the perimeter of the desired photonic circuit. In this respect, the photonic circuits described herein may be viewed as a wafer-level architecture. Once diced, each photonic circuit forms a standalone photonic interposer. One of the 3×3 photonic circuits of wafer 11 may be used as the photonic interposer of the example computing system of FIG. 1-1 (see photonic interposer 20).

FIG. 1-3A illustrates an example tile 22. In this example, tile 22 is shaped as a rectangle (though other shapes are also possible, such as squares or other polygons). As such, tile 22 is bounded by four boundaries (boundaries 1, 2, 3 and 4). Boundary 1 is opposite to boundary 2, and boundary 3 is opposite to boundary 4. Boundary 1 is adjacent to boundaries 3 and 4, and boundary 2 is also adjacent to boundaries 3 and 4. Tile 22 includes an optical distribution network 104 coupled to waveguides 111, 112, 113 and 114. Waveguide 111 optically couples optical distribution network 104 to boundary 1. As such, optical signals coupled from optical distribution network 104 to waveguide 111 can be transferred outside the tile by crossing boundary 111. Similarly, waveguide 112 optically couples optical distribution network 104 to boundary 2, waveguide 113 optically couples optical distribution network 104 to boundary 3 and waveguide 114 optically couples optical distribution network 104 to boundary 4. In some embodiments, the boundaries of a tile are defined based on a photolithography shot (e.g., the boundaries are defined by the boundaries of the photomask(s) used to fabricate the tile). In other embodiments, however, one photolithography shot may define more than one tile. For example, a photomask may be patterned with multiple side-by-side instances of a template tile. In some such embodiments, the boundaries of a tile are defined where adjacent instances of the template tile meet.

While the example of FIG. 1-3A illustrates waveguides coupling the optical distribution network to each of the boundaries, not all embodiments are arranged in this manner. In other embodiments, a tile 22 may include two of these four waveguides, such as waveguides 111 and 112, or waveguides 111 and 113. In yet other embodiments, a tile 22 may include three of these four waveguides, such as waveguides 111, 112 and 113. Optical distribution network 104 includes photonics components (e.g., photonic switches) for routing optical signals inside and outside tile 22. Further, optical distribution network 104 may include transmitters (proving an electrical-optical interface with the electronic chip mounted on the tile) and receivers (proving an optical-electrical interface with the electronic chip mounted on the tile). Examples of optical distribution networks are discussed in detail in the following section.

In some embodiments, a tile may include multiple layers of photonic waveguides. Similar to how multiple layers of conductive traces increase an electronic circuit's ability to route electric signals, multiple layers of waveguides increase a tile's ability to route optical signals. In one example, one layer includes silicon waveguides, and one or more additional layers include silicon nitride waveguides. The choice of material of each waveguide layer may be determined by the wavelength of light that will be routed by the waveguide. For example, silicon and silicon nitride layers may be used for routing infrared light in the telecommunication bands with wavelengths around 1.3 µm or 1.5 µm. In some examples, the multiple layers of waveguides may also include aluminum nitride waveguides that can be used to route visible light down to UV wavelengths or aluminum oxide waveguides that are used to route UV light. Each layer may be arranged in a configuration similar to that illustrated in FIG. 1-3A—with an optical distribution network that routes signals among the waveguides of the layer.

Tile 22 may further include one or more out-of-plane couplers (not shown in FIG. 1-3A). An out-of-plane coupler may be configured to emit light outside the xy-plane, for example in a direction parallel to the z-axis or at an angle relative to the z-axis. An out-of-plane coupler may be further configured to capture light incident from outside the xy-plane. In some embodiments, an out-of-plane coupler enables optical communication between tile 22 and a die disposed above the tile and/or below the tile. An out-of-plane coupler may be implemented using any suitable optical component, including for example optical gratings, lenses, and prisms. In some embodiments, the optical distribution network may be configured so that the same out-of-plane coupler enables optical communication in both directions—from optical distribution network 104 to a die and from the die to optical distribution network 104. In some embodiments, an out-of-plane coupler enables optical communication between tile 22 and a fiber.

Optical distribution network 104 may selectively couple any components of tile 22 to any other components of tile 22, as discussed in detail in the following sections. For example, optical distribution network 104 may enable passage of light between waveguide 111 and waveguide 112, and/or between waveguide 111 and waveguide 113, and/or between waveguide 113 and waveguide 114, etc. This may be achieved by equipping the optical distribution network with controllable optical switches.

Tile 22 may further include electrical connections 117, which may be arranged to provide electrical access to the tile from the electronic chip that is mounted on the tile. For example, electrical connections 117 may be in the form of contact pads providing a landing surface for bonds, bumps, vias or other types of vertical chip-chip interconnects. Electrical connections 117 may couple to the transmitters, receivers and switches of the optical distribution network, thus providing the electronic chip electrical access to those photonic components.

A photonic circuit may include multiple tiles connected together to collectively form an optical network. FIG. 1-3B illustrates an example 2×3 photonic circuit including six tiles 22. This photonic circuit is obtained by dicing a group of 2×3 tiles off of wafer 11 (see FIG. 1-2E). The tiles 22 are arranged to that waveguide 111 of an optical module is aligned with waveguide 112 of the optical module to the left of that optical module, waveguide 112 of an optical module is aligned with waveguide 111 of the optical module to the right of that optical module, waveguide 113 of an optical module is aligned with waveguide 114 of the optical module above that optical module and waveguide 114 of an optical module is aligned with waveguide 113 of the optical module below that optical module. As a result, the optical modules form an optical network. Optical distribution networks 104 may route optical signals anywhere inside or outside the network. Suppose, for example, that a processor is mounted to the tile positioned at the north-west corner of the photonic circuit and that a memory is mounted to the tile positioned at the south-east corner of the photonic circuit. A read operation may involve reconfiguring the optical distribution networks (e.g., by controlling its optical switches) to place the processor in optical communication with the memory. For example, an optical communication path may be formed that 1) couples the processor to the out-of-plane coupler of the tile to which the processor is mounted, 2) couples the out-of-plane coupler of that tile to waveguide 112 of the same tile, 3) couples waveguide 112 of that tile to waveguide 111 of the adjacent tile (mid-uppermost tile), 4) couples waveguide 112 of the mid-uppermost tile to waveguide 111 of the next adjacent tile (north-east corner of the photonic circuit), 5) couples waveguide 114 of the tile positioned at north-east corner to waveguide 113 of the tile to which the memory is mounted, and 6) couples waveguide 113 of the tile to which the memory is mounted to the out-of-plane coupler of the same tile.

As discussed above, waveguides of adjacent tiles are optically coupled to one another, thereby permitting passage of light from one tile to the next. In some embodiments, the end of the waveguides may be physically connected (although not all embodiments are limited to this specific arrangement, as discussed in detail further below). In other embodiments, there may be a gap between the waveguides. In this example, each waveguide has an end that is located at a distance from the boundary. Thus, a gap is formed at the boundary region. Notwithstanding the gap, the waveguides of the adjacent tile are still optically coupled to each other. In this case, in fact, light emitted at the end of a waveguide reaches the end of the other waveguide by free space propagation.

In some embodiments, tiles 22 may be patterned according to a common metal trace photomask. As a result, the tiles share the same pattern of metal traces. In some embodiments, tiles 22 are patterned according to multiple common photomasks. As a result, multiple levels of metal traces share the same patterns across different tiles. Some of the metal traces may be used to deliver power across a photonic circuit. For example, some of the metal traces may be arranged to form a power grid, as discussed in detail further below. FIG. 1-4A illustrates a 2×3 photonic circuit, in which each tile 22 shares the same pattern of metal traces. For the sake of illustration, only the metal traces are shown in this figure, though each tile further includes waveguides, one or more out-of-plane couplers and optical distribution networks. In this example, there are two levels of metal traces. The metal traces of each level have been fabricated using the same photomask across the different tiles. The metal traces of metal trace level 1 run in the horizontal direction, thereby electrically coupling tiles that are adjacent to one another in the horizontal direction. The metal traces of metal trace level 2 run in the vertical direction, thereby electrically coupling tiles that are adjacent to one another in the vertical direction. Of course, other arrangements are also possible. For example, in other embodiments, the metal traces of the same level may electrically couple one tile to all the tiles that are adjacent to it.

The metal traces are arranged to carry electricity (e.g., signals and/or power) across the boundaries of the tiles. This may be achieved by patterning metal traces to be continuous across the boundaries of the tiles. In this example, the metal traces of level 1 are continuous across the vertical boundaries, and the metal traces of level 2 are continuous across the horizontal boundaries. Metal traces of different levels may be connected to one another using vias. In some embodiments, the tiles may share the same patterns of vias. In other words, the same via photomask may be used for each tile. In some embodiments, the tiles may have more (tens to hundreds of) metal traces. Some of these metal traces may be arranged to be continuous across tiles but, in some embodiments, a majority of the metal traces need not be patterned to be continuous across modules. In one example, some metal traces may be patterned such that they do not reach the ends of the group of tiles, as shown in FIG. 1-4B. This creates a moisture barrier between the dice lanes and the metals. Further, these metal traces, to carry signals and/or power, can be connected to a through-silicon vias (TSVs) that connect to the substrate and/or the other chips placed on top of the tile. In some embodiments, the metal traces can also be connected to transistor elements that can act as electronic switches, amplifiers, or TX/RX components.

III. Optical Distribution Networks

This section discusses architectures for interconnecting the tiles of a photonic interposer with one another in a manner that enables high-bandwidth, low-latency and high resource utilization. The interconnections may be static or programmable.

A. Static Connections

Figures 1A, 2:
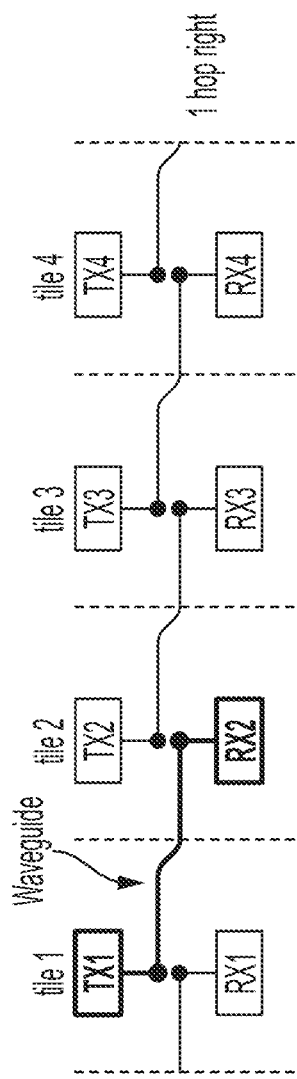

FIG. 2-1A illustrates an example in which tiles of a photonic interposer are interconnected using static connections. This example illustrates an interposer having four tiles arranged one dimensionally. Each tile has a transmitter (TX) and a receiver (RX). The transmitter may include (or may be coupled to) a light source and an optical modulator. The optical modulator may be configured to encode light with information provided by the electronic chip to which the tile is connected. Each receiver may include a photodetector to convert the signal provided by a transmitter into electricity. In this arrangement, a waveguide couples the TX of a tile to the RX of a neighboring tile. This arrangement is denominated "1 hop right" in that each waveguide reaches the RX immediately to the right of a TX.

Figures 1B, 2:
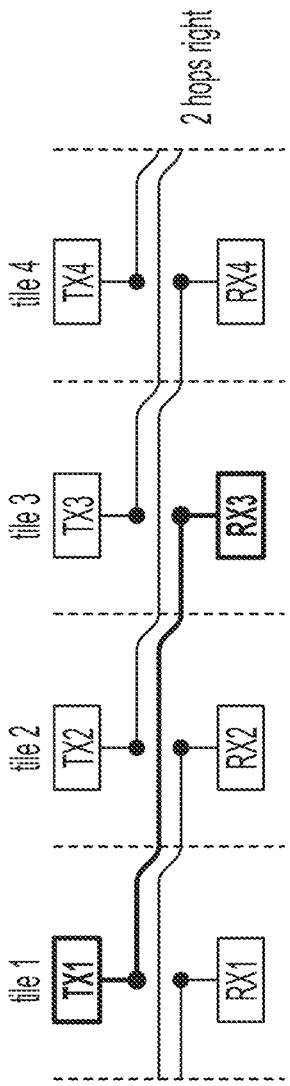

FIG. 2-1B illustrates another example in which tiles of a photonic interposer are interconnected using static connections. In this example, a waveguide couples the TX of a tile to the RX of the second neighboring tile. This arrangement is denominated "2 hop right" in that each waveguide reaches the RX that is two steps to the right of a TX.

Figures 1C, 2:
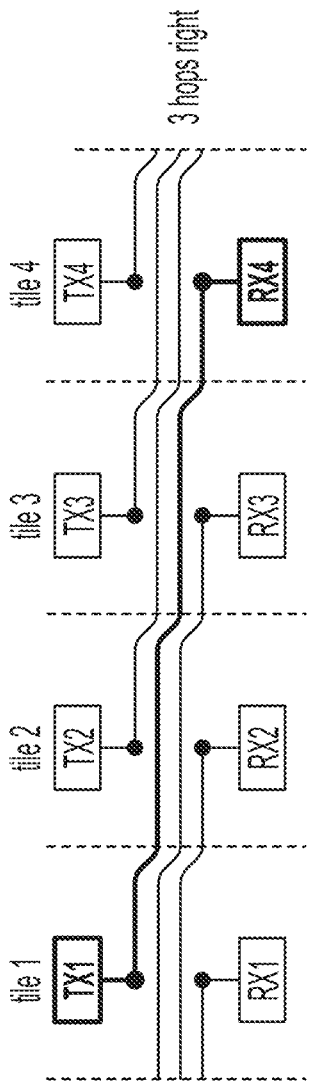

FIG. 2-1C illustrates yet another example in which tiles of a photonic interposer are interconnected using static connections. In this example, a waveguide couples the TX of a tile to the RX of the third neighboring tile. This arrangement is denominated "3 hop right" in that each waveguide reaches the RX that is three steps to the right of a TX.

The arrangements of FIGS. 2-1D, 2-1E and 2-1F are similar to the arrangements of FIGS. 2-1A, 2-1B and 2-1C, respectively, with the addition of optical fibers to close the loop. Use of fibers increases flexibility in that information can flow in a closed loop fashion. In FIG. 2-1D, a fiber loops around the photonic interposer by coupling the TX of tile 4 with the RX of tile 1. In FIG. 2-1E, a first fiber couples the TX of tile 4 with the RX of tile 2 and a second fiber couples the TX of tile 3 with the RX of tile 1. In FIG. 2-1F, a first fiber couples the TX of tile 4 with the RX of tile 3, a second fiber couples the TX of tile 3 with the RX of tile 2, and a third fiber couples the TX of tile 2 with the RX of tile 1.

Figures 1G, 2:
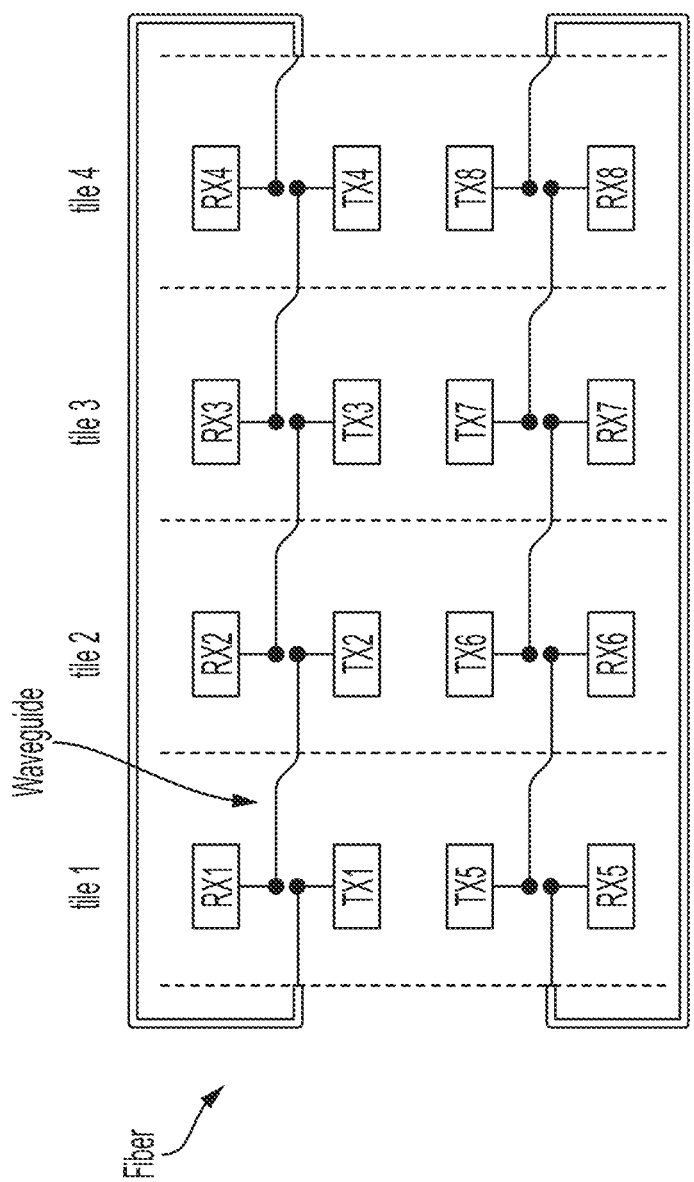
Figures 1H, 2:
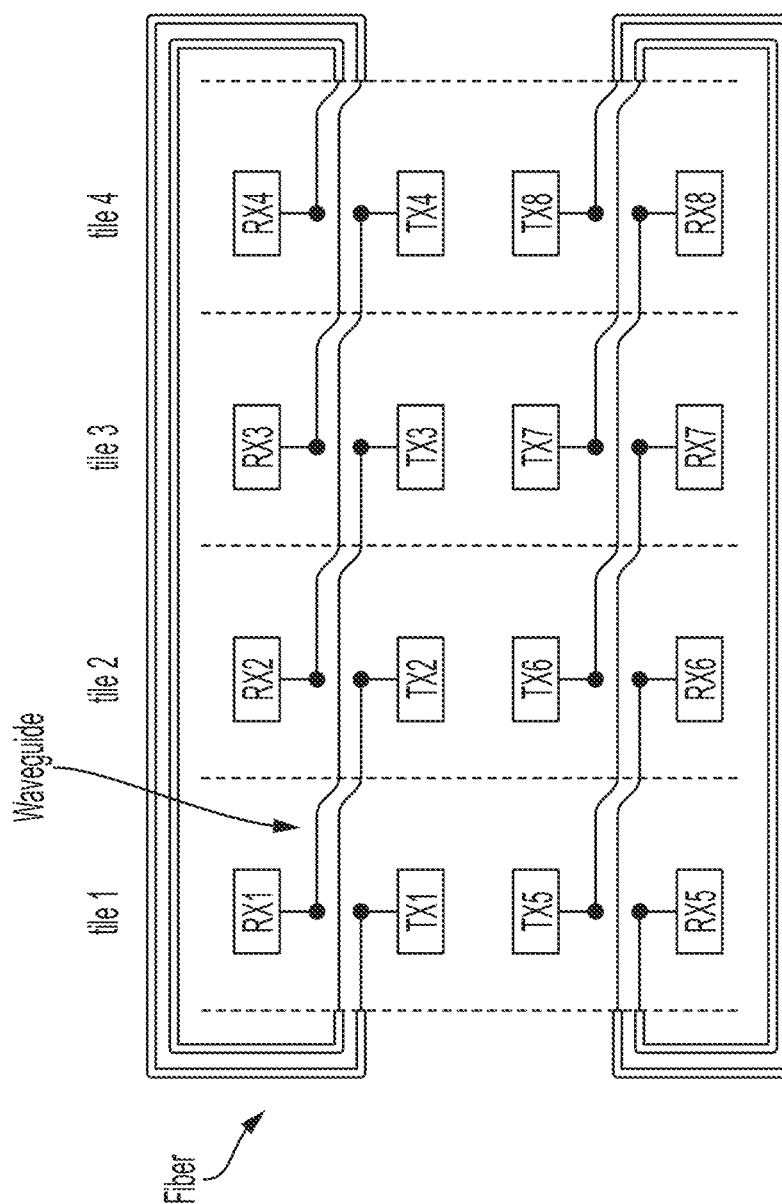

The arrangements of FIGS. 2-1D, 2-1E and 2-1F present one shortcoming: the TXs can transmit data only in one direction (to the right in these examples) while the RXs can receive only from the opposite direction (from the left in these examples). Therefore, such a network is not able to sustain a bi-directional link between two pairs of TX and RX modules. To implement a bi-directional link, a complementary network with waveguides cascaded in the opposite direction can be included. Examples are shown in FIGS. 2-1G and 2-1H (implementing a 1 hop and 2 hop scheme, respectively). In each arrangement, links are provided in both directions. TX1, TX2, TX3 and TX4 send data in one direction and TX5, TX6, TX7 and TX8 send data in the opposite direction. Similarly, RX1, RX2, RX3 and RX4 receive data from one direction and RX5, RX6, RX7 and RX8 receive data from the opposite direction. Tile 1 includes TX1, RX1, TX5 and RX5. Tile 2 includes TX2, RX2, TX6 and RX6. Tile 3 includes TX3, RX3, TX7 and RX7. Tile 4 includes TX4, RX4, TX8 and RX8.

Figures 1I, 2:
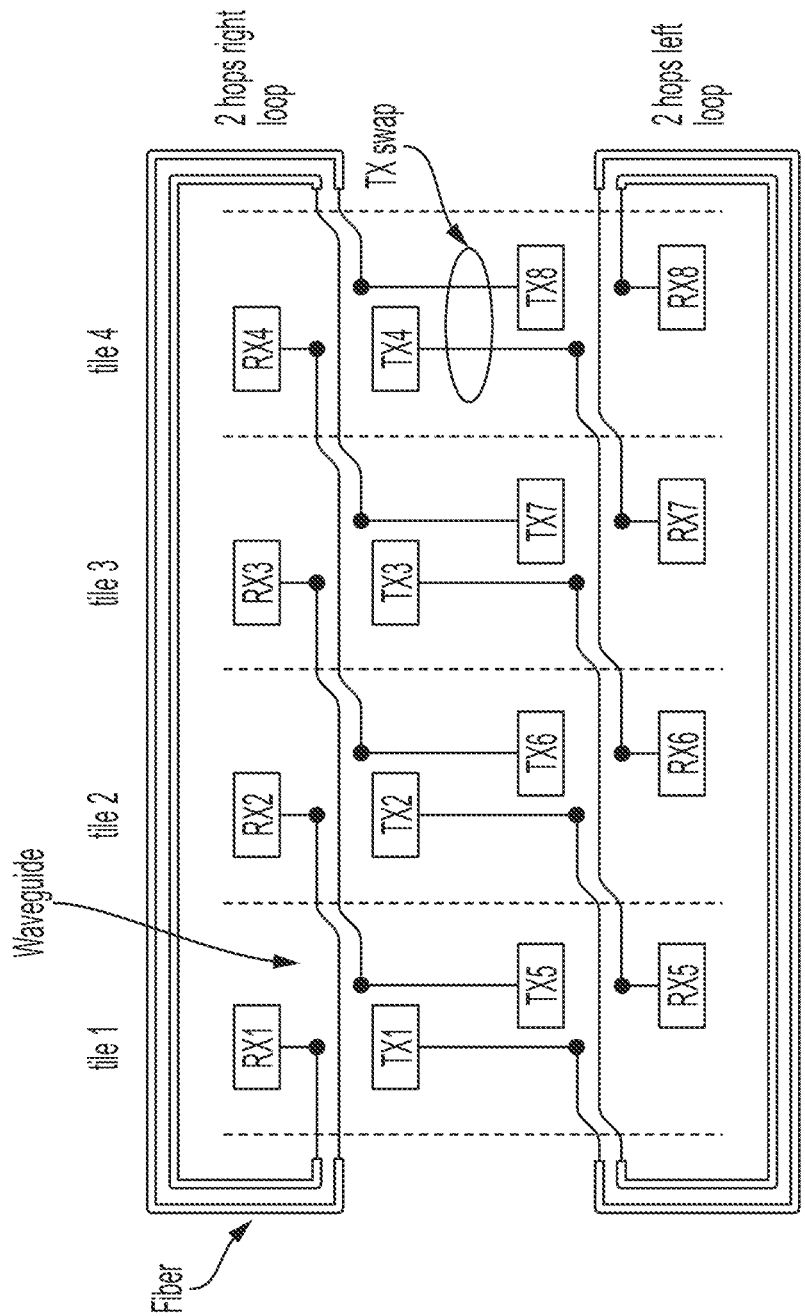
Figures 2, 2A:
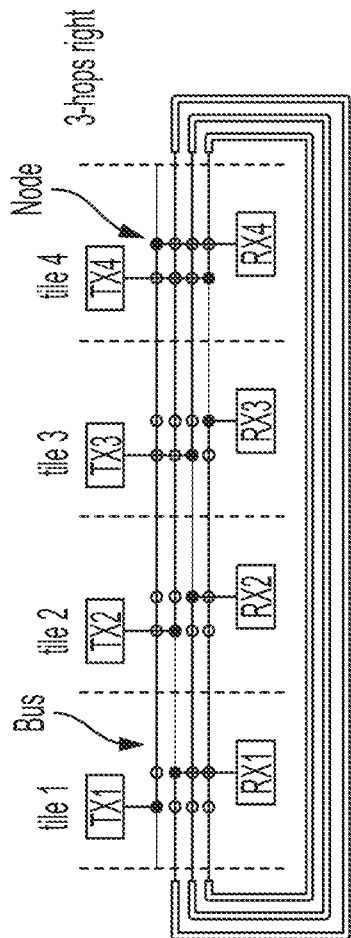
Figures 2, 2B:
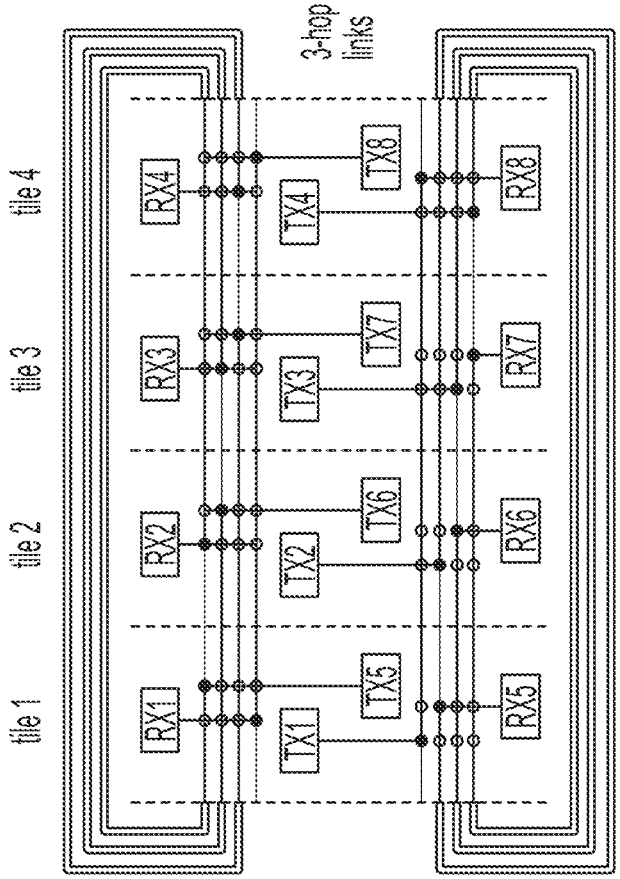
Figures 2, 2C:
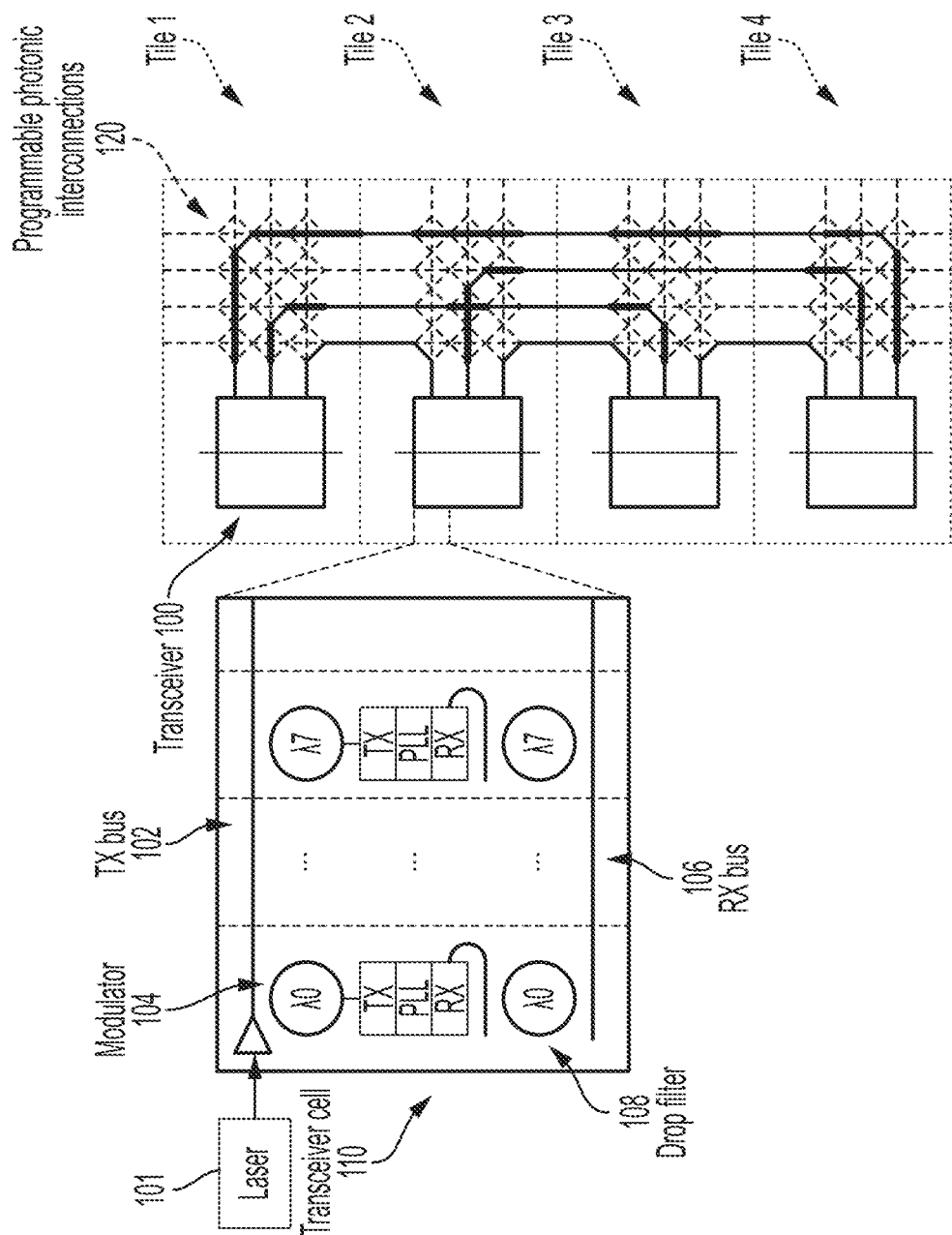
Figures 2, 2D:
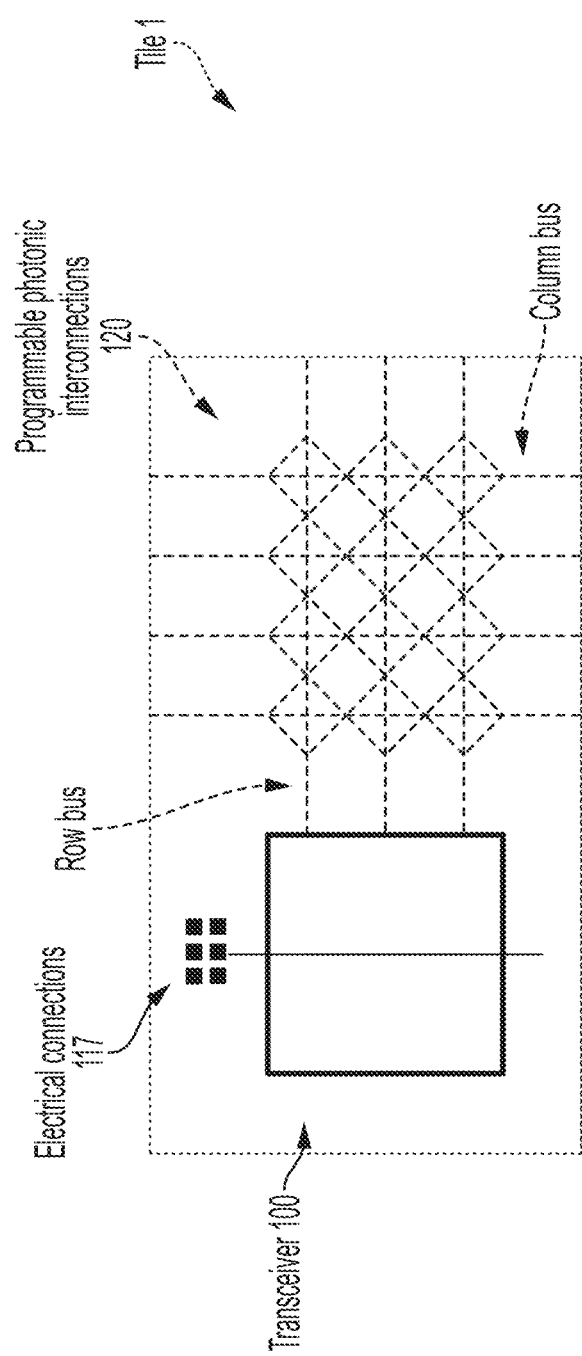
Figures 2, 2E:
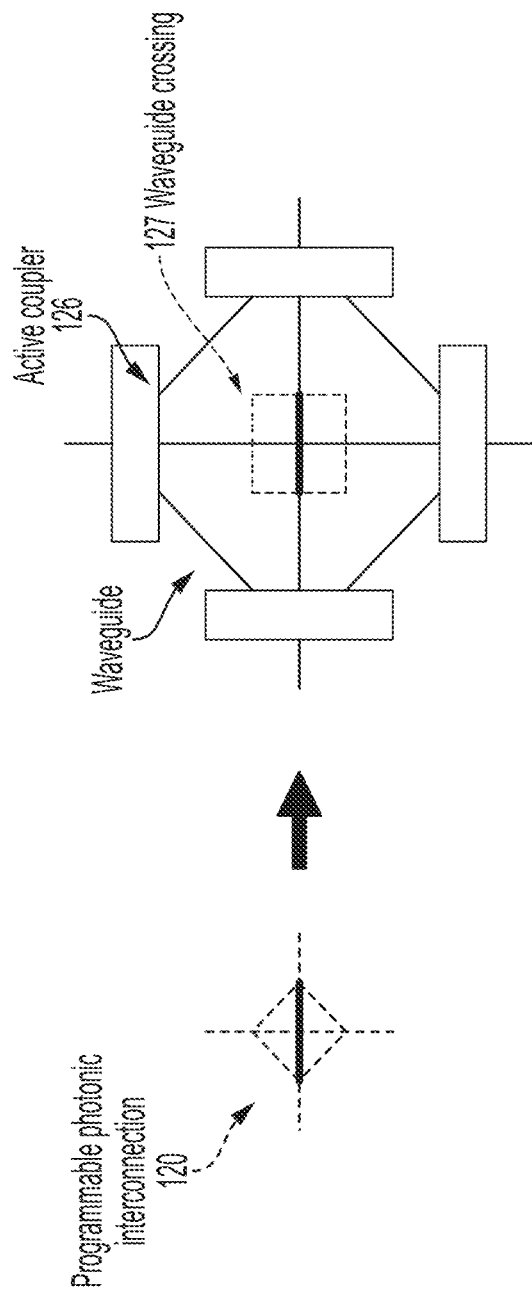

Such arrangements, however, do not provide a bidirectional link between two pairs of adjacent TX'es and RX'es. In fact, it would be desirable to have a first tile transmitting to a second tile, while the second tile transmits back to the first tile. To implement a bidirectional link between the two pairs of TX and RX modules, it is proposed to implement a "swap" between TX modules. This is shown in FIG. 2-1I. The swap enables TX modules to transmit to RX connected to a complementary loop. This example depicts a 2-hop double-loop architecture with swapped TX modules. As a result, TX1 can transmit to RX7 and TX7 can transmit back to RX1, closing a bidirectional link.

B. Programmable Connections

The static connections discussed above do not permit reconfiguration based on the needs of the network—the network topology is fixed. However, allowing the network to dynamically reconfigure itself depending upon the needs of the user may be useful in certain applications. Therefore, some embodiments relate to programmable connections among tiles of a photonic interposer. The arrangement of FIG. 2-2A is similar to the arrangement of FIG. 2-1F in that both arrangements implement a 3-hop architecture. However, instead of having static connection, the arrangement of FIG. 2-2A includes waveguide buses (four in this example, equal to the number of tiles). Each bus may couple any TX to any RX. Each transmitter and each receiver may selectively connect to the buses via switches. The points of connection are identified as "nodes" in FIG. 2-2A. When a transmitter activates a switch, the transmitter can use a bus waveguide to transmit data. Similarly, when a receiver activates a switch, the receiver can listen to data from a bus waveguide. Three fibers are employed to close the loop. In this example, the first bus connects TX1 to RX4, the second bus (in conjunction with the first fiber) connects TX2 to RX1, the third bus (in conjunction with the second fiber) connects TX3 to RX2, and the fourth bus (in conjunction with the third fiber) connects TX4 to RX3. The network may be reconfigured using the switches to alter the number of hops from 3 to 1 or 2.

To implement a bi-directional link, a double-loop architecture with swapped TX'es (similar to the architecture of FIG. 2-1I) may be used. This is shown in FIG. 2-2B. Unlike the architecture of FIG. 2-1I, however, this architecture includes buses and nodes, allowing for dynamic reconfiguration of the network.

FIG. 2-2C illustrates another photonic interposer with programmable connections, in accordance with some embodiments. This example includes four tiles, although any number of tiles is possible, whether arranged in 1D or 2D. Each tile includes a transceiver 100 and programmable photonic interconnections 120. Each transceiver includes one or more instances of transceiver cell 110. The transceiver cell depicted in FIG. 2-2C includes a laser 101, which may be mounted on the same package as the photonic interposer or may be outside the package. Laser 101 emits light at eight distinct wavelengths in this example, although a different number of wavelengths is possible. Therefore, the architecture of FIG. 2-2C can increase data throughput using wavelength-division multiplexing (WDM). A TX bus 102 receives light from the laser and is optically coupled to multiple modulators 104. Each modulator is coupled to a respective TX module, which may include a digital-to-analog converter and a modulator driver. A PLL times the operation of the TX module. The TX module, in turn, may be coupled to an electronic chip that is mounted on the photonic interposer in correspondence with the tile. Each modulator 104—implemented as a ring (or disc) resonator in this example—is tuned at a different wavelength of emission of laser 101 ($\lambda 0 \ldots \lambda 7$). Thus, each modulator is configured to impart data into a different WDM channel. On the receiver side, an RX module is coupled to a drop filter 108, implemented as a ring (or disc) resonator in this example. Each drop filter is tuned at a different wavelength of emission of laser 101 ($\lambda 0 \ldots \lambda 7$). As a result, each drop filter captures data from the RX bus 106 at a particular WDM channel. The RX module may also be coupled to the electronic chip, and may include a photodetector, a trans-impedance amplifier and an analog-to-digital converter.

The programmable photonic interconnects allow communication between the tiles (and as a result, between the electronic chips mounted on the photonic interposer) in a programmable fashion. The programmable interconnects form a grid of switchable intersections connected to each other by waveguides, as shown in FIG. 2-2D, where the waveguides are arranged to form row buses and column buses. The tile may further include electrical connections 117, which may be arranged to provide electrical access to the tile from the electronic chip that is mounted on the tile. For example, electrical connections 117 may be in the form of contact pads providing a landing surface for bonds, bumps, vias or other types of vertical chip-chip interconnects. Electrical connections 117 may couple to transceiver 100.

In the example of FIG. 2-2C, the programmable interconnects have been programmed to permit communication between each tile and every other tile. In this depiction, a first optical path is formed between tile 1 and tile 4, a second optical path is formed between tile 1 and tile 3 and a third optical path is formed between tile 1 and tile 2. Each optical path may support multiple wavelengths.

Figures 1, 2, 2E:
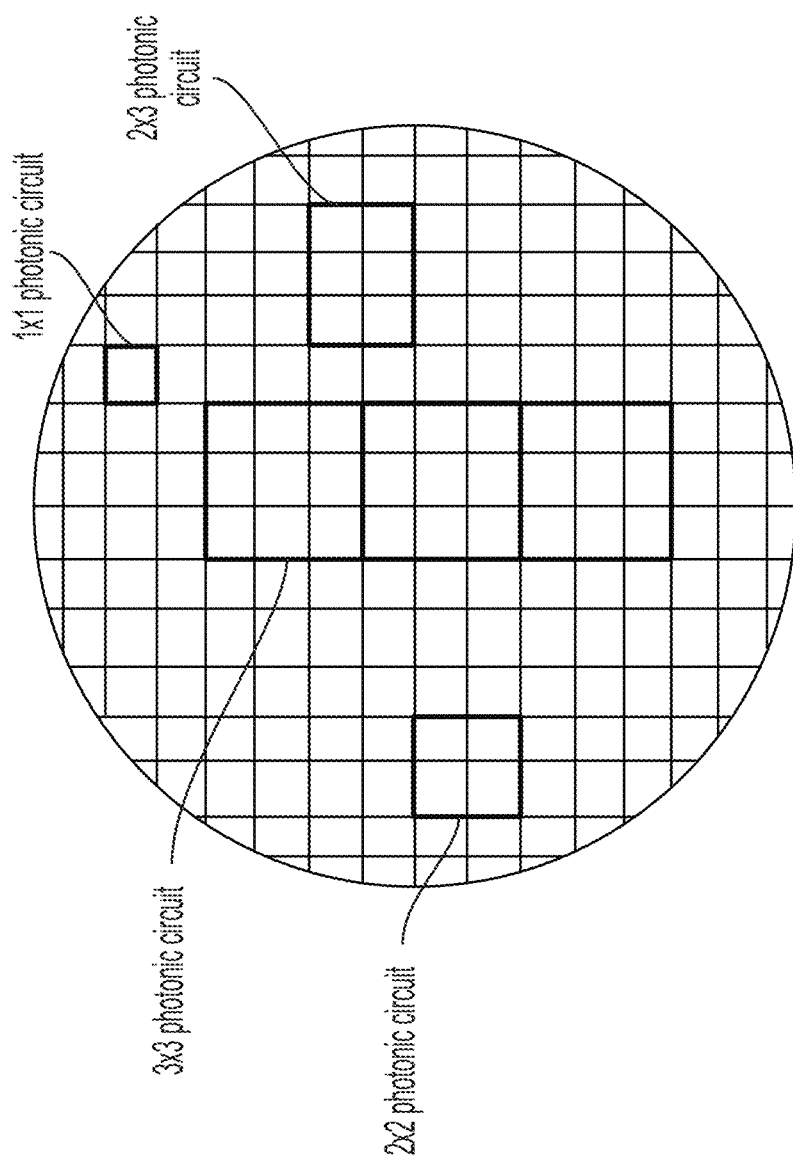

FIG. 2-2E illustrates an example implementation of a programmable photonic interconnection 120, in accordance with some embodiments. This programmable photonic interconnection includes active couplers 126 coupled to one another via waveguides. As further illustrated in FIG. 2-2F (illustrating an example of an active coupler), each active coupler may provide a one-to-multi waveguide coupling configuration. The active coupler may operate in both directions. When light propagates from the single waveguide, the active coupler may select one of the multiple waveguides for propagation of the light, thereby performing a switching operation. A possible implementation of active coupler 126 involves cascaded Mach-Zehnder interferometers (MZI), as further depicted in FIG. 2-2F (see MZIs 127 and 128).

Referring back to FIG. 2-2E, the central waveguides of the active couplers are coupled to each in a way that forms a waveguide crossing 127. Waveguide crossings 127 present a challenge from a system perspective in that they introduce insertion loss and cross talk. Below is an example of a waveguide crossing developed by the inventors which produces low insertion loss and low cross talk.

Figures 1, 2, 3, 3A:
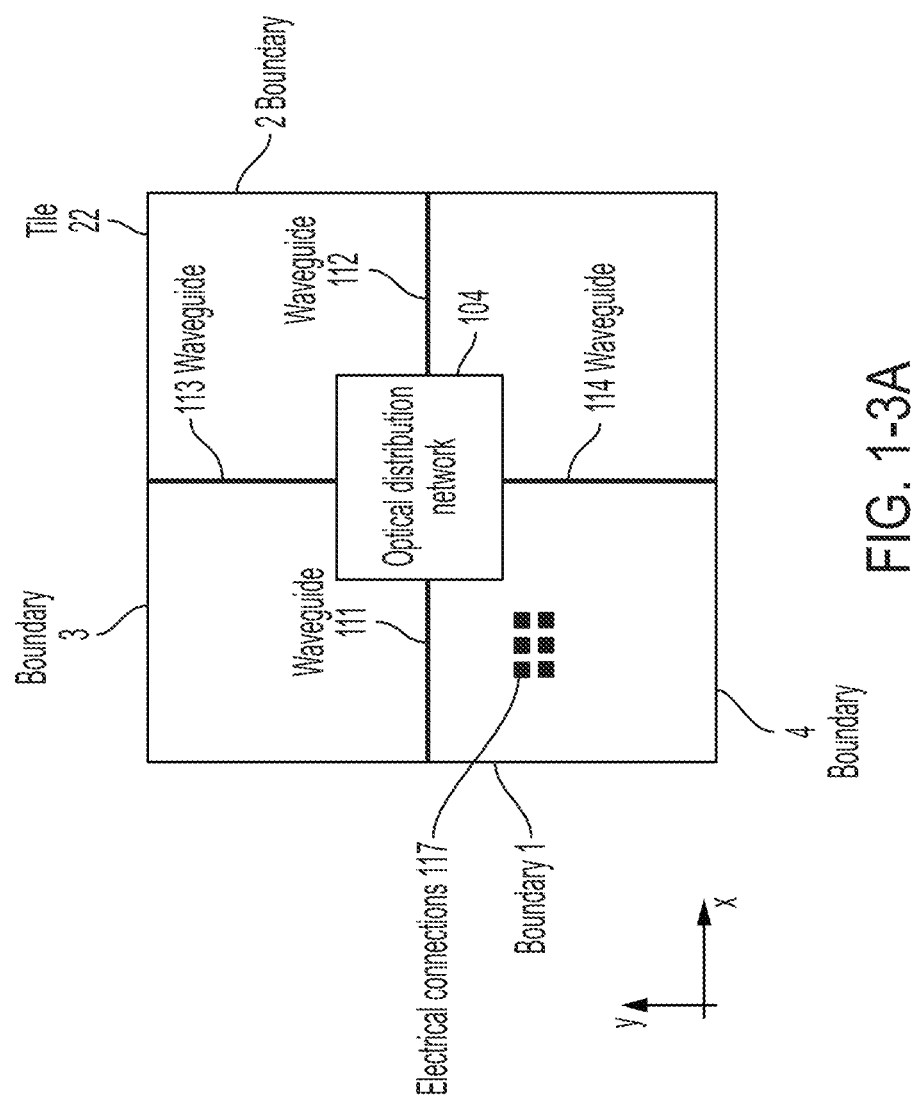

The waveguide buses illustrated in FIG. 2-2D may be bidirectional in some embodiments. In some such embodiments, instead of having a bus dedicated for transmission and a bus dedicated for reception, a tile may transmit and receiver using the same bus waveguide. Additionally, or alternatively, a transmitter may decide on which direction of a bus to transmit data and a receiver may decide from which direction of a bus to receive data. An example of such an implementation is depicted in FIG. 2-3A, in accordance with some embodiments. On the TX side, the tile includes couplers 131 arranged to form an optical tree. The couplers may be controllable (similar to the active couplers of FIG. 2-2F). Each output branch of the tree is coupled to a bus via couplers 133, 134 and 135. Coupler 133 selects one input and one output. Selecting as the input the waveguide provided by the TX allows coupler 133 to place the tile in transmission mode. Selecting one of the outputs allows the TX to communicate along the bus from right to left or from left to right, thus enabling communication in two directions. Couplers 134 and 135 determine whether the bus is an add/drop mode (add if in transmission or drop if in reception) or in thru mode (to bypass tile 1).

Figures 1, 2, 3, 3B:
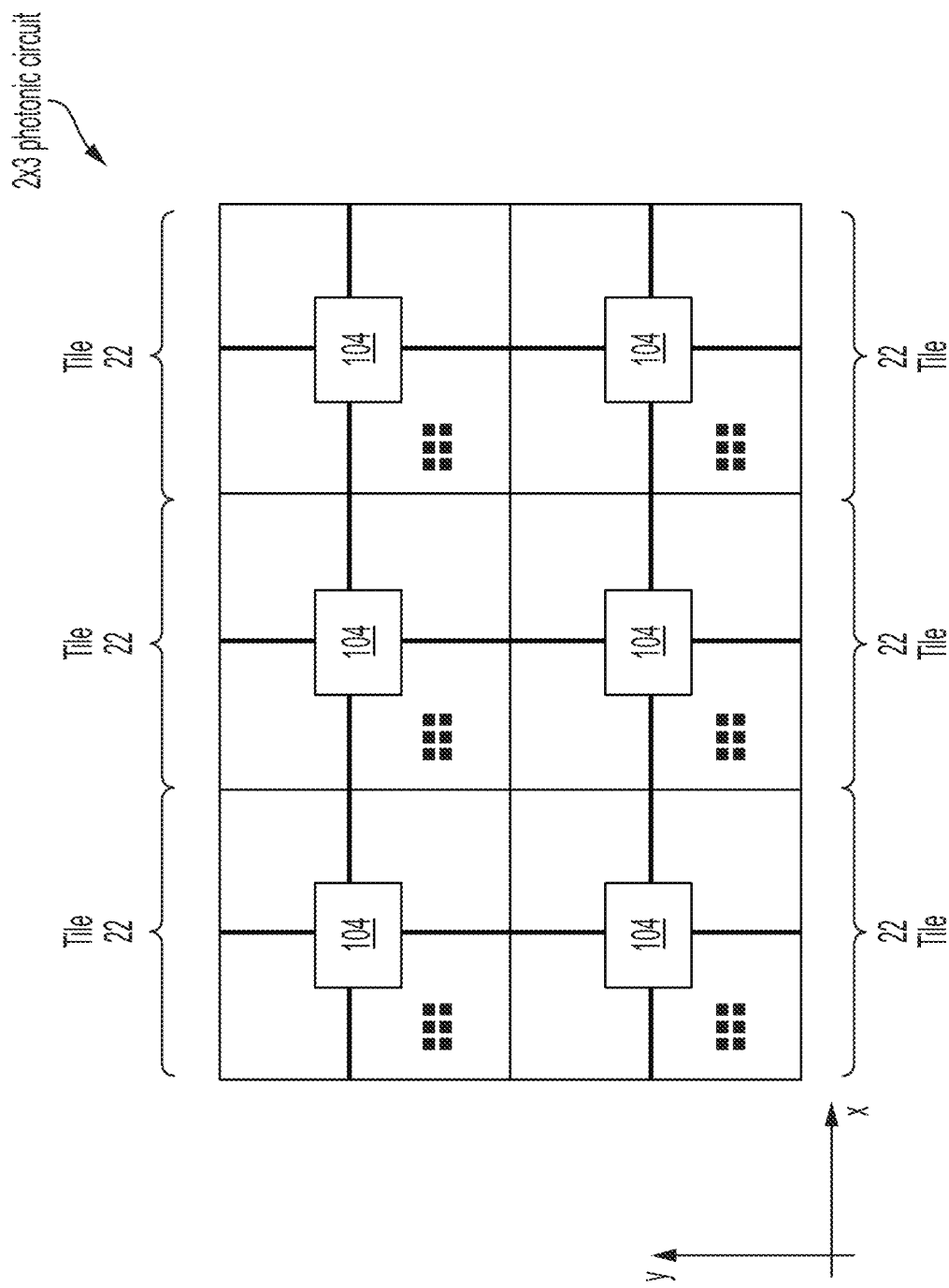

On the RX side, the tile includes couplers 132 also arranged to form an optical tree. Each output branch of the tree is coupled to a bus via couplers 133, 134 and 135, which allow selection of the right-to-left direction or the left-to-right direction during transmission. In this example, couplers 134 and 135 are implemented as 1×2 couplers and coupler 133 is implemented as a 2×2 coupler, although other configurations are also possible. The architecture of FIG. 2-3B is similar to the architecture of FIG. 2-3A, in that both architectures use coupler 133. However, the architecture of FIG. 2-3B replaces couplers 133 and 135 with a 2×2 coupler (137).

FIG. 2-4A and FIG. 2-4B illustrate additional schemes allowing bi-directional propagation along a bus. On the TX side (FIG. 2-4A), the TX is coupled to an MZI, which in turn is coupled to a resonant add filter. Depending on which output of the MZI is selected, either the clockwise mode or the counterclockwise mode of the resonant filter is excited. As a result, transmission on the bus occurs from left to right or from right to left. On the RX side (FIG. 2-4B), the RX is coupled to an MZI, which in turn is coupled to a resonant drop filter. Depending on which input of the MZI is selected, either the clockwise mode or the counterclockwise mode of the resonant filter is selected. As a result, the RX selects the left-to-right or the right-to-left bus mode.

FIG. 2-5 illustrates an example of a waveguide crossing that may be used in some embodiments (e.g., in FIG. 2-2E). This implementation involves three waveguide layers (140, 141 and 142). The waveguide layers may be made, for example, from silicon or silicon nitride. In one example, waveguide layer 140 is made from silicon and waveguide layers 141 and 142 are made from silicon nitride. The waveguide crossing is designed to couple mode A from layer 140 to layer 141 and then layer 142, and then from layer 142 back to layer 141 and again back to layer 140. Tapers may be used to expand and contract mode A in the vertical direction. By pushing mode A out of the plane of layer 140, the overlap between mode A and mode B is limited, thus reducing cross talk. The inventors have appreciated that having a 3-layer scheme as shown herein is advantageous over 2-layer schemes is that it can provide the same low insertion loss performance but enable a negligible cross-talk between layers 140 and 142.

Accordingly, some embodiments are directed to a photonic interposer comprising a plurality of photonics tiles (e.g., tiles 1-4 of FIG. 2-2C) that are instantiations of a template photonic tile. Each of the plurality of photonics tiles comprises a transceiver (100) comprising a transmitter and a receiver. Electrical connections (117), coupled to the transceiver, are configured to permit electrical communication between the transceiver and an electronic chip when the electronic chip is attached to the photonic interposer in correspondence with the photonic tile (as shown for example in FIG. 1-1). An optical distribution network comprises a first set of bus waveguides (e.g., the row buses of FIG. 2-2D) optically coupled to the transceiver, a second set of bus waveguides (e.g., the column buses of FIG. 2-2D), and a plurality of programmable interconnections (120). Each programmable interconnection is configured to selectively place a bus waveguide of the first set of bus waveguides in optical communication with a bus waveguide of the second set of bus waveguides. Each programmable interconnection comprises a waveguide crossing (127) and an active coupler (126).

In some embodiments, the transceiver comprises a plurality of modulators (104), coupled to a first bus waveguide of the first set of bus waveguides, tuned at different wavelengths relative to one another, as shown for example in FIG. 2-2C. Additionally, a plurality of drop filters (108), coupled to a second bus waveguide of the first set of bus waveguides, are tuned at different wavelengths relative to one another. In some embodiments, the plurality of modulators are resonant modulators, and the plurality of drop filters are resonant drop filters.

In some embodiments, the transmitter is configured to transmit data along a first bus waveguide of the first set of bus waveguides either in a first direction or a second direction, as shown for example in FIGS. 2-3A, 2-3B and 2-4A.

In some embodiments, each of the plurality of photonics tiles further comprises a 2×2 coupler (133) coupling the transceiver to the first bus waveguide of the first set of bus waveguides. The 2×2 coupler may comprise first, second, third and fourth terminals. The first terminal is coupled to an output of the transmitter. The second terminal is coupled to an input of the receiver. The third and fourth terminals are coupled to the first bus waveguide of the first set of bus waveguides.

In some embodiments, each of the plurality of photonics tiles further comprises an interferometer (e.g., the MZI of FIG. 2-4A) having an input and first and second outputs, and a resonant filter. The transmitter is coupled to the input of the interferometer, and the first and second outputs of the interferometer are coupled to the resonant filter. The resonant filter is coupled to the first bus waveguide of the first set of bus waveguides. Additionally, in some embodiments, each of the plurality of photonics tiles further comprises an interferometer (e.g., the MZI of FIG. 2-4B) having an output and first and second inputs, and a resonant filter. The resonant filter is coupled to the first bus waveguide of the first set of bus waveguides. The first and second inputs of the interferometer are coupled to the resonant filter. The receiver is coupled to the output of the interferometer.

In some embodiments, the waveguide crossing comprises a first waveguide patterned in a first waveguide layer (140), a second waveguide patterned in a second waveguide layer (141), and a third waveguide layer patterned in a third waveguide layer (142). The second waveguide layer is between the first and third waveguide layers, and the first waveguide is evanescently coupled with the second waveguide and the second waveguide is evanescently coupled with the third waveguide. In some embodiments, the first waveguide layer is made of silicon, and both the second and the third waveguide layers are made of silicon nitride.

In some embodiments, the active coupler comprises a first terminal coupled to a first additional active coupler, a second terminal coupled to a first additional active coupler, and a third terminal coupled to the waveguide crossing, as shown for example in FIG. 2-2E.

Figures 2, 2F:
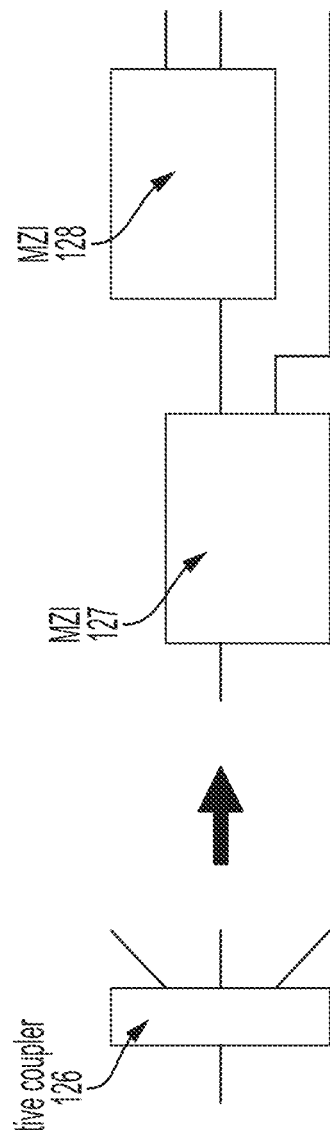
Figures 2, 3, 3A:
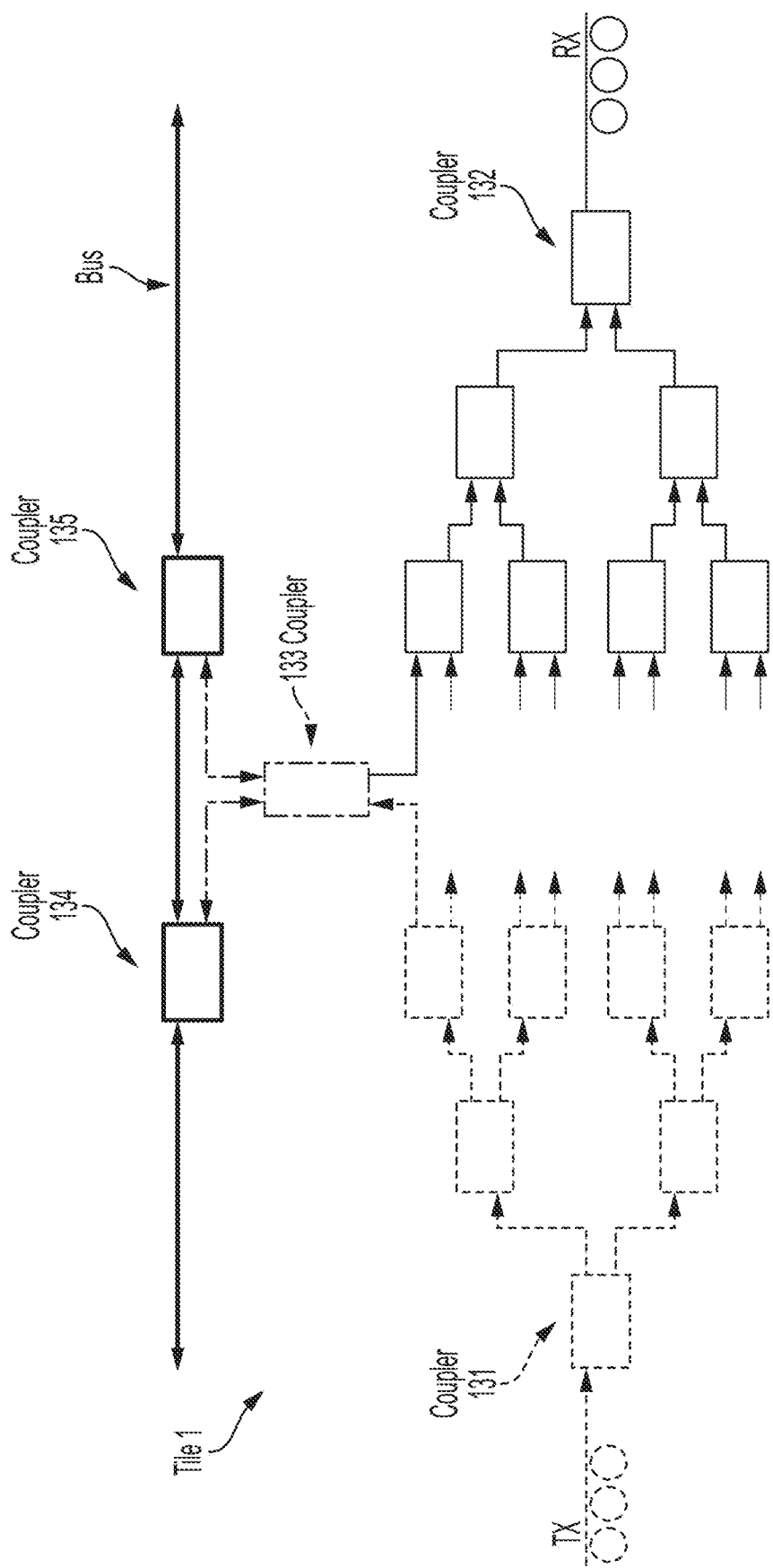
Figures 2, 3, 3B:
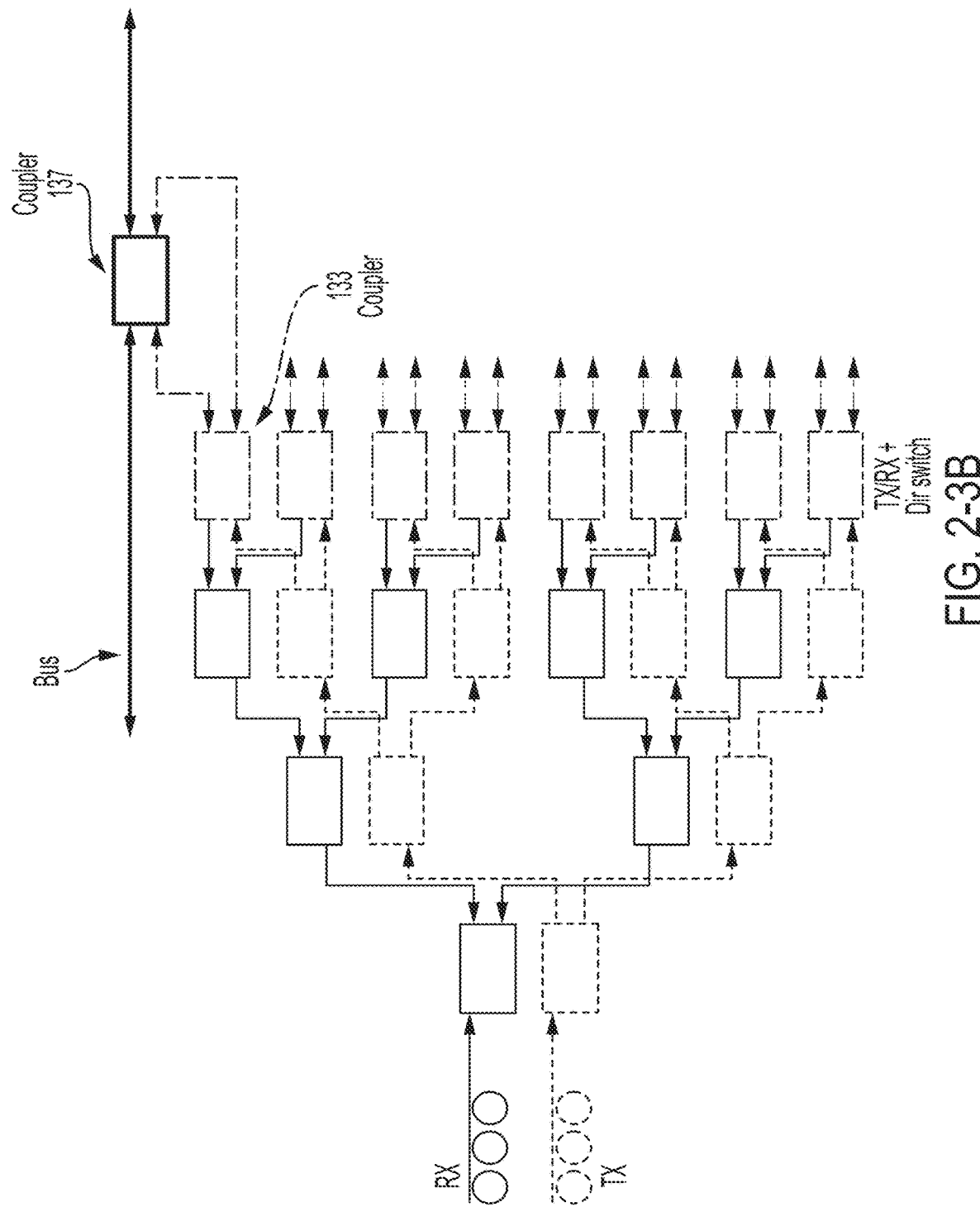
Figures 2, 3, 4, 4B:
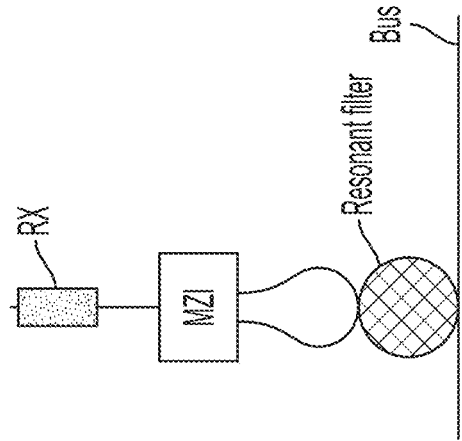
Figures 2, 3, 4, 4A:
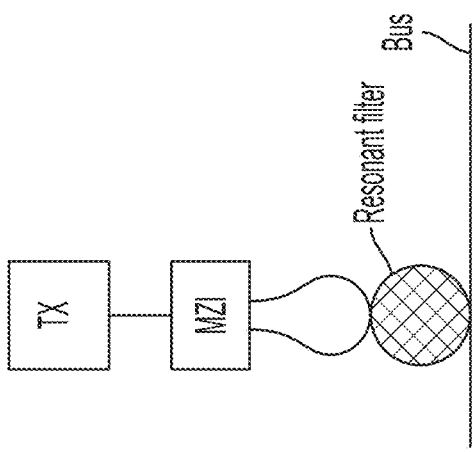

In some embodiments, the active coupler comprises first and second Mach Zehnder interferometers (MZI), as shown for example in FIG. 2-2F. The first terminal corresponds to a first output of the first MZI (128), the second terminal corresponds to a second output of the first MZI, and the third terminal corresponds to an output of the second MZI (127).

In some embodiments, the bus waveguides of the second set of bus waveguides traverse multiple photonic tiles (e.g., tiles 1-4 of FIG. 2-2C).

FIG. 2-6A illustrates another interconnection architecture. The advantage of this architecture over the one of FIG. 2-2C is that waveguide crossings are omitted. The drawback is an underutilization of the transceivers. In this architecture, each tile includes multiple transceivers 100. Each transceiver is coupled to one of the buses (151, 152, 153, 154 and 155). These buses cross the boundaries between the tiles and do not intersect with each other. In this depiction, bus 151 permits communication between tile 1 and tile 2, and between tile 3 and tile 4. Bus 152 permits communication between tile 1 and tile 3. Bus 153 permits communication between tile 2 and tile 4. Bus 154 permits communication between tile 1 and tile 4. Bus 155 permits communication between tile 2 and tile 3. The transceiver-bus connections may be programmed depending on the needs of the network. Couplers 156 are used to selectively couple a transceiver to a bus or uncouple the transceiver from the bus. An example implementation of coupler 156, shown in FIG. 2-6B, involves MZIs arranged in a closed loop configuration. The MZIs permit communication in two directions, whether in transmission or reception.

Utilization in the architecture of FIG. 2-6A may be increased by including additional buses. For each row of transceivers spanning tiles 1 through 4, there are two buses (e.g., 151A and 151B) to which the transceivers are switchably coupled. One bus may support communication from left to right and the other bus may support communication from right to left, thereby closing the loop. However, both buses may support communication in the same direction in some embodiments. In this depiction, bus 151A places tile 1 in communication with tile 4, and bus 151B places tile 1 in communication with tile 2, tile 2 in communication with tile 3, and tile 3 in communication with tile 4. Couplers 156 may be implemented as illustrated in FIG. 2-6B, for example. One drawback of this configuration is that the link between tiles at the opposite ends of a row (e.g., tile 1 and tile 4) is longer than the other links, resulting in greater optical loss.

The architecture of FIG. 2-6D addresses this issue by using optical fibers to connect remote tiles. In this architecture, tiles have been arranged in two blocks of 1×2 tiles. The first block includes tiles 1 and 2, the second block includes tiles 3 and 4. Each tile includes multiple transceivers 100. Tiles 1 and 2 communicate with each other using buses 161A and 161B. Having two buses permits communication in both directions. For example, the TX of tile 1 may transmit data to the RX of tile 2 using bus 161A, and the TX of tile 2 may transmit data to the RX of tile 1 using bus 161B. Similarly, tiles 3 and 4 communicate with each other using buses 164A and 164B. In one example, the TX of tile 3 may transmit data to the RX of tile 4 using bus 164A, and the TX of tile 4 may transmit data to the RX of tile 3 using bus 164B. As such, buses 161A, 161B, 164A and 164B may be viewed as intra-block buses. Instead, buses 162A, 162B, 163A and 164B may be viewed as inter-block buses. Bus 162A connects to bus 163B via fibers 166A and 168A. Similarly, bus 162B connects to bus 163A via fibers 166B and 168B.

Compared with the architectures of FIGS. 2-6C, the architecture of 2-6D shortens the on-chip path connecting tile 1 and tile 4. Part of the on-chip path connecting tile 1 and tile 4 is replaced with fibers. Because the loss introduced by a fiber can be made lower than the loss introduced by an integrated waveguide, the overall loss is reduced.

Accordingly, some embodiments are directed to a photonic interposer comprising a plurality of photonics tiles (e.g., tiles 1-4 of FIG. 2-6D) that are instantiations of a template photonic tile. Each of the plurality of photonics tiles comprises a first transceiver (100). Electrical connections (not shown in FIG. 2-6D), coupled to the first transceiver, are configured to permit electrical communication between the first transceiver and an electronic chip when the electronic chip is attached to the photonic interposer in correspondence with the photonic tile, as shown for example in FIG. 1-1. First and second bus waveguides (162A and 162B) each traverse the first and second photonic tiles. and third and fourth bus waveguides (163A and 163B) each traverse the third and fourth photonic tiles. A first fiber (166A), the first bus waveguide (162A) and the fourth bus waveguide (163B) place the first transceiver of the first photonic tile in optical communication with the first transceiver of the fourth photonic tile. A second fiber (166B), the second bus waveguide (162B) and the third bus waveguide (163A) place the first transceiver of the second photonic tile in optical communication with the first transceiver of the third photonic tile.

In some embodiments, each of the plurality of photonics tiles further comprises a second transceiver. The second transceiver of the first photonic tile is in optical communication with the second transceiver of the second photonic tile (e.g., via bus 161A and/or 161B). Similarly, the second transceiver of the third photonic tile may be in optical communication with the second transceiver of the fourth photonic tile (e.g., via bus 164A and/or 164B).

In some embodiments, the interposer further comprises a third fiber (168A). The third fiber (168A), the first bus waveguide (162A) and the fourth bus waveguide (163B) place the first transceiver of the first photonic tile in further optical communication with the first transceiver of the fourth photonic tile. The first fiber, the third fiber, the first bus waveguide, the fourth bus waveguide, the first transceiver of the first photonic tile and the first transceiver of the fourth photonic tile may form a closed loop. The interposer may further comprise a fourth fiber (168B). The fourth fiber (168B), the second bus waveguide (162B) and the third bus waveguide (163A) place the first transceiver of the second photonic tile in further optical communication with the first transceiver of the third photonic tile. The second fiber, the fourth fiber, the second bus waveguide, the third bus waveguide, the first transceiver of the second photonic tile and the first transceiver of the third photonic tile may also form a closed loop.

C. Wavelength-Based Tile Identification

The architectures discussed in connection with FIGS. 2-1A through 2-6D leverage WDM to increase the aggregate bandwidth of each tile-tile optical link. In other embodiments, wavelengths may be used to uniquely identify each tile. In a 4-tile architecture, for example, wavelength $\lambda 0$ may uniquely identify tile 1, wavelength $\lambda 1$ may uniquely identify tile 2, wavelength $\lambda 2$ may uniquely identify tile 3, and wavelength $\lambda 3$ may uniquely identify tile 4. Thus, a receiver can identify the origin of data collected from a bus simply by determining the wavelength supporting the data. One example is shown in FIG. 2-7A. This architecture includes four tiles. A first set of transceivers 100 are connected by bus 171, a second set of transceivers 100 are connected by bus 172, and a third set of transceivers 100 are connected by bus 173. Each transceiver is labeled with a pair of numbers (x and y). The first number (x) identifies the wavelength of transmission of the transceiver's transmitter. The second number (2) identifies the wavelength that the transceiver's receiver is configured to read. It should be noted that all the x numbers of the transceivers of a particular tile are the same. This allows the system to uniquely identify transmitters by wavelength.

In the example of FIG. 2-7B, each tile of a row has a unique wavelength of transmission. However, the wavelengths are reused across different rows. The first row includes rows 1-4 and the second row includes tiles 5-8. In this example, wavelength λ0 may uniquely identify tiles 1 and tile 5, wavelength λ1 may uniquely identify tiles 2 and tile 6, wavelength λ2 may uniquely identify tiles 3 and tile 7 and wavelength λ3 may uniquely identify tiles 4 and tile 8. Bus set 181 (including three buses) permits communication among the tiles of the first row (tiles 1-4). Bus set 183 (including three buses) permits communication among the tiles of the second row (tiles 5-8). Bus set 182 (including eight buses) permits communication between each tile of the first row and each tile of the second row. Each tile includes transmitters and receivers, represented herein in the form of a resonant modulator (TX) and a resonant drop filter (RX). The wavelengths in parentheses indicate the wavelength of transmission (for a TX) and the drop wavelength of the resonant drop filter (for an RX).

The architecture of FIG. 2-7C is similar to the architecture of FIG. 2-7A, but it further includes programmable optical loopbacks 190, which permit one-way traffic lanes. An example programmable optical loopback, illustrated in FIG. 2-7D, is implemented using MZIs.

IV. Die-to-Die (D2D) Interfaces

The photonic interposers described herein may be used to interconnect application-specific integrated circuits (ASIC) in ways that would otherwise be impractical (e.g., too costly or energy inefficient) using conventional interfaces. In recent years, new die-to-die (D2D) interfaces standards have been emerging that allow chiplets of different sources to communicate with each other. D2D interfaces take advantage of very short channels to connect two dies inside a common package to achieve power efficiency and very high bandwidth efficiency, beyond what traditional chip-to-chip interfaces can achieve. A D2D interface can be viewed as being divided into a physical layer (PHY), a link layer, and a transaction layer. The PHY layer can be implemented using high-speed SerDes architectures, for parallel-to-serial and serial-to-parallel data conversion. The primary role of a SerDes is to minimize the number of I/O interconnects.

Currently, there is a large focus in the industry on advanced packaging, as electronic interposers and silicon bridges are making their way into mainstream products. Examples of D2D interfaces include Advanced Interface Bus (AIB), Universal Chiplet Interconnect Express (UCIe) and Low-voltage-In-Package-INterCONnect (LIPINCON), among others. Bunch of Wires (BoW) is a relatively new D2D interface designed to standardize part of the interconnects that are expected to become more important in future generations of chips. These interfaces are designed for high bandwidth communication between electronic ASICs positioned in relatively close proximity, e.g., a few millimeters apart.

The inventors have recognized and appreciated that the relatively close proximity set by D2D interfaces poses a practical limit to the types of computing architectures achievable using these interfaces. The maximum die-to-die distance set by these interfaces—a few millimeters at moist—guarantees high bandwidth and reliability given the constraints of electrical interconnects. The photonic interposers described herein can expand the applicability of conventional D2D interfaces to greater ASIC-to-ASIC distances than what is possible with conventional electronic interposers. In one example, use of photonic interposers may enable AIB-based communication between a pair of ASIC separated by more than 1 cm, more than 1.5 cm, more 2.5 cm, more than 3 cm, more than 5 cm, more than 10 cm, for example. Similarly, use of photonic interposers may enable UCIe-based communication between a pair of ASIC separated by more than 1 cm, more than 1.5 cm, more 2.5 cm, more than 3 cm, more than 5 cm, more than 10 cm, for example. A SerDes interface in connection with a photonic interposer can multiplex wires into a single photonic link utilizing a single photonic channel, whether a spatial channel (a waveguide or a fiber), a wavelength channel or a polarization channel. In some embodiments, a photonic channel can support 56 Gbps using non-return to zero (NRZ) to upwards of 112 Gbps using PAM4 modulation.

FIG. 2-8A illustrates an ASIC equipped with an AIB interface. More specifically, the ASIC include a "north west" AIB unit, a "south west" AIB unit, a "south east" AIB unit, and a "north east" AIB unit. Each AIB includes 24 channels (though other numbers of channels are possible). FIG. 2-8B illustrates how the AIB interface may enable connection between two ASICs (ASIC 0 and ASIC 1) using a photonic interposer of the types described herein. A transmitter port in ASIC 0 supports 128 wires, each supporting between 1.5 Gbps and 2.5 Gbps (e.g., 2 Gbps). With an 8:1 SerDes, signals from eight wires can be multiplexed to produce between 12 Gbps and 20 Gbps (e.g., 16 Gbps). The SerDes may be formed directly on the photonic interposer in some embodiments (e.g., using transistors in the SOI wafer hosting the photonic interposer). Modulators formed in a photonic interposer convert data obtained from the SerDes into optical signals to be transmitted using waveguides formed on the interposer or fibers. On the receiver side, the photodetectors receive the signals, the SerDes perform demultiplexing, and the wires provide data to ASIC 1 via an AIB receive port.

FIG. 2-8C illustrates a photonic interposer 20 hosting 16 ASICs with AIB interfaces. Each ASIC may be mounted on a respective tile of the photonic interposer, for example in an arrangement similar to what is depicted in FIG. 1-1. An external laser module couples light to the interposer using grating couplers, although edge coupling is also possible. Waveguides formed in the interposer and/or fibers support communication between ASICs through the AIB interfaces. Any of the static or programmable photonic interconnects described herein may be used to support communication between the ASICs. It should be noted that the AIB interfaces discussed in connection with FIGS. 2-8A through 2-8C may be replaced with other D2D interfaces, including for example UCIe.

FIG. 2-9A illustrates a pair of ASICs (ASIC 0 and ASIC 1) in communication with each respective tiles (tile 0 and tile 1) of an interposer. In this example, BoW interfaces are used. Communication takes place through waveguides formed in the photonic interposer, though in other embodiments fibers may be used. In some embodiments, to reduce the number of waveguides crossing the tile boundaries, signals may be multiplexed in a single waveguide or fiber using WDM and/or polarization diversity. In the example of FIG. 2-9B, one polarization is used in one direction of transmission and the other polarization is used for the reverse direction.

The photonic interposers described herein enable several types of computer architectures, including those illustrated in FIGS. 2-10A, 2-10B, 2-10C and 2-10D. In the example of FIG. 2-10A, a photonic interposer 20 hosts sixteen ASICs. Among these, only one (ASIC 0) interfaces with components outside interposer 20, using optical fibers. The ASICs communicate with each other using any one of the interconnection described herein. In the example of FIG. 2-10B, fibers are used to close the loop. As a result, ring network architectures may be formed. This architecture is particularly suitable for applications involving pipelined operations using multiple ASICs. In the example of FIG. 2-10C, each ASIC communicate with its neighbors, and further links are formed to permit communication between ASICs positioned at opposite ends of a column or a row. This allows 2D hypertoroid architectures. Lastly, in the example of FIG. 2-10D, every ASIC is in communication with every other ASIC to form an all-to-all architecture. This architecture is particularly suitable for smaller layer sizes, parallel batch processing, sequential graph processing, and HPC/AI clusters where multi-tenancy is desired.

The inventors have appreciated that a larger number of hops (in terms of photonic tiles) would require longer photonic paths and/or more photonic switches/crossings. This could lead to more optical losses and cross-talk. The topology of FIG. 2-10A, an all-to-all topology, represents the baseline topology. The topologies in FIGS. 2-10B through FIG. 2-10D are achieved by reducing the number of hops that a particular optical link takes with respect to the topology of FIGS. 2-10A. As such, the optical losses of the links in the topologies of FIGS. 2-10B through 2-10D are lower than those of the links shown in FIG. 2-10A. For efficiency reasons, one can turn down the laser power/current to reduce the amount of redundant light used for each optical link.

Additional topologies are also possible where the number of hops of a particular TX/RX link is higher in the reconfigured topology than in the baseline topology. In this case, that particular optical link may require a higher laser power (to compensate for the higher loss or cross-talk) to achieve the same performance (e.g., baud and BER). The higher laser power can be achieved without increasing the overall system's laser power by routing additional power to that link, for example from those optical links whose number of hops is reduced. Otherwise, additional laser modules or increasing the laser module's output may be required. Another solution is to use a different communication protocol that either is slower or has smaller of bits (e.g., going from PAM-4 to NRZ, or QAM-16 to QAM-4) or accept the higher bit/symbol error rates, which can be improved with the use of error-correction codes.

VI. Clock Distribution

The inventors have recognized and appreciated that synchronizing an entire photonic interposer, and the electronic chips connected to it, using a single global clock is impractical. This is in part because global clock distribution schemes are complex and require substantial power to operate.

In some embodiments, clock and data recovery (CDR) may be performed by generating, within each tile, a local clock. CDR recovery may be implemented for each TX/RX pair, where the optical communication channel traverses the boundary between a tile and another tile. CDR may be performed in some embodiments using plesiochronous schemes. Alternative, CDR may be performed in some embodiments using mesochronous schemes. Both schemes are discussed below.

A. Plesiochronous Schemes

In plesiochronous schemes, the clock may be transmitted within the same optical channel in which data is transmitted. Thus, the same TX circuitry and the same RX circuitry are used to transmit/receive data and clock. This may be performed by operating at a slightly higher bandwidth than it would otherwise be necessary to transmit data alone, to account for CDR overhead. Several protocols may be used, including an 8b/10b protocol, a 64b/66b protocol, a 128b/130b protocol, or a 256b/257b protocol. In general, an Xb/Yb protocol transforms X bits of data to a string of Y bit to achieve DC balance to provide enough state changes for clock recovery and data alignment. An example of a DC-balanced data string is one where the difference between the counts of 1 s and 0 s in a string of at least 20 bits may not exceed two and/or such that the number of consecutive 1 s or 0 s (in a row) may be no more than five. DC-balancing may be implemented using a linear-feedback shift register in some embodiments. Clock recovery implemented in accordance with these schemes rely on the transitions of the data (e.g., rising edges and/or falling edges).

The plesiochronous schemes described herein rely on distinct local oscillators (LO), one LO on the transmit side of a channel and one LO on the receive side of the channel. Having distinct LOs may result in clock drift. In some embodiments, clock drift may be compensated using elastic first-input first-output (FIFO) schemes, where the FIFO depth is established by the length of a packet in units of parts per million (PPM).

FIG. 3-1 is a block diagram illustrating a plesiochronous clock distribution scheme, in accordance with some embodiments. In this example, the data path involves communication by a photonic transmitter (TX) 301 positioned in tile 1 to a photonic receiver (RX) 203 positioned in tile 2. Routing between the tiles may be performed using any of the architectures discussed above. The optical communication channel 303 (whether implemented as a bus waveguide of the photonic interposer or as a fiber) supports data using an Xb/Yb protocol. The system includes a local oscillator (LO) 310 on the RX side, and a LO 316 on the RX side. Each LO may include a dedicated crystal, or alternatively the LOs may be fed by a common crystal. Optionally, a PLL may be used to multiply the frequency of LO 310 by a predefined factor, thereby achieving a higher clock frequency. The system further includes an Xb/Yb encoder 312 on the transmit side and a corresponding Xb/Yb decoder 314 on the receive side.

B. Mesochronous Schemes

In mesochronous schemes, the clock is transmitted using a distinct optical channel relative to the data. Having a distinct optical channel may involve a distinct propagation medium (e.g., a distinct waveguide or fiber), or the same propagation medium but a distinct wavelength or polarization.

FIG. 3-2 is a block diagram illustrating a mesochronous clock distribution scheme, in accordance with some embodiments. As in the previous example, the data path involves communication by a photonic transmitter (TX) 301 positioned in tile 1 to a photonic receiver (RX) 203 positioned in tile 2. However, the clock is transmitted using channel 352, and data is transmitted using channels 350. The channels can represent physical propagation media, or distinct wavelengths or distinct polarizations in a common medium. In this scheme, the transmitter includes an LO 310, but the receiver lacks a separate LO. Instead, a PLL 354 recovers the clock based in the signal transmitted through clock channel 352. Optionally, PLL 311 may be used to multiply the frequency of LO 310 by a predefined factor, thereby achieving a higher clock frequency.

VII. Equalization

The inventors have developed techniques to improve data throughput of photonic interposers that involve analog and/or digital equalization. Equalization improves data throughput by decreasing inter-symbol interference (ISI), and as a result, by decreasing bit error rate (BER). Equalization may be performed on the transmitter side of a channel, on the receiver side of a channel (or both). Equalization can amplify high frequency content and allow for lower BER operation. Several types of equalization techniques may be used, including but not limited to pre-emphasis feed-forward equalization (FFE), continuous time linear equalization (CTLE) and discrete feedback equalization (DFE). Photonic interposers leveraging the equalization techniques described herein may be fast enough to support clock frequencies in excess of 10 GHz, 15 GHz or even 25 GHz, which represents a substantial improvement over conventional processors.

FIG. 3-3A is a block diagram illustrating a portion of a photonic interposer configured to perform equalization. On the transmit side, an FFE unit 360 performs pre-emphasis and/or de-emphasis. On the receive side, unit 362 performs DFE and/or CTLE. In some embodiments, the system may determine whether or not to perform equalization (whether FFE, DFE or CTLE) depending on whether communication between tile 1 and tile 2 occurs within a common photonic interposer or spans two distinct photonic interposers. Alternatively, the system may determine whether or not to perform equalization depending on whether communication between tile 1 and tile 2 occurs using a bus waveguide or a fiber.

In addition to deciding whether to apply equalization, in some embodiments the characteristics of the equalizers may be changed adaptively depending upon the nature of the channel. For example, the system may determine the $S_{11}$ and/or the $S_{21}$ parameter of the channel, and based on that information, may adjust the number of taps of DFE/CTLE unit 362. FIG. 3-3B is a block diagram illustrating an example of an adaptive equalizer. An ADC 370, placed at the end of the channel, digitizes the output of the channel by producing state samples y[n], y[n−1], y[n−2], etc. DFE/CTLE unit 362 generates an output w[n] by calculating a linear combination of the state samples y[n], y[n−1], y[n−2], etc. The linear combination can be expressed as follows:

$$w[n] = \sum_{i=0}^{M} c_i y[n-i]$$

where $c_i$ is a coefficient (whether real or complex) representing the channel response. Here, M determines how many previous state samples y[n] are used to implement the equalization. M indicates the number of taps of the equalizer. Where M is a finite number, digital equalizer 400 implements a finite impulse response (FIR) filter. In other embodiments, however, a digital equalizer 400 may implement an infinite impulse response (IIR) filter. Each state sample y[n−i] corresponds to a past (where i>0) or current (where i=0) digitization of the amplitude of the analog signal, and w[n] corresponds to the calculated steady-state output value for the current set of digital inputs. In the example of FIG. 3-3B, DFE/CTLE unit 362 includes a plurality of registers 372, a plurality of digital multipliers 374 and a digital adder 376. Each register 372 records the state sample (y) at a different time. For example, one register may record y[n−1], another register may record y[n−2], etc. The registers allow the equalizer to remember the historical state samples. Digital multipliers 374 multiply a state sample to a corresponding coefficient. One of the digital multipliers, for example, may multiply coefficient $c_1$ times state sample y[n−1]. Digital adder 376 adds the results of the digital multiplications to one another. As a result, output w[n] represents a linear combination of the historical state samples.

Number M—representing the number of taps—may be adjusted dynamically during runtime. This means that instead of transmitting a known signal to analyze the characteristics of the channel, the system relies on the payload itself (data transmitted from the TX to the RX carrying actual information) to adjust the number of taps. Adjusting the number of taps involves varying the number of registers and digital multiplier involved in the equalization. Further, the value of the coefficients $c_i$ may be determined based on the characteristics of the channel.

VIII. Channel Tuning

Some embodiments relate to optical interconnects relying on resonant devices, such as ring or disc modulators, and ring or disc filters. The high index contrast of silicon with respect to silicon oxide leads to very high mode confinement, enabling use of resonant devices with very small footprints while keeping optical losses low. In one example, a ring modulator can have a diameter of less than 5 µm with a quality factor (Q) in excess of $10^5$. Because resonant devices can be made small without sacrificing optical loss, these devices are preferable over other types of modulators and filters when device density is of primary importance (as in the photonic interposers described herein).

Use of resonant devices, however, poses a challenge. A prerequisite for resonant-based operation is that the relationship between the output wavelength of a laser and the resonant wavelength of a resonator remain constant over time. Unfortunately, both the output wavelength of a laser and the resonant wavelength of a resonator are subject to thermal drift—a phenomenon by which a wavelength can vary due to unpredictable changes in local temperature. Further, the resonant wavelength of the resonator can also be subject to non-linear effects, such as two-photon absorption in silicon, especially as the resonator traps light and increases the optical flux density. When the laser's output wavelength and the resonator's resonant wavelength drift relative to one another, the operation of a photonic interposer can degrade significantly.

Figures 1, 2, 3, 4, 4A:
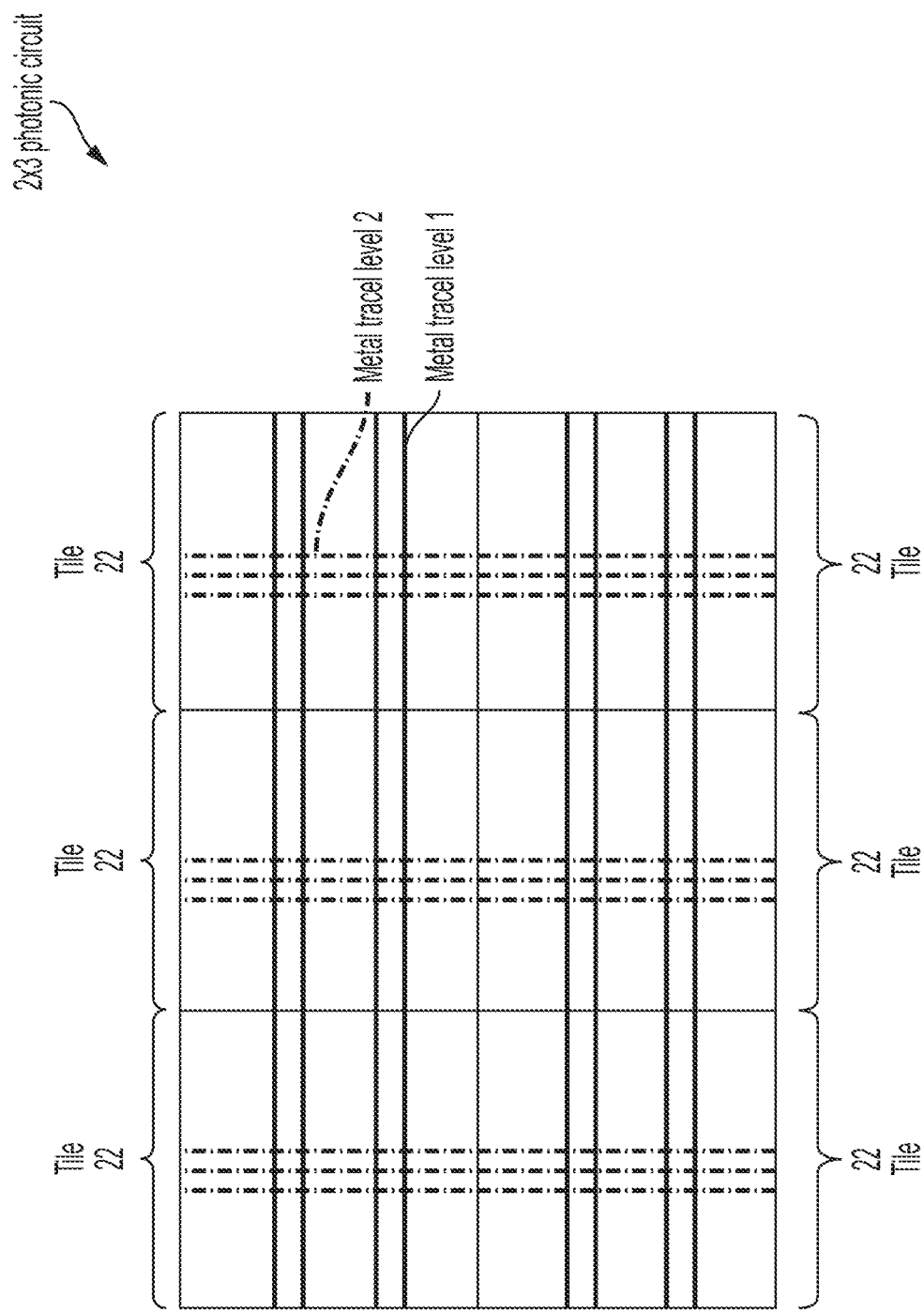

The inventors have developed techniques to lock resonant devices notwithstanding the presence of thermal drift. FIG. 3-4A through 3-4C illustrate a sequence for locking the wavelength of a transmitter. As shown in FIG. 3-4A, the transmitter of this example can transmit data along bus waveguide 410 either in one direction or in the opposite direction. The transmitter includes a resonant modulator 400, a modulator driver 402, a heater 404, an MZI 406, monitoring detectors 411, 412, 413 and 414, and a resonant add filter 408 coupled to bus waveguide 410. Modulator driver 402 drives modulator 400 with the data. As a result, the light provided by the laser is modulated with the data. Depending on which output of the MZI is selected, the modulated light is coupled to the bus waveguide either in one direction (e.g., from right to left) or in the opposite direction (e.g., from left to right). The add filter ensures that the data to be added to the bus waveguide is at the desired wavelength, thus allowing bus waveguide 410 to support WDM. In this example, the add filter is a second order filter designed to flatten the frequency response across the passband of interest.

The first tuning step is illustrated in FIG. 3-4A. Here, a signal in the form of a linear ramp controls heater 404, thereby causing a shift in the resonant frequency of modulator 400. As the modulator is being ramped, a controller (not shown in FIG. 3-4A) monitors the output of detectors 414 and 412 (e.g., the sum of the outputs). By determining the point at which the output of the detectors is maximized, it can be determined what value of the ramp leads to the modulator being locked to the laser. Sweeping the modulator in this way ensures that the resonant wavelength of the modulator is tuned (or only slightly off-tuned) with respect to the wavelength of the laser. In the following steps, the heater is driven at the value that maximizes the outputs of detectors 414 and 412.

Figures 1, 2, 3, 4, 4B:
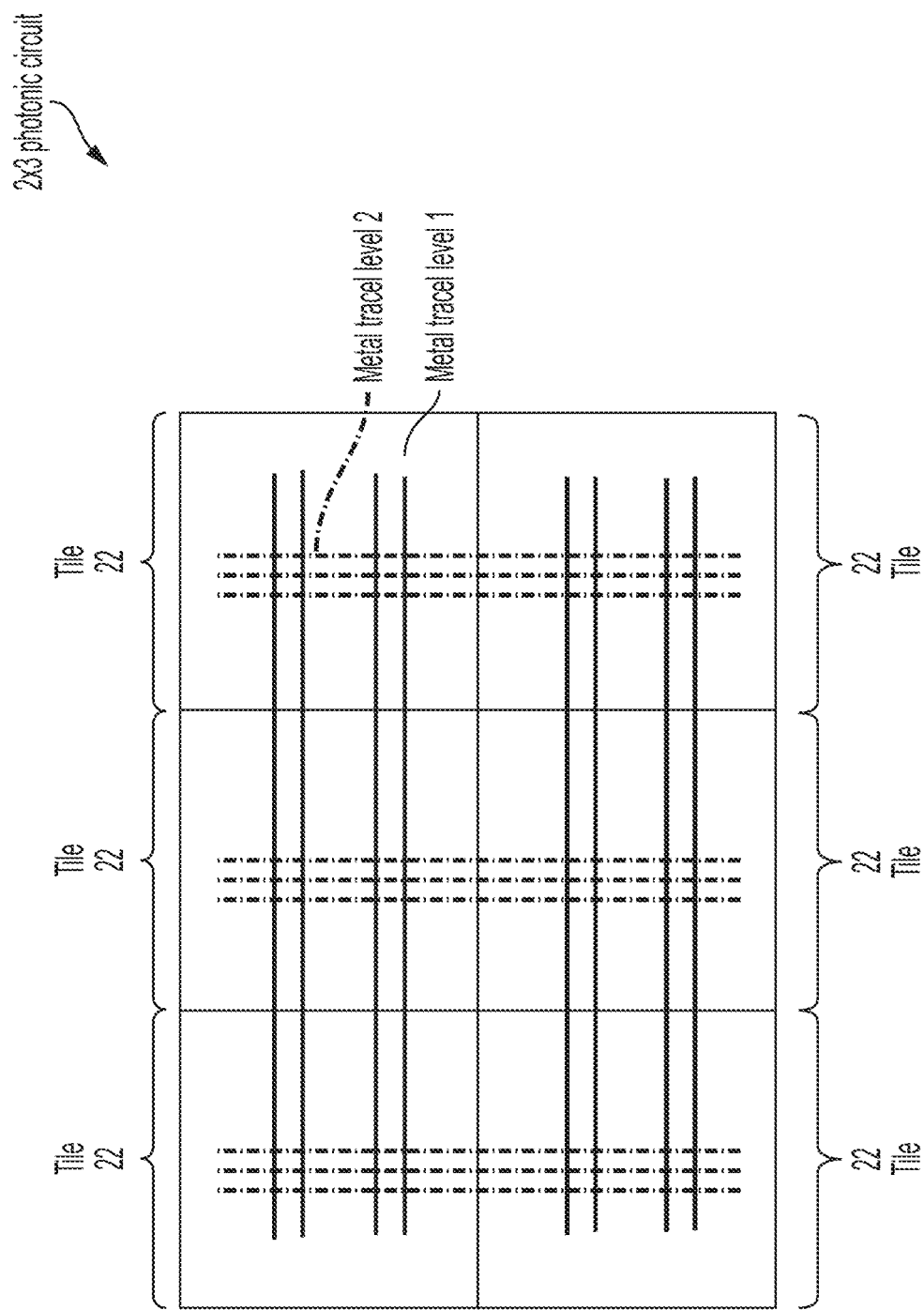

The step illustrated in FIG. 3-4B involves tuning MZI 406. This step ensures that 100% (or nearly 100%) of the output optical power of the modulator is transmitted either in one direction of the bus waveguide or in the other. This is to avoid sending data in the wrong direction of the bus waveguide. At this step, a signal in the form of a linear ramp controls MZI 406, thereby causing a shift in the percentages of power emerging from the outputs of the MZI. As the MZI is being ramped, the controller monitors the output of detector 414 or detector 412, depending on the desired direction of transmission. For example, if the desired direction is from right to left, the controller monitors the output of detector 414. By determining the point at which the output of detector 414 is minimized, it can be inferred that all the power is transmitted in the desired direction. By contrast, if the desired direction is from left to right, the controller monitors the output of detector 412.

Figures 1, 3:
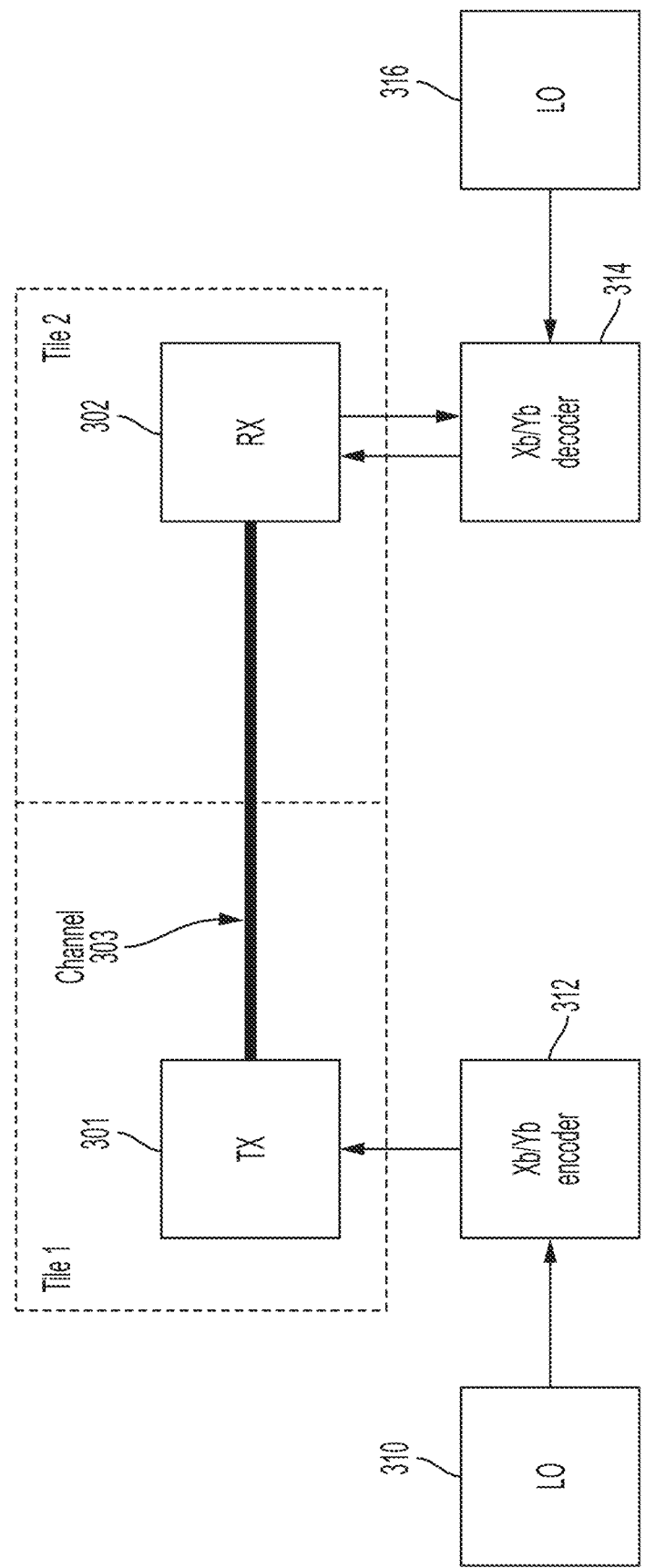
Figures 2, 3:
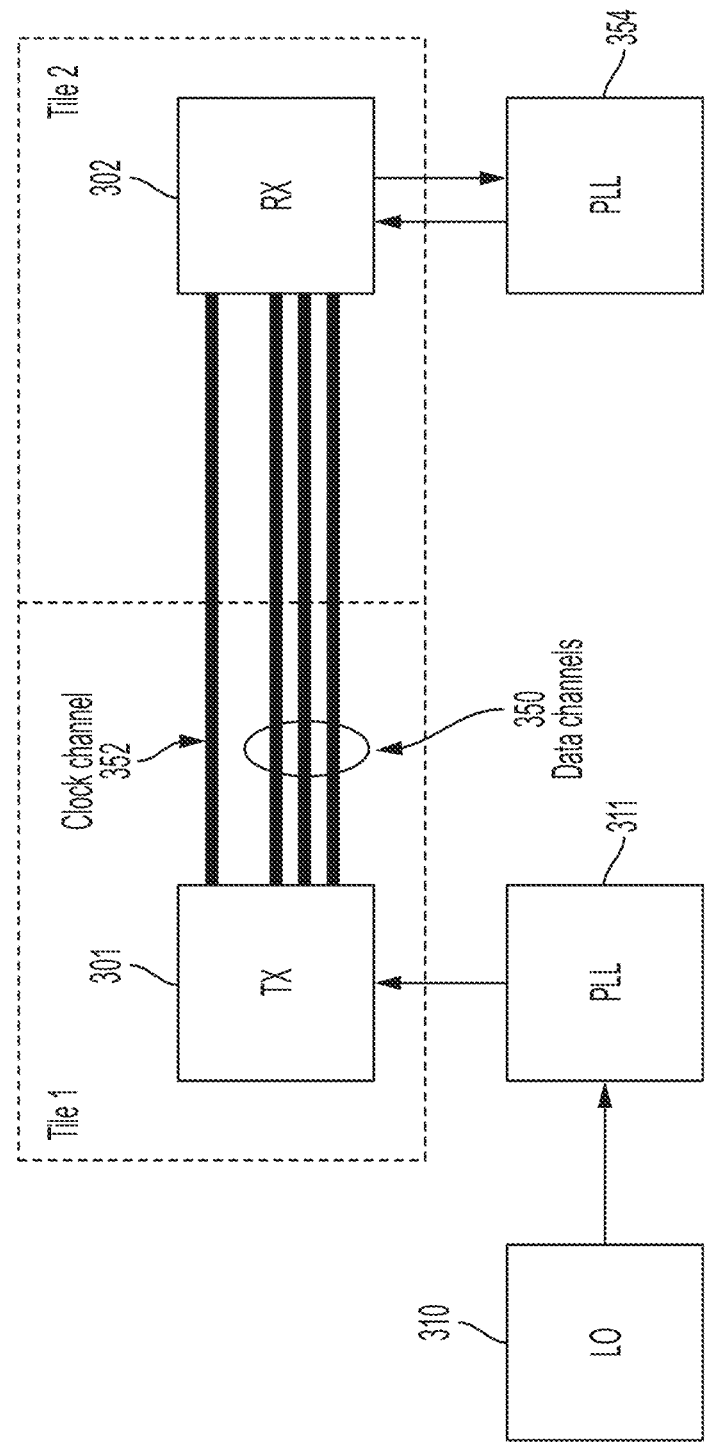
Figures 3, 3A:
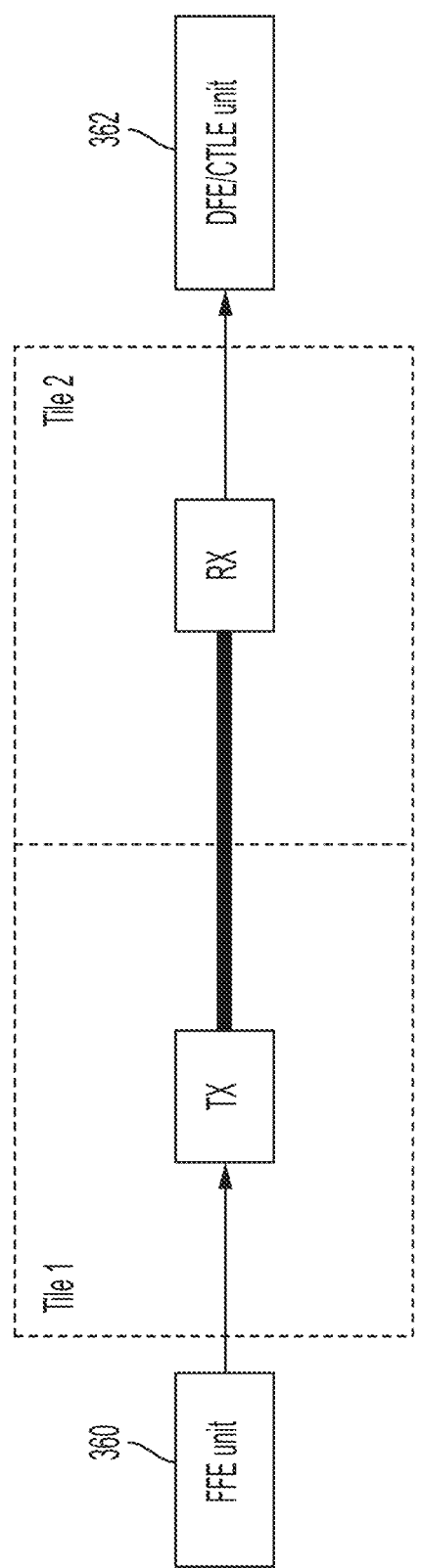
Figures 3, 3B:
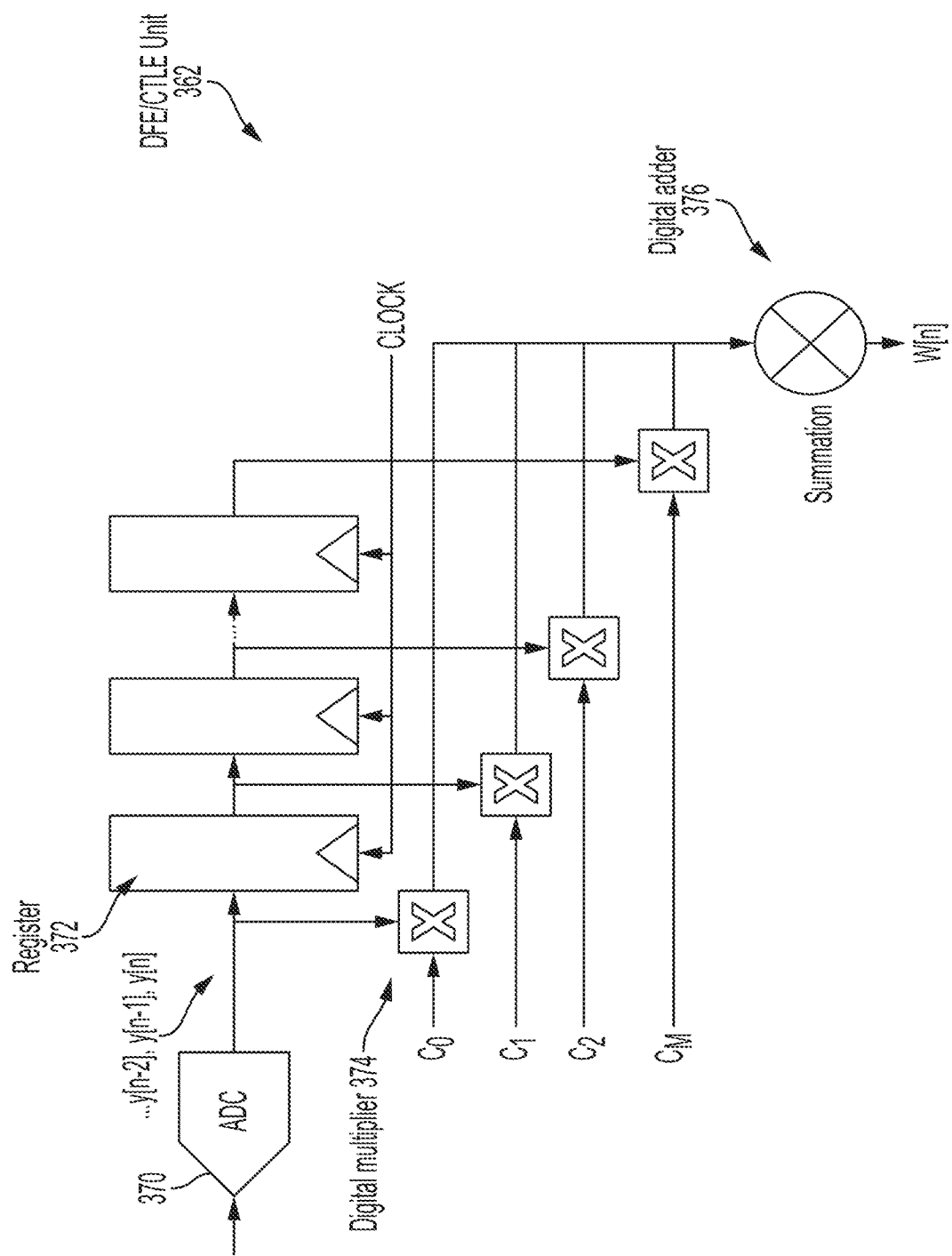
Figures 3, 4, 4B:
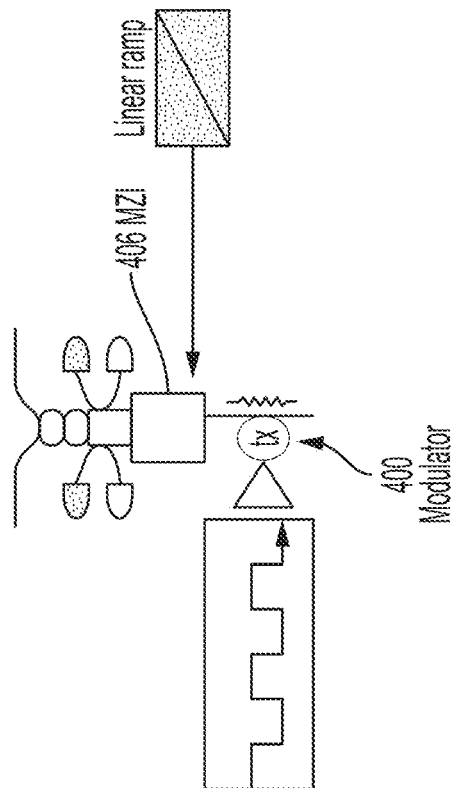
Figures 3, 4, 4C:
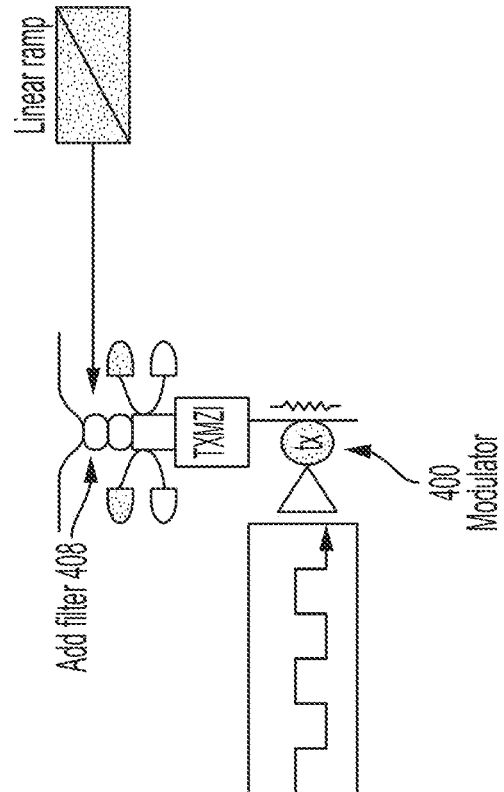
Figures 3, 4, 4A:
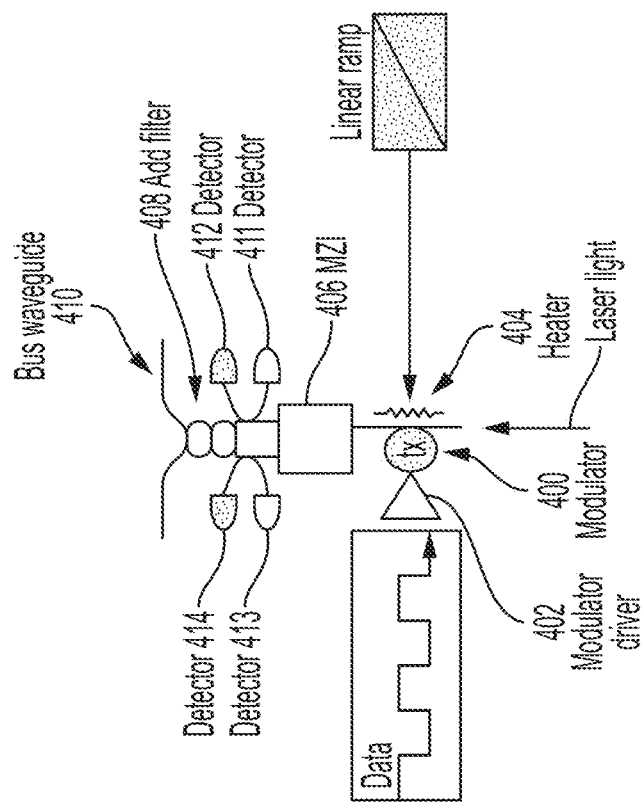
Figures 3, 4, 5, 5A:
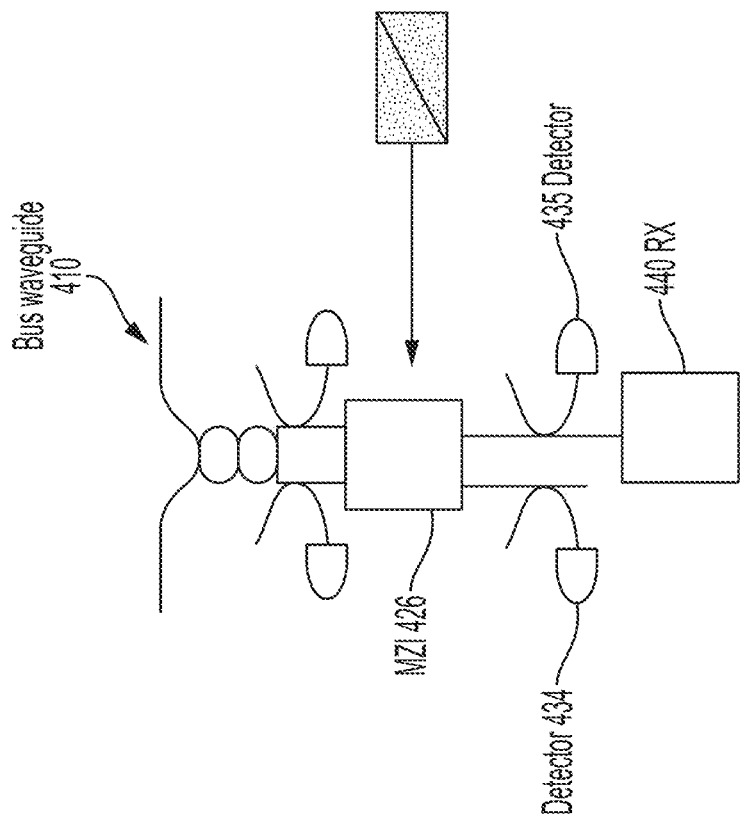
Figures 3, 4, 5, 5B:
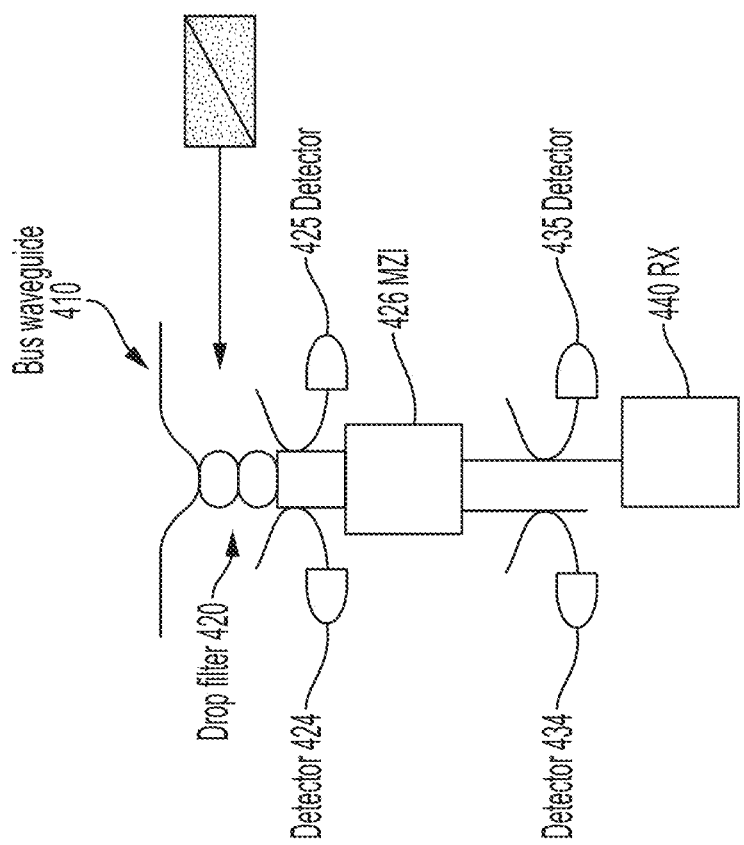
Figures 3, 4, 5, 6, 6A:
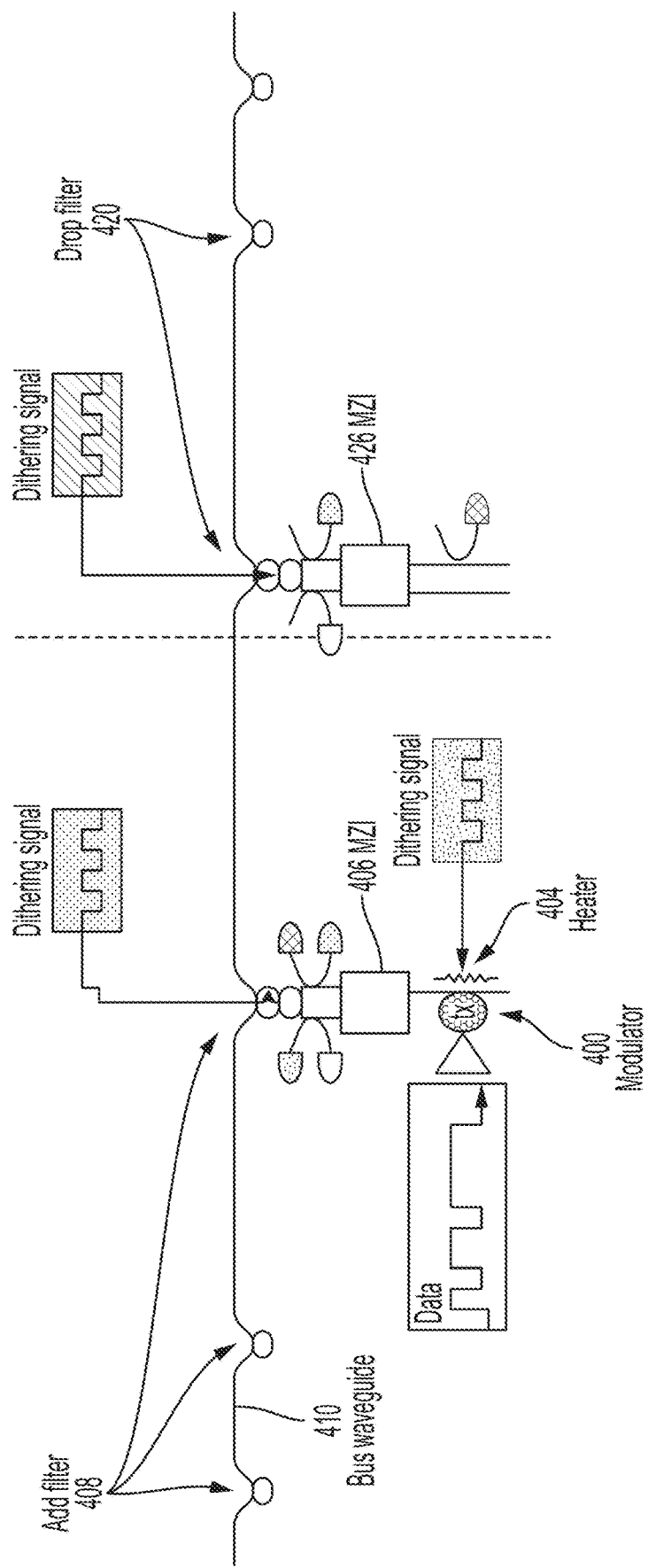
Figures 3, 4, 5, 6, 6B:
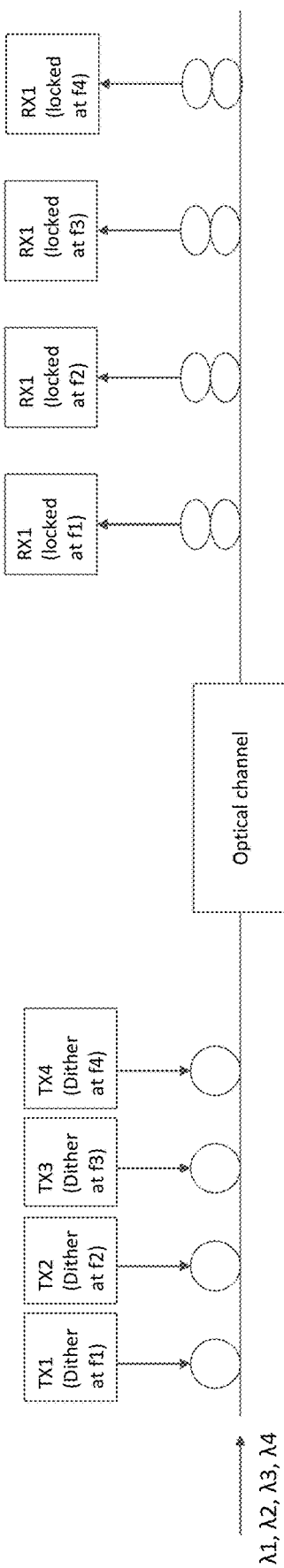
Figures 1B, 4:
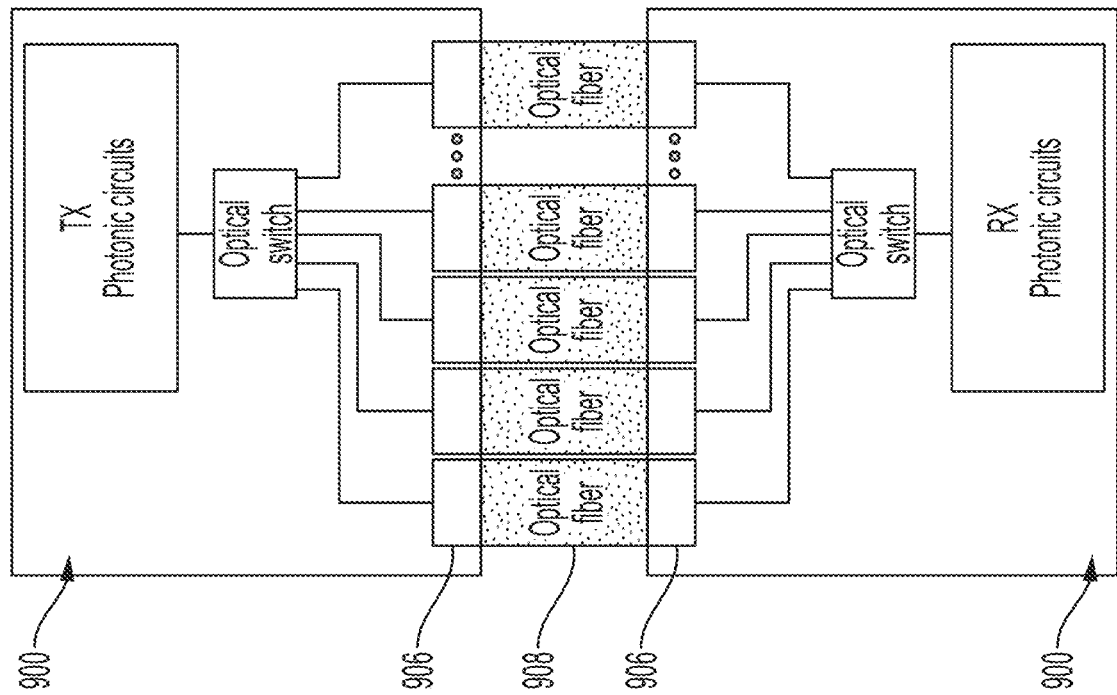
Figures 1A, 4:
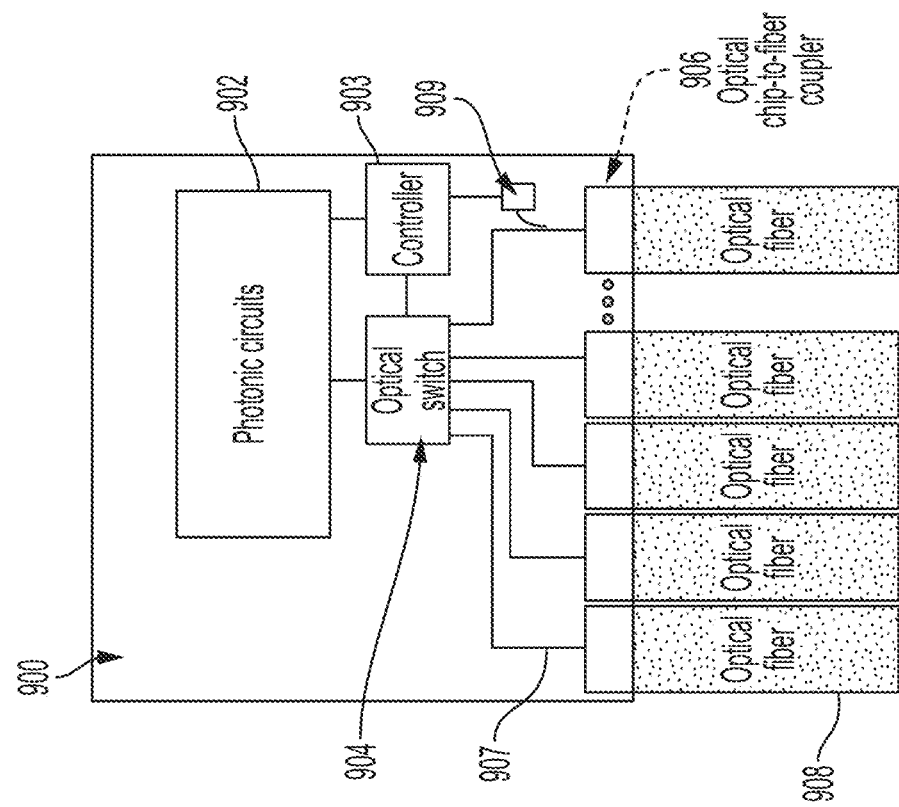
Figures 1C, 4:
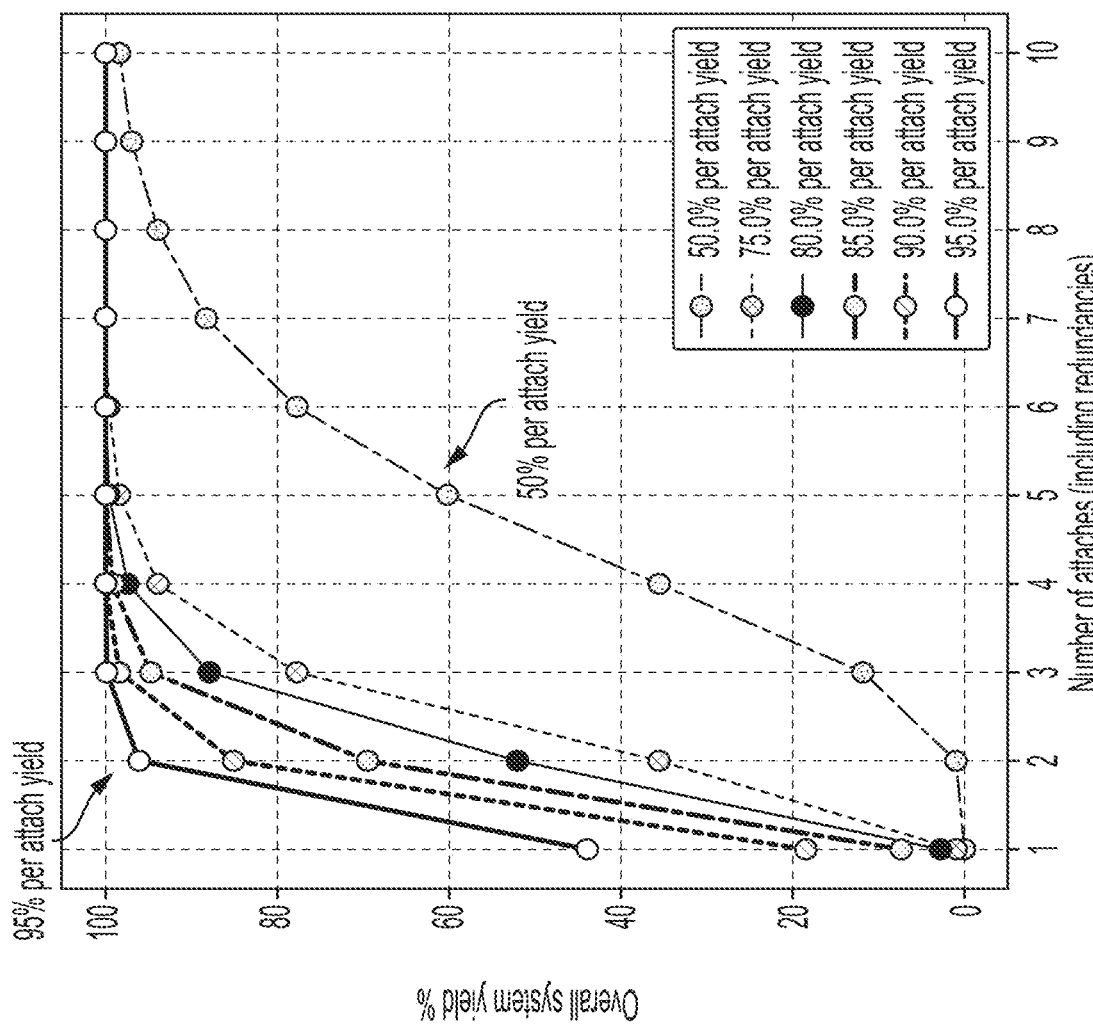
Figures 2, 4:
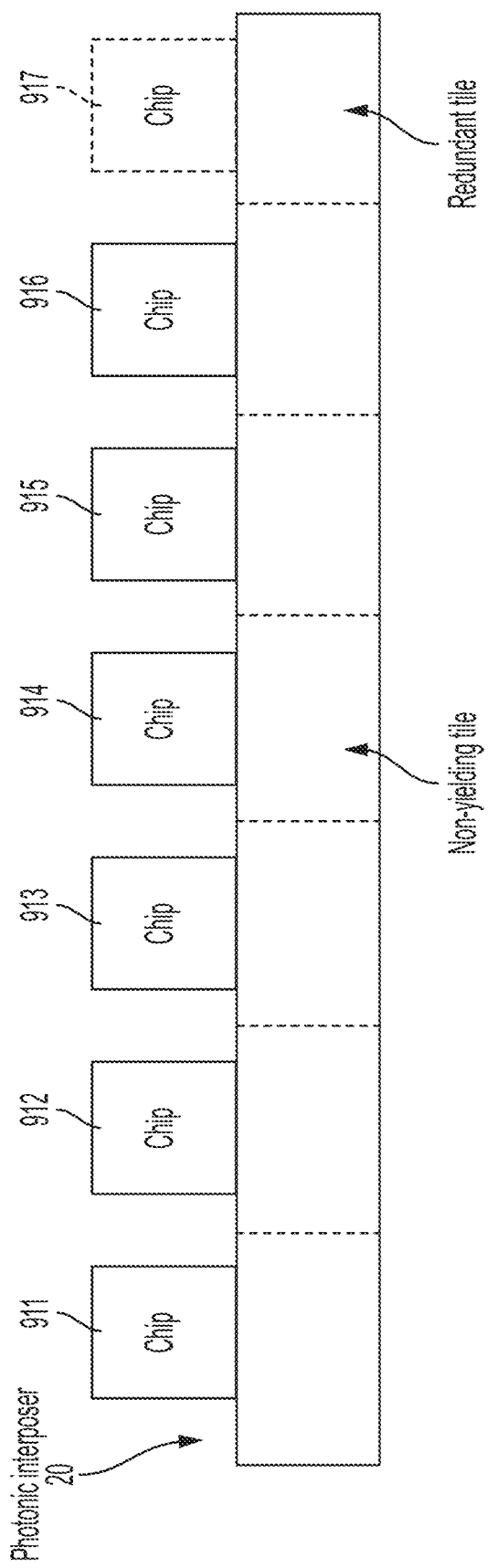
Figures 3, 4:
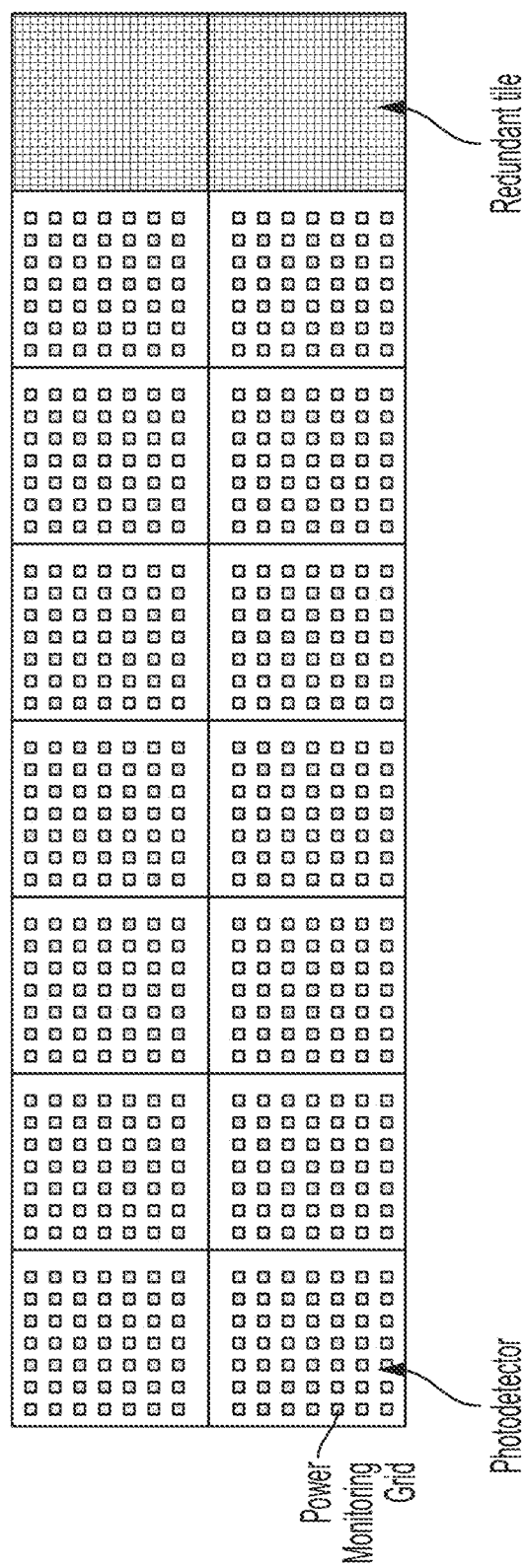
Figures 2A, 5:
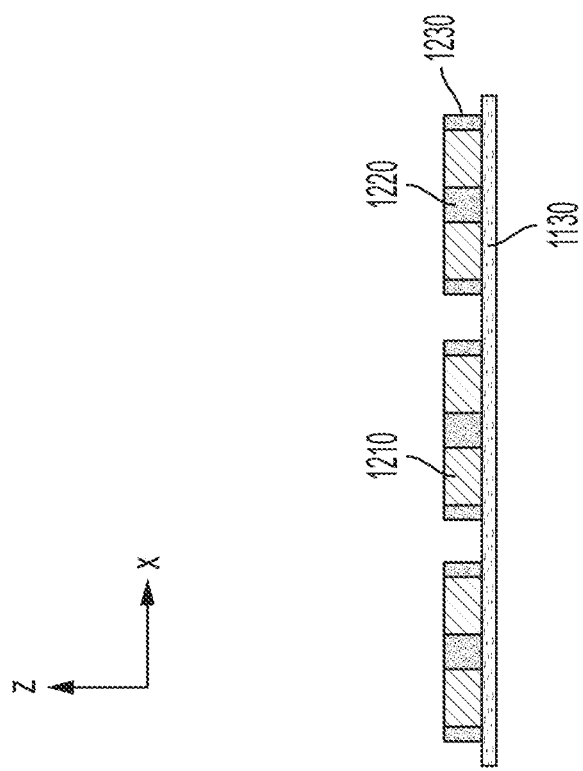
Figures 2B, 5:
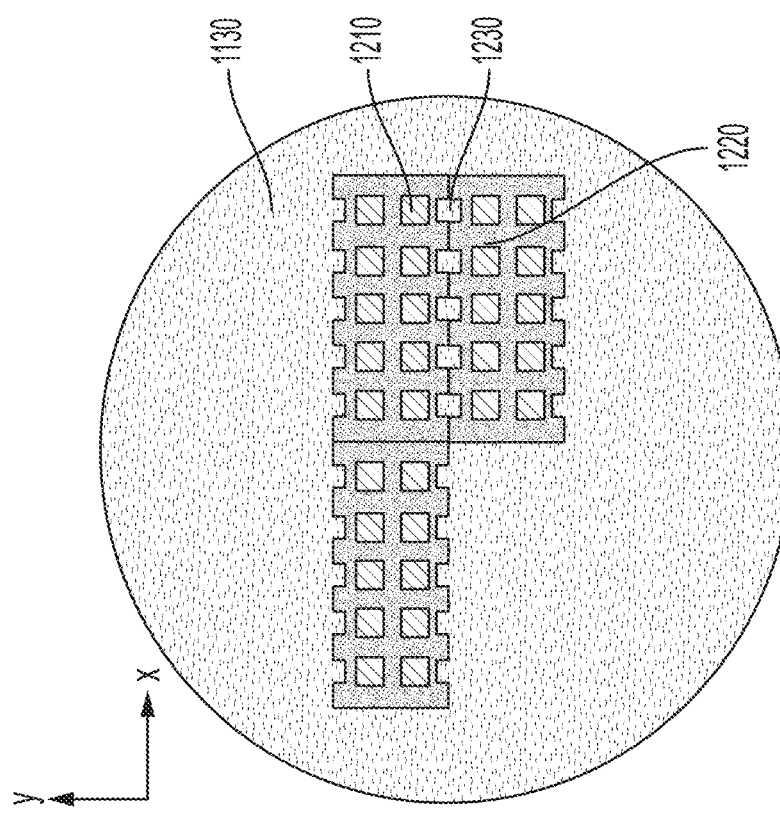
Figures 3A, 5:
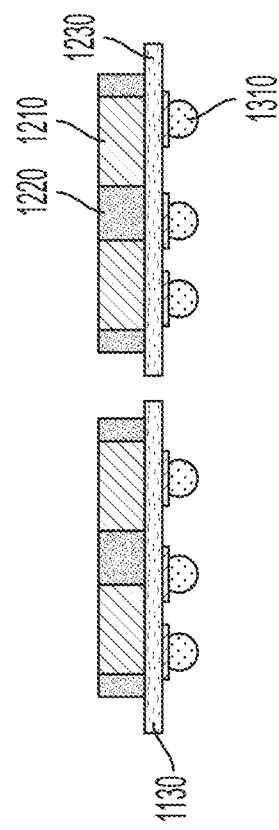
Figures 3B, 5:
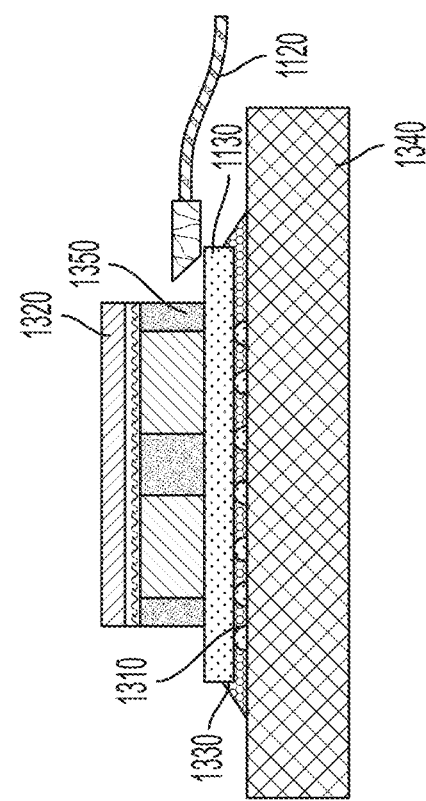
Figures 4, 5:
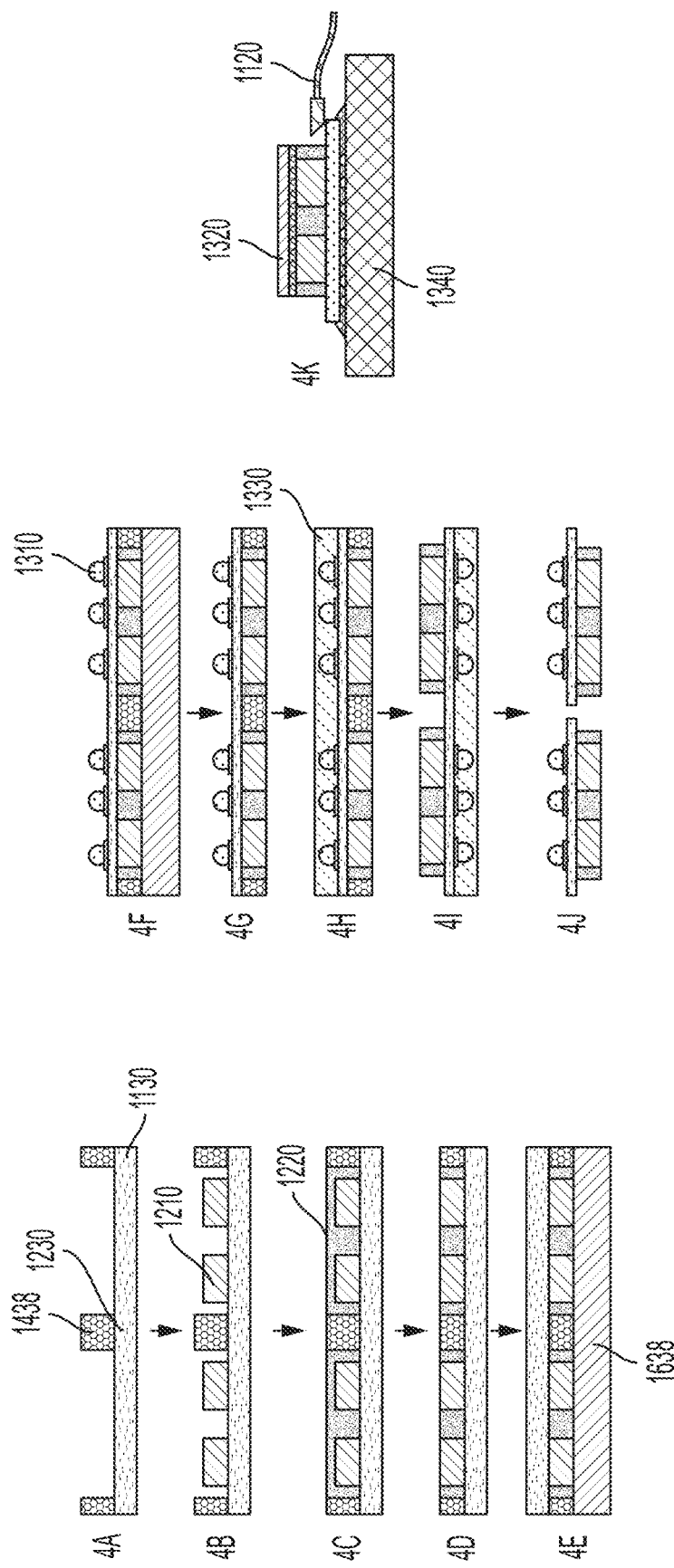
Figure 5:
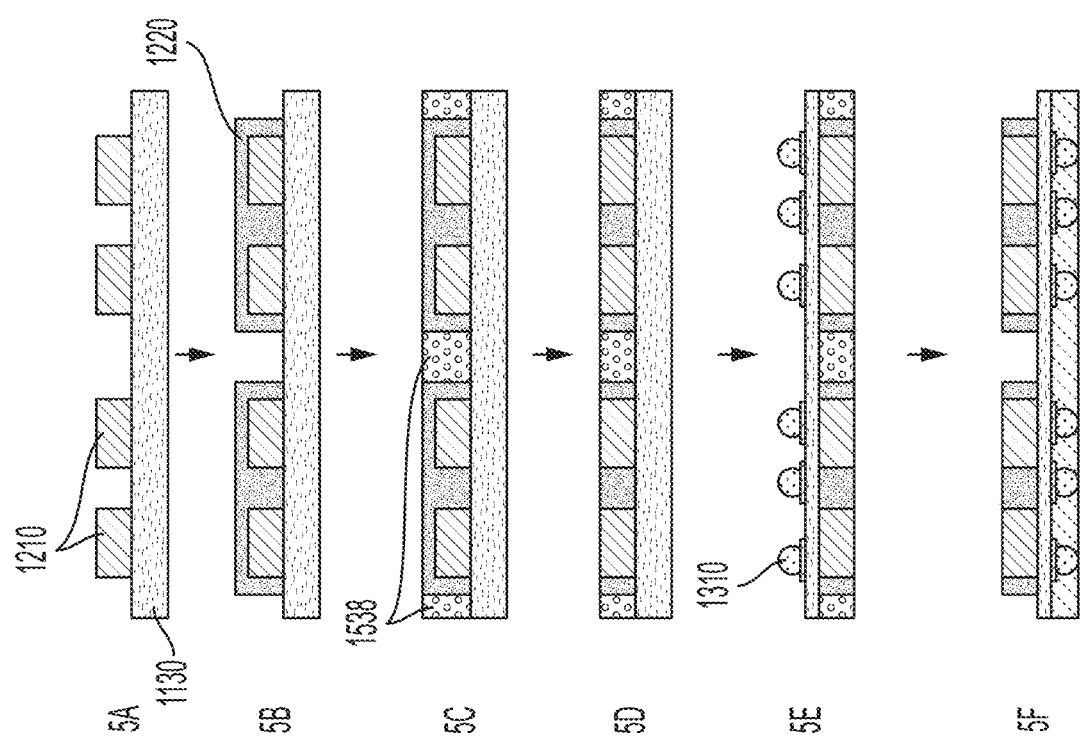
Figures 5, 6:
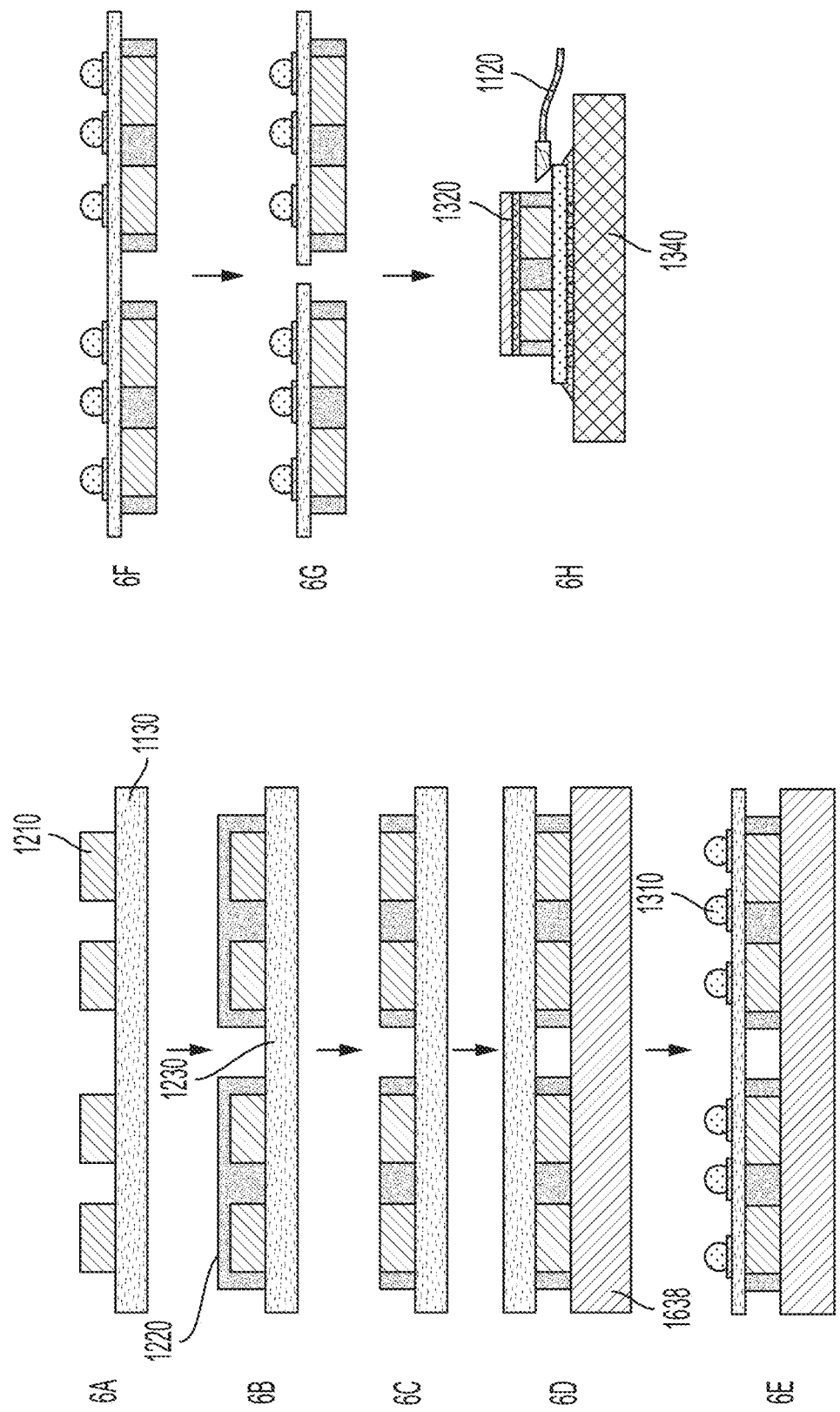
Figures 5, 6, 7:
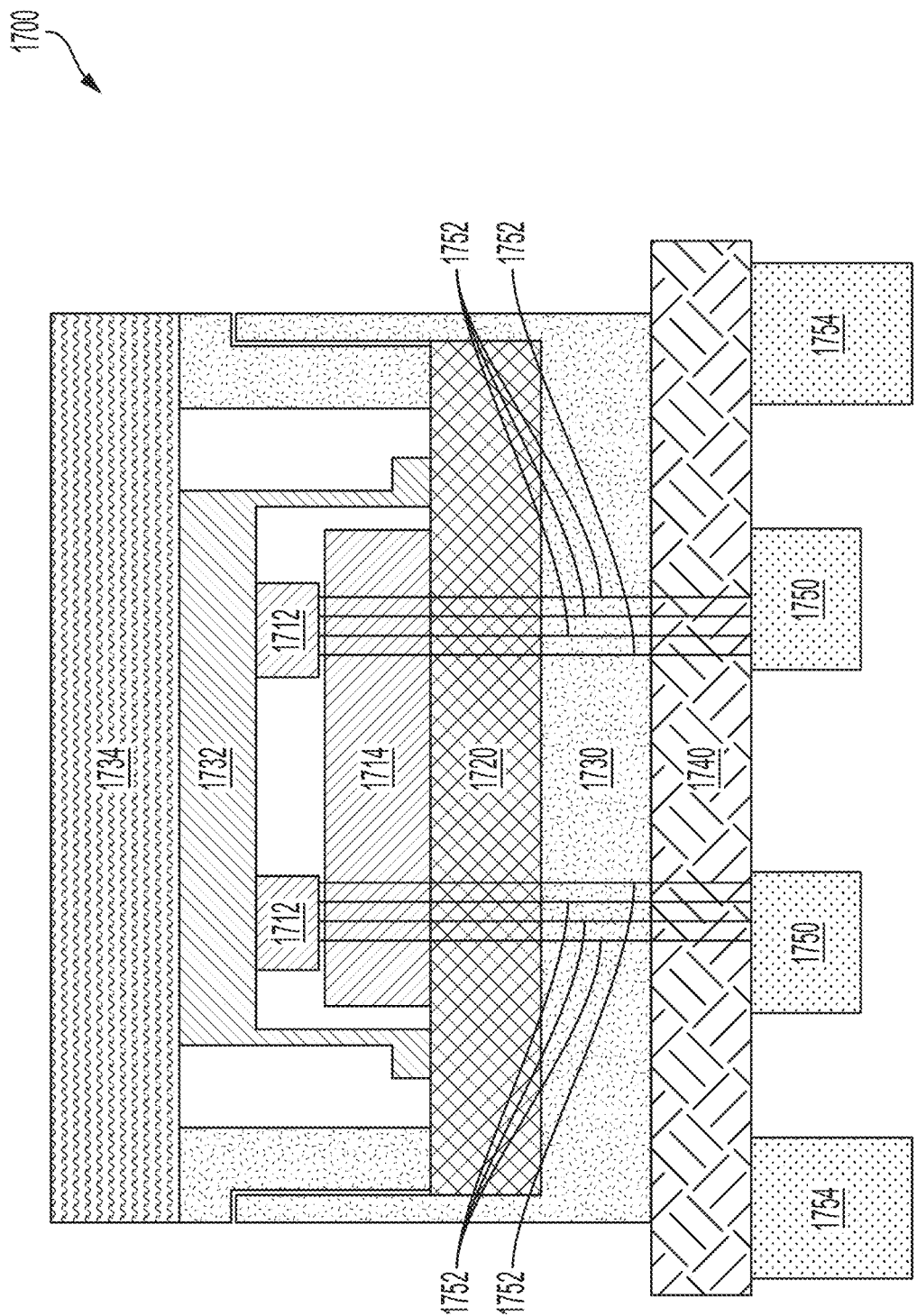
Figures 5, 6, 7, 8, 8A:
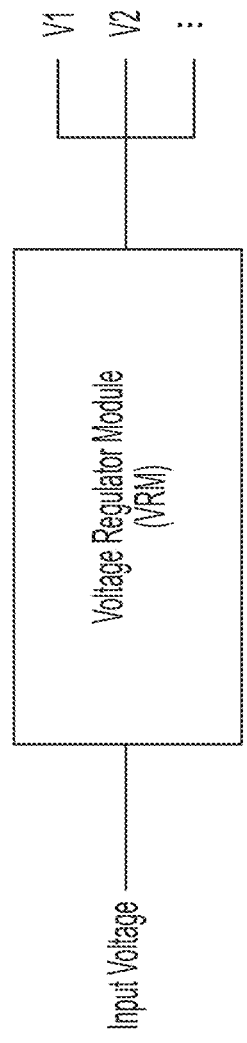
Figures 5, 6, 7, 8, 8B:
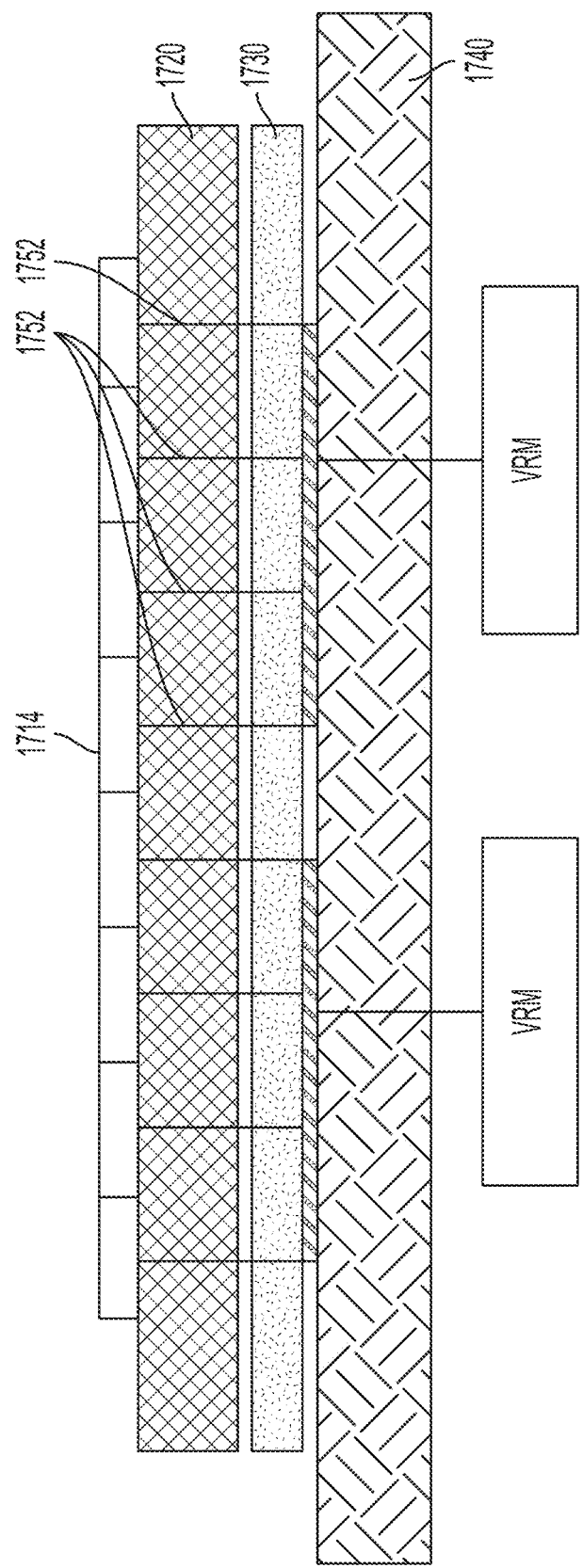

The step illustrated in FIG. 3-4C involves tuning the add filter 408. As for modulator 400, a heater (not shown in FIG. 3-4C) may be placed near the add filter to cause a wavelength change when a signal is applied. Tuning the filter ensures that the desired wavelength is transmitted on the bus waveguide. At this step, a signal in the form of a linear ramp controls the heater near add filter 408, thereby causing a shift in the resonant frequency of the filter. As the filter is being ramped, the controller monitors the output of detector 413 or detector 411, depending on the desired direction of transmission. For example, if the desired direction is from right to left, the controller monitors the output of detector 411. By determining the point at which the output of detector 411 is minimized, it can be inferred that all the power is transmitted in the bus waveguide at the desired wavelength. By contrast, if the desired direction is from left to right, the controller monitors the output of detector 413. If, after the step of FIG. 3-4C, it is determined that MZI 406 is no longer properly tuned, the controller may repeat the step of FIG. 3-4C and/or step of FIG. 3-4B.

FIGS. 3-5A and 3-5B illustrate a sequence for tuning a receiver. As shown in FIG. 3-5A, the receiver of this example can receive data transmitted along bus waveguide 410 either from one direction or from the opposite direction. Resonant drop filter 420 is the counterpart of resonant add filter 408 in that it selects which wavelength to convey to the receiver, thus allowing the bus waveguide to support WDM. In this example, the drop filter is a second order filter designed to flatten the frequency response across the passband of interest. Monitoring detectors 424 and 425 monitor the status of the drop filter. MZI 426 determines the direction from which to receive data, whether from the left or from the right. Monitoring detectors 434 and 435 monitor the status of the MZI. Receiver 440 includes a photodetector and electronic receiver circuitry (e.g., a trans-impedance amplifier and an ADC).

The step illustrated in FIG. 3-5A involves tuning the drop filter 420. As for modulator 400, a heater (not shown in FIG. 3-5A) may be placed near the drop filter to cause a wavelength change when a signal is applied. Tuning the filter ensures that the desired wavelength is received from the bus waveguide. At this step, a signal in the form of a linear ramp controls the heater near drop filter 420, thereby causing a shift in the resonant frequency of the filter. As the filter is being ramped, the controller monitors the output of detector 413 or detector 411, depending on the desired direction of transmission. For example, if the desired direction is from left to right, the controller monitors the output of detector 425 and/or the output of detector 424. By determining the point at which the output of detector 425 is maximized and/or the output of detector 424 is minimized, it can be inferred that all the power received from the bus waveguide is at the desired wavelength. By contrast, if the desired direction is from right to left, the controller monitors the output of detector 424 to be maximized and/or the output of detector 425 to be minimized.

The step illustrated in FIG. 3-5B involves tuning MZI 426. This step ensures that 100% (or nearly 100%) of the optical power provided to the receiver is received either from one direction or the other. This is to avoid receiving data from the wrong direction of the bus waveguide. At this step, a signal in the form of a linear ramp controls MZI 426, thereby causing a shift in the percentages of power accepted from the inputs of the MZI that are ultimately transferred to RX 440. As the MZI is being ramped, the controller monitors the output of detector 434 or detector 435. By determining the point at which the output of detector 435 is maximized and/or the output of detector 434 is minimized, it can be inferred that all the power is received from the desired direction.

Leveraging the resonant nature of a wavelength-division multiplexed transmission discussed above, the inventors have further developed techniques that involve dithering to allow a receiver to uniquely identify a particular transmitter. Dithering involves modulating a resonant component with a relatively slow frequency (e.g., between 1 KHz and 1000 KHz)) to uniquely identify signals that have propagated through that component. The slow frequency, in some embodiments, should be supported by the modulating element, such as a thermo-optic heater. In essence, a component marks a signal with a signature in the form of a particular dithering frequency. Each component can be dithered with a slightly different frequency. Component identification becomes particularly important in architectures having several components in series. In some embodiments, detectors can rely on dithering frequencies to identify which transmitter has transmitted certain data. In one example, a dithered signal is used to lock the drop filter of a receiver to a particular modulator. It is important to note that the dithering signal can be applied to non-resonant elements (e.g., MZIs as in component 406) associated with the transmission of a specific wavelength.

FIG. 3-6A illustrates a technique for locking a receiver to a particular transmitter using dithering, in accordance with some embodiments. In this example, multiple transmitters and multiple receivers are coupled in series along the length of bus waveguide 410. The transmitters are coupled to the bus waveguide via add filters 408, and the receivers are coupled to the bus waveguide via drop filters 420. The architecture of the transmitters is similar to the one shown in FIG. 3-4A, and the architecture of the receivers is similar to the one shown in FIG. 3-5A. In this case, the signals that are to be maximized/minimized by the detectors (424 and 425) in the RX device have been dithered. Analog circuits can be built to capture the signals at the specific dither frequency, for example using homodyne or heterodyne circuits, where the local oscillator can be generated locally by the RX device. Other TX-RX transmission pairs in the series will be using a different dither frequency. Care must be taken such that the different dither frequencies are not rational fractions of one another, e.g., f1/f2 are not rational fractions a/b where a and b are integers. Therefore, by using signals at the specific dither frequency associated to a specific TX-RX transmission pair, the components in and between the TX-RX transmission pair may be locked to the correct pair (and not be confused by signals from the other TX-RX pair). In some embodiments, the drop filter of a receiver may be locked to the modulator of a particular transmitter by dithering the modulator at some frequency and then having the (main and tap) detectors in the RX device to maximize/minimize the signals at that specific frequency. Furthermore, in some embodiments, multiple components in the same TX-RX transmission link can be dithered using the same dither frequency such that all the detectors in the TX-RX transmission link need to only generate a single dither frequency to lock to. In other embodiments, the different components in the same TX-RX transmission link can be dithered at different frequencies such that the detectors in the TX-RX link can distinguish the error signals of the different components along the link. The dither frequencies may be slower than the frequency of the crystal oscillators (in the MHz regimes) typically used for building PLL.

In some embodiments, FIR digital bandpass filters (not shown in FIG. 3-6A) programmed to identify a particular dithering frequency may be coupled a detector. In these embodiments, locking between a transmitter and a receiver may involve programming an FIR digital bandpass filter to only accept signals that are dithered at a particular frequency.

FIG. 3-6B illustrates an optical channel supporting communication between multiple transmitter-receiver pairs. Transmitter TX1 and receiver RX1 form a pair—data transmitted by TX1 is directed to RX1. Transmitter TX2 and receiver RX2 form another pair—data transmitted by TX2 is directed to RX2. Transmitter TX3 and receiver RX3 form another pair—data transmitted by TX3 is directed to RX3. Transmitter TX4 and receiver RX4 form another pair—data transmitted by TX4 is directed to RX4. Each TX-RX pair uses a unique dither frequency (f1 for TX1-RX1, f2 for TX2-RX2, f3 for TX3-RX3 and f4 for TX4-RX4). Each pair may use a unique wavelength in the optical channels: $\lambda 1$, $\lambda 2$, $\lambda 3$ and $\lambda 4$.

IX. Redundancy

The inventors have recognized and appreciated that the finite yields associated with microscale manufacturing processes can negatively affect the scalability of photonic interposers. The yield associated with a manufacturing process represents the fraction of components that are not defective divided by the total number of manufactured components. The yield of a manufacturing process is generally less than 100%, and is attributable to a variety of factors, including for example equipment performance, system complexity and operator capability.

Some types of defects can impair the functionality of a photonic circuit. When light encounters one of these defects, partial or complete loss of optical power can result. Other types of defects can impair the functionality of an electronic circuit and/or wiring that is part of a tile (e.g., a modulator driver or a trans-impedance amplifier). When an electric signal encounters one of these defects, signal attenuation or complete loss can result.

A. Fiber Attach Redundancy

The impact of limited yield in fiber attaches can be particularly severe. Fiber attaches enable photonic integrated circuits (photonic interposers being an example) to communicate with the outside world using optical fibers. Fiber attach can be performed using passive or active processes. In passive processes, a fiber is attached to a chip without any feedback on whether and to what extent light is being coupled. In active processes, the chip provides feedback, which can be used to improve the optical alignment before the fiber is secured to the chip. Active processes provide higher coupling efficiencies than passive processes, but they are more expensive. Unfortunately, both types of process have finite yields. Further, chip operators cannot determine whether a fiber attach yields or not until the package has been completely (or almost completely) assembled. This is because fiber attach is among the last process steps in the packaging of a photonic integrated circuit.

Whether through edge coupling, vertical coupling, or using v-grooves, the yield in industry contexts is still at ~95% when attaching multiple (16 or 32) fibers at once. Fiber attaches of the types described herein refer to attaching either a single fiber (e.g., a single-mode, a polarization maintaining, or a multi-core fiber) or an array of fibers (e.g., a v-groove fiber array or a ribbon of fibers). Applications that require many fibers, such as in optically interconnected servers, require higher fiber attach yields. If a particular system requires N attach sites to yield, then the yield rate of the system is $(p)^N$, where p is the probability that an attach site yields. Even when p~90%, the yield rate drops rapidly to ~20% for N=16. A more fault-tolerant attach strategy is required to increase the yield rate of the system. The current focus is in increasing the yield of the fiber attach itself by introducing new packaging processes, such as better index-matched epoxy/glue or better active alignment during the attach process. However, these processes are often insufficient.

The inventors have developed a way to increase the yield of fiber attaches that involves fiber redundancy. This can be accomplished by having more fiber attaches than what is needed to operate a photonic integrated circuit. A controller identifies, among all the fiber attaches, which fiber attach or which subset of the fiber attaches provide better performance. Those fibers are utilized during operation of the chip, and the other fibers remain unused. This process can be performed in real time, thus allowing the controller to continue to monitor the quality of the fiber attaches during operation.

FIG. 4-1A illustrates a photonic integrated circuit (PIC) 900 having photonic circuits 902 and multiple fiber attaches.

PIC 900 may represent, for example, any one of the photonic interposers described herein. In these embodiments, the photonic circuits 902 may include tiles, transceivers and photonic interconnections, as described above. However, fiber redundancy may be used in connection with any type of PIC. On each attach site, a fiber 908 couples to a waveguide 907 of the PIC via an optical chip-to-fiber coupler 906 (e.g., an edge coupler, a v-groove, a grating). As shown, instead of having only a single fiber attach, an additional k−1 fiber attaches (for a total of k fiber attaches) are provided. An optical switch 904 on the PIC selects which of the k fiber attaches is (are) to be used for the operation of the PIC. A controller 903 monitors the performance of each fiber attach, and controls the operation of optical switch 904.

Different schemes may be used to monitor the performance of a fiber attach. In one example, photodetectors 909 coupled to the waveguides 907 using tap couplers monitor the optical power present in the waveguides (only one photodetector 909 is shown in FIG. 4-1A). Photodetectors 909 provide information indicative of the optical power present in the various waveguides 907 to controller 909. On the basis of this information, controller 909 may determine which subset of the k fiber attaches provides the best performance (could be one or more fiber attaches). Controller 909 may then control optical switch 904 to select the waveguide(s) corresponding to the best performing fiber attach subset. In another example, photonic integrated circuits 902 may include a system for monitoring the quality of the channels corresponding to the various fiber attaches. For example, photonic integrated circuits 902 may monitor the bit error rate (BER), the eye diagram quality factor, the power and/or the signal-to-noise ratio (SNR) associated with each channel. In this example, controller 909 may control optical switch 904 to select one waveguide after another in a sequential fashion, thus allowing photonic circuits 902 to monitor the quality of each channels individually. Photonic circuits 902 provide information indicative of the quality of the various channels to controller 909. On the basis of this information, controller 909 may determine which subset of the k fiber attaches provides the best performance (could be one or more fiber attaches). Controller 909 may then control optical switch 904 to select the waveguide(s) corresponding to the best performing fiber attach subset. In some embodiment where the fiber attach performance can be measured prior to the final system assembly, the worse performing fiber attach subset does not need to be connected to other optical devices or connectors. In other embodiment, where the fiber attach performance cannot be measured prior to final assembly, all fiber attachments can be performed and the subset selection can be performed subsequently.

The redundancy scheme described in connection with FIG. 4-1A may be used whether PIC 900 is used as a transmitter or as a receiver. FIG. 4-1B is a block diagram illustrating a pair of PICs 900 connected to one another using k fibers, some of which are provided solely for redundancy. One PIC operates as a transmitter; in this PIC, photonic circuits 902 operate as TX photonic circuits. The other PIC operates as a receiver; in this PIC, photonic circuits 902 operate as RX photonic circuits. The respective controllers 909 monitor the quality of the fiber attaches, and control the respective optical switches 904 to select the waveguide(s) corresponding to the best performing fiber attach subset.

If the probability that an individual fiber attach operates properly is p, the overall probability that at least one among the k fiber attaches operates properly using fiber redundancy is equal to $1-(1-p)^k$. This amount is invariably larger than p, thus improving the yield. Consider for example a system that requires 16 functional fiber attach sites to yield. By using redundant fiber attaches on each attach site, the system yield can be increased close to 100% even when the success probability of a fiber attach is low. The result is shown in FIG. 4-1C. FIG. 4-1C illustrates the overall system yield (in %) of a system with 16 fiber attach sites as a function of the number of attaches on each site. Having a single attach (1 on the x-axis) means that no redundant fiber attaches are employed. Having N attaches (N on the x-axis) means N-1 redundant fiber attaches are employed. As can be appreciated from this figure, the overall system yield approaches 100% as the number of attached is increased, regardless of the initial probability that a fiber attach operates properly.

B. Tile Redundancy

The inventors have further appreciated that not all the tiles of a photonic interposer may yield. Some of the tiles, for example, may have defective transmitters, receivers, interconnects and/or switches. This can negatively affect the performance of a network in that the electronic chip that is mounted on the defective tile may become unusable. Additionally, not all the electronic chips mounted on a photonic interposer may yield. To obviate these issues, the inventors have developed a scheme that involves tile redundancy.

FIG. 4-2 illustrates a photonic interposers having multiple tiles, one of which is provided for redundancy. Electronic chips 911, 912, 913, 914, 915 and 916 are mounted on photonic interposer 20 in correspondence with respective tiles. Optionally, a further electronic chip 917 may be disposed on the redundant tile. Chip 917 may also be provided for redundancy in the event that one of the other electronic chips does not operate properly. For example, chip 917 may be a copy of one of the other chips. In this example, the tile corresponding to chip 914 does not yield. In response, the photonic interposer may be reconfigured to functionally swap the non-yielding tile with the redundant tile. Leveraging the programmable interconnects described above, optical signals directed to the non-yielding tile can be redirected to the redundant tile. Optionally, redundant chip 917 may be used in lieu of chip 914.

In some embodiments, wafer-level testing may be used to determine whether the tiles of a photonic wafer yield. This approach allows operators to determine the quality of a wafer without having to test distinct portions of the wafer individually. The drawback of this approach is that once a particular portion of a wafer has been designed for a particular use, the tiles of that wafer portion are ultimately packaged as part of a photonic interposer whether they yield or not.

In some embodiments, the performance of the tiles may be monitor in real time, during operation. This may be accomplished using a power monitoring grid, an example of which is shown in FIG. 4-3. The power monitoring grid includes multiple photodetectors positioned at various locations of a photonic interposer (e.g., photodetectors 909 of FIG. 4-1A). The photodetectors may be coupled to various photonic components via tap couplers. Leveraging the power monitoring grid, it may be determined for example that a particular tile is not operating as expected. Using that information, the system may decide to reconfigure itself to functionally swap that tile with one of the redundant tiles. This operation may be performed during operation of the photonic interposer.

X. Fabrication of Grating-Based Packages

The photonic interposers described herein require light to operate, whether the light is provided by lasers or other types of sources. Unfortunately, monolithically integrating lasers with a photonic interposer is challenging, due to silicon's poor optical emission rate. Instead, it is often more practical to use an external laser (sitting on the same package or on the same board as the interposer), and to direct light emitted by the external laser into the chip. This can be performed via edge coupling or surface coupling. Edge coupling involves coupling optical modes from a fiber into a waveguide through one of the lateral surfaces of the chip. By contrast, surface coupling involves coupling optical modes from a fiber into a waveguide through the top surface of the chip. To steer light coming from outside the plane of the top surface to waveguides extending parallel the top surface of the chip, grating couplers are often used. Grating couplers are planar structures formed at or immediately below the top surface of a photonic chip.

The inventors have recognized and appreciated that the presence of particles or other types of debris on the top surface of a chip can negatively affect the fiber-grating coupling efficiency. This is because particles can produce scattering. Unfortunately, particle-free operation is difficult to achieve due the various fabrication steps that take place after the formation of a grating but before the fiber is attached to the top surface of the chip.

The inventors have developed fabrication processes that limit the accumulation of particles or other debris on the top surface of a photonic chip, thereby leading to improved fiber-grating efficiency. In some embodiments, this can be accomplished by forming a temporary protective layer positioned so that, during the process steps that are more likely to produce unwanted particles, the gratings are protected. Once those process steps have been completed, the temporary protective layer can be removed, exposing the gratings to air for subsequent fiber attachment. Temporary protective layers may be formed before or after electronic chips (e.g., ASICs) are bonded to the photonic interposer. Examples of protective layers include photo-imageable dielectrics (e.g., polyimide or resist) and glass (e.g., with a UV-releasable adhesive). Other materials are also possible. Further, in some embodiments, particle-free processing can be accomplished by using custom molding processes designed to encapsulate the electronic chips without ever coming into contact with the grating couplers.

Figures 2, 3, 4, 5:
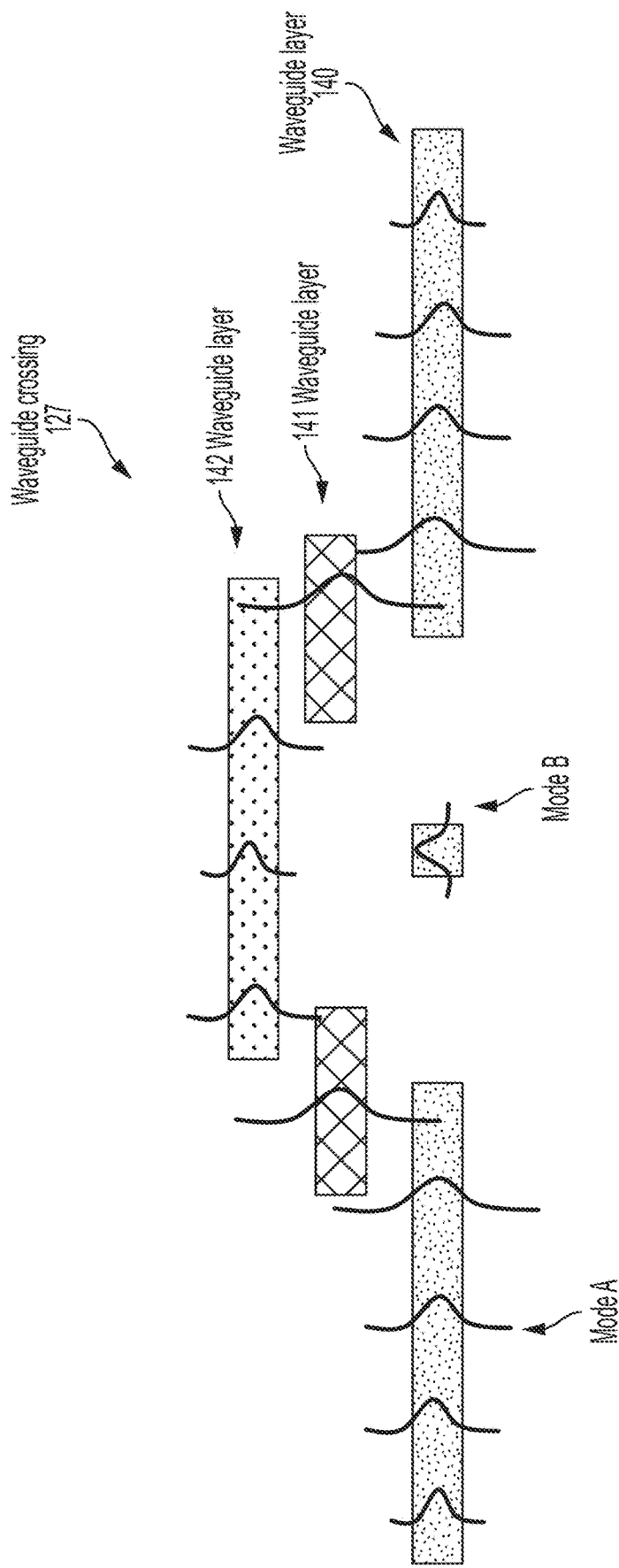

FIG. 5-1 is a schematic diagram showing a fiber coupled to a grating coupler formed on a photonic interposer, in accordance with some embodiments. A fiber 1120 is placed above a grating coupler 1110 formed on the top surface of a photonic interposer 1130. The fiber 1120 is at a non-zero angle with respect to the surface of the photonic interposer 1130. In this example, the fiber is also at a non-zero angle with respect to the axis perpendicular to the top surface of the interposer, though in some embodiments the fiber may be parallel to the perpendicular axis. Light emerging from the fiber core 1122 of the fiber 1120 is coupled to the grating coupler 1110. The grating, in turn, conveys the light to waveguide 1121.

FIG. 5-2A is a top view of a wafer 1130 patterned to form photonic circuits that, once diced from the wafer, can be used as photonic interposers. Electronic chips 1210 are mounted on the photonic interposer(s). The electronic chips are encapsulated by an encapsulation material 1220, which could be formed using mold compounds. Regions 1230 include grating couplers formed on the top surface of the wafer. To permit subsequent fiber attachment, these regions are not covered by the encapsulation material.

FIG. 5-2B is a cross sectional side view illustrating a portion of the wafer of FIG. 5-2A from the y-axis in a x-z plane. This figure shows the plurality of electronic chips mounted on the top surface of the photonic interposer. The electronic chips are encapsulated by encapsulation material 1220. Regions 1230 are exposed to air.

FIG. 5-3A shows the photonic interposer of FIG. 5-2B once it has been diced. Regions 1230 remain exposed to air, so that fibers can be attached on a subsequent step. Connections 1310, formed on the bottom surface of the photonic interposer, allow connection of the photonic interposer with a circuit board 1340. Examples of connections 1310 include ball grid arrays (BGA), copper pillars, C4 bumps, pins, etc.

FIG. 5-3B is a cross sectional side view of a package after a fiber 1120 has been attached to the top surface of interposer 1130. When the fiber is attached, the fiber core is optically coupled with a grating coupler. In this depiction, interposer 1130 is mounted on a printed circuit board (PCB) 1340 via connections 1310 passing through underfill 1330. Cap 1320, such as a heat spreader, is disposed on top of the electronic chips. Fiber 1120 is coupled to a grating coupler on one side of the package via a steering optical component 1350, which steers light propagating inside the fiber to a direction that is at a non-zero angle with respect to the top surface of the photonic interposer, thereby allowing the fiber mode to couple to the grating.

Figures 2, 3, 4, 5, 6, 6C:
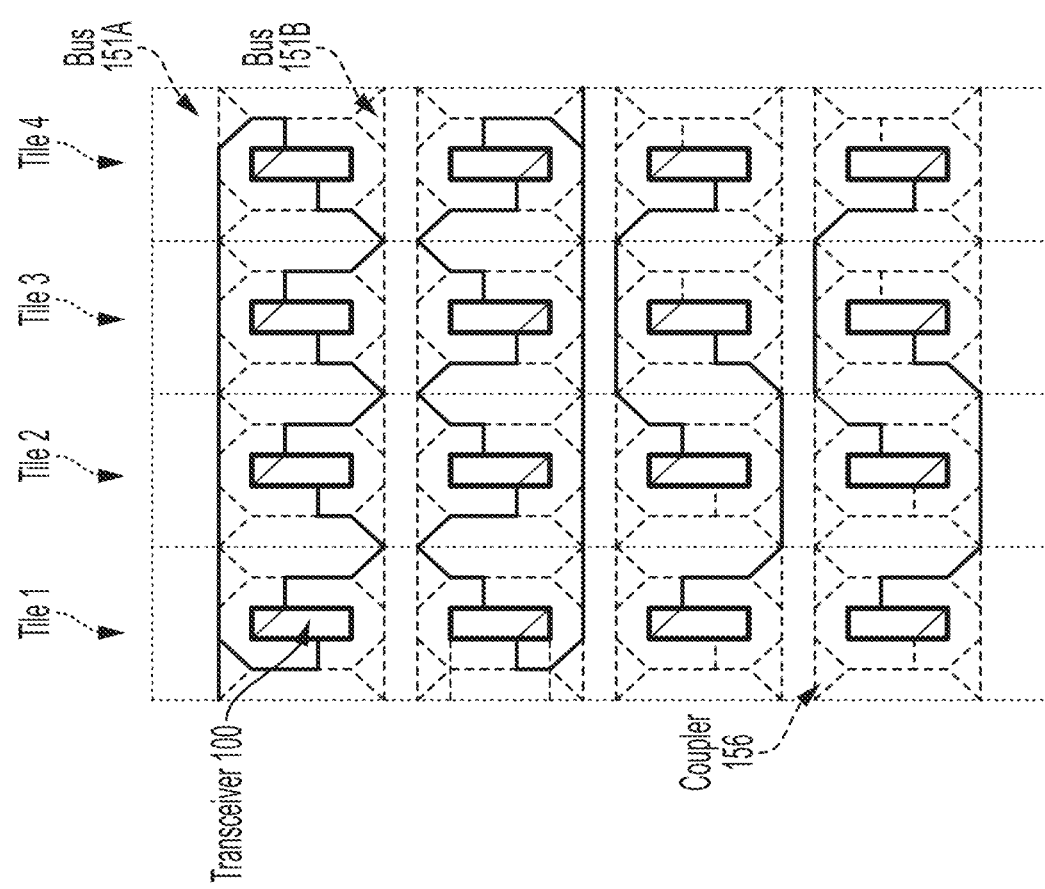
Figures 2, 3, 4, 5, 6, 6D:
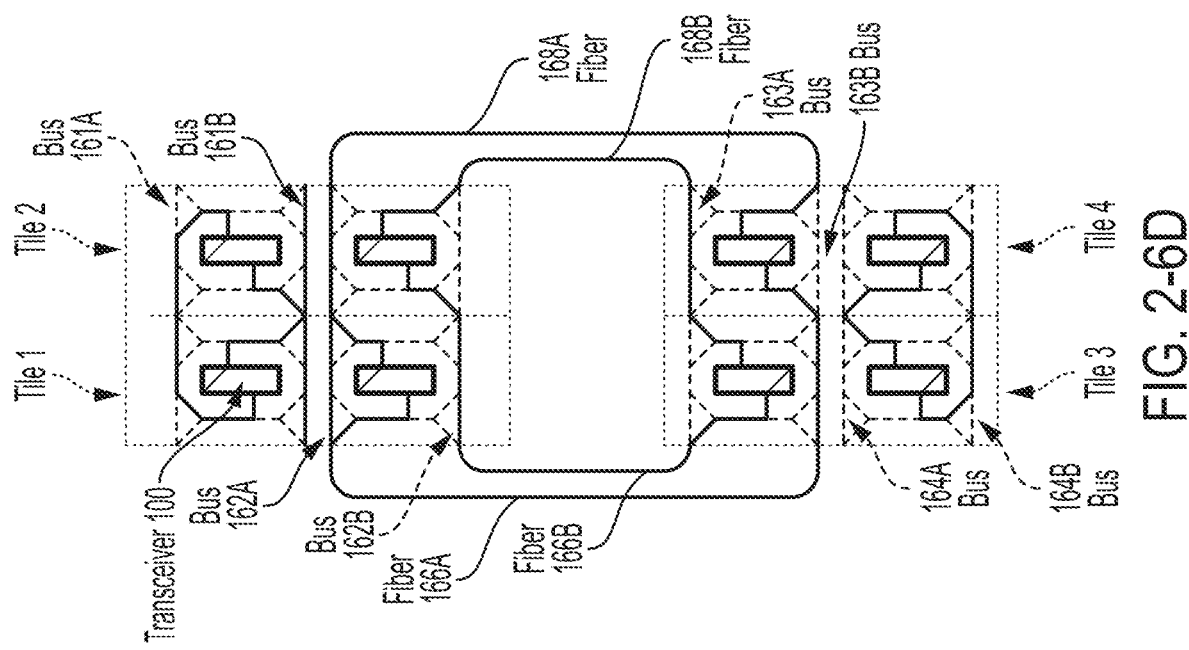

FIGS. 5-4, 5-5 and 5-6 are flowcharts illustrating various processes for fabricating a packaged photonic interposer. These fabrication processes are designed to prevent (or at least to limit) particle or debris accumulation in correspondence with fiber gratings, thereby enabling low-loss, high-efficiency fiber-grating coupling. As discussed in further detail below, the processes of FIGS. 5-4 and 5-5 involve temporary protective layers. The process of FIG. 5-6 involves a custom molding process.

Referring first to FIG. 5-4, this fabrication process begins at step 4A at a packaging facility, which involves obtaining a photonic interposer 1130 (e.g., the photonic interposer of FIG. 1-3B or any of the photonic interposers described herein) patterned with one or more grating couplers, and covering regions 1230 (where gratings are patterned) with a protective material 1438. As a result, the grating couplers are covered. The photonic interposer may be received at a packaging facility from a semiconductor foundry, where the wafer is patterned with photonic and electronic circuits, including the grating coupler. Examples of materials that may be used for protective material 1438 include photo-imageable film (PIF) (e.g., polyimide or photoresist). At step 4B, electronic chips 1210 (e.g., ASICs, processors, memories, etc.) are placed on the photonic interposer. At step 4C, the electronic chips 1210 are encapsulated with an encapsulation material 1220 through a process such as mass reflow and wafer level mold underfill (WL MUF). It should be noted that the protective film applied in step 4A does not allow for the coverage of mold compound on the grating couplers at step 4C and further preserves the cleanliness of the grating couplers from all the contaminants and particulates released during the subsequent backgrind and CMP process step 4D. The encapsulation provides protection for the chips and enables subsequent formation of TSV-reveal process steps. At step 4D, the encapsulation material is removed from the top of the electronic chips via planarization (e.g., CMP) or back-grinding to enable attachment of a carrier mount 1638, which takes place at step 4E (after a flipping step). At step 4F, connections 1310 (e.g., BGA) are attached to the bottom surface of the photonic interposer after the TSV reveal process. It should be noted that attachment of connections 1310 to the interposer may produce particles or other debris. However, this attachment step occurs at a time when the grating couplers are covered by protective material 1438. As a result, the particles or debris produced during the attachment step do not affect the cleanliness of the top surface where the grating couplers are patterned. At step 4G, the carrier mount 1638 is removed from the top of the electronic chips. At step 4H, a UV releasable adhesive tape 1330 (e.g., dicing tape) is applied. At step 4I, the protective material 1438 is removed from the top surface of the photonic interposer, leaving the grating couplers exposed to air. Optionally, a cleaning step can be performed using plasma process to ensure surface cleanliness for fiber attach and light coupling. At step 4J, the photonic interposer is separated, for example by stealth dicing or mechanical saw, into a plurality of systems each comprising one or more electronic chips and one or more grating couplers. At step 4K, a photonic interposer is attached to the circuit board 1340 by processes such as mass reflow, capillary underfill (CUF), and Urea-formaldehyde (UF) resin curing. Further, a cap 1320 is attached to the electronic chips, where the cap can serve as a heat spreader. Further, an Open/Short (O/S) test is performed to ensure good electrical connection between the photonic interposer and the circuit board. Lastly, a fiber 1120 is attached to the top surface of the interposer. As a result, the fiber is optically coupled to the grating couplers.

FIG. 5-5 is a flowchart illustrating an alternative method for fabricating a photonic package, in accordance with some embodiments. The method of FIG. 5-5 is similar in some respects to the method of FIG. 5-4. The main distinction is that a protective material 1538 is formed after attachment of the chips to the photonic interposer and after the encapsulation step. Step 5A involves obtaining a photonic interposer 1130 patterned with one or more grating couplers, and placing chips 1210 on the interposer. At step 5B, the electronic chips 1210 are encapsulated with an encapsulation material 1220 through processes such as mass reflow and wafer level mold underfill (WL MUF). As noted above, the encapsulation provides protection for the chips and enables subsequent formation of TSV-reveal process steps. At step 5C, a protective material 1538 (e.g., glass lid with UV-releasable adhesive) is placed on the regions of the interposer on which the grating couplers are formed. The attachment of the protective glass preserves the cleanliness of the grating couplers from all the contaminants and particulates released during the subsequent backgrind and CMP process step 5D. At step 5D, the top surface is planarized or back-grinded. At step 5E, the interposer is flipped and connections 1310 (e.g., BGA) are attached to the bottom surface of the photonic interposer after the TSV reveal process. As noted above, attachment of connections 1310 to the interposer may produce particles or other debris. However, this attachment step occurs at a time when the grating couplers are covered by protective material 1538, thereby preserving the cleanliness of the top surface where the grating couplers are patterned. At step 5F, protective material 1538 is removed, thus exposing the grating couplers to air. Optionally, plasma cleaning is performed on the top surface of the photonic interposer. The subsequent steps are similar to those illustrated in FIG. 5-4, including fiber attachment.

FIG. 5-6 is a flowchart illustrating another alternative method for fabricating a photonic package, in accordance with some embodiments. The method of FIG. 5-6 differs from the methods of FIGS. 5-4 and 5-5 in that protective materials are not used to cover the grating couplers. Instead, a custom design molding process is performed to encapsulate electronic chip while avoiding covering and contaminating the grating couplers with debris caused by the encapsulation step. The subsequent steps are similar to those described in connection with FIG. 5-4.

At step 6A, chips 1210 are mounted on interposer 1130. At step 6B, encapsulation material 1120 is formed using a custom molding process in a way that avoids covering regions 1230. As a result, contamination produced by the molding step that would otherwise affect the cleanliness of the grating couplers is prevented (or at least limited). Therefore, the process avoids leaving impurities on top of the grating couplers. At step 6C, the top surface of the package is planarized or back-grinded. At step 6D, the package is mounted on carrier mount 1638. At step 6E, the device is flipped and connections 1310 are attached to the bottom surface of the interposer after the TSV reveal process. At step 6F, carrier mount 1638 is removed. At step 6G, the interposer is diced. At step 6H, a fiber is attached to the top surface of the interposer so as to couple to a grating coupler.

XI. Power Distribution

Figures 2, 3, 4, 5, 6, 7, 7A:
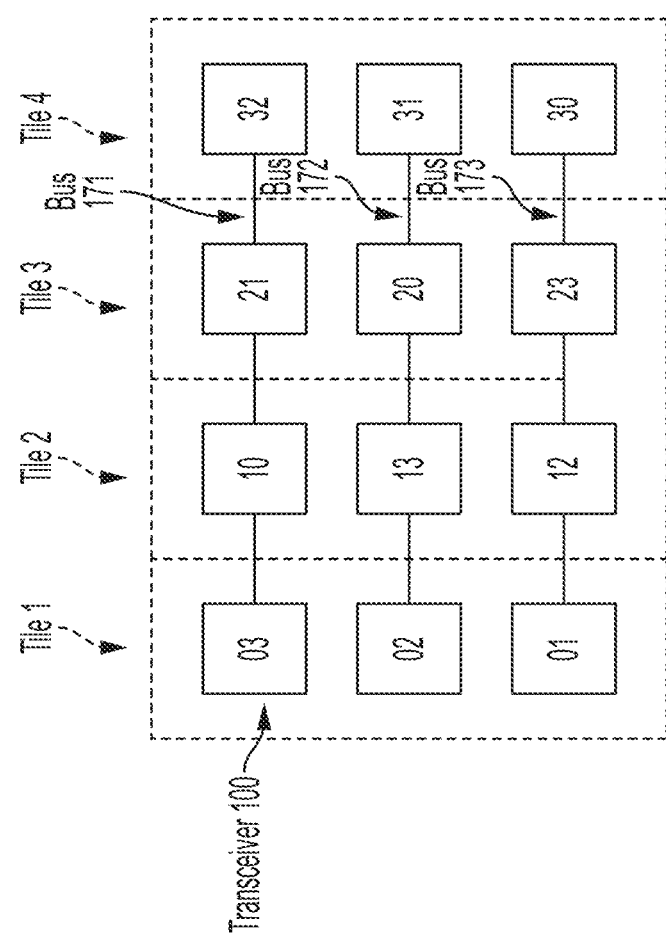
Figures 2, 3, 4, 5, 6, 7, 7B:
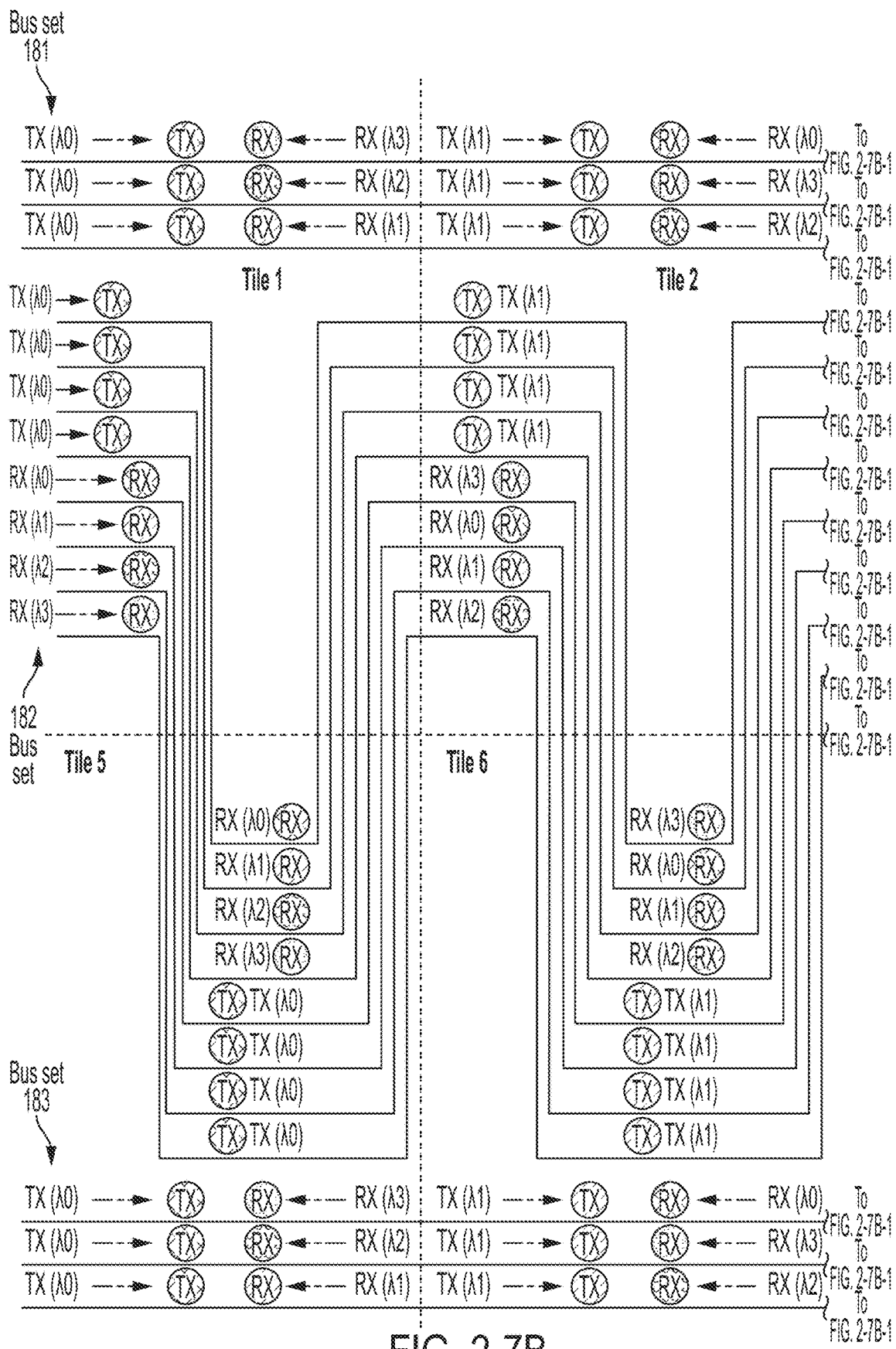
Figures 1, 2, 3, 4, 5, 6, 7, 7B:
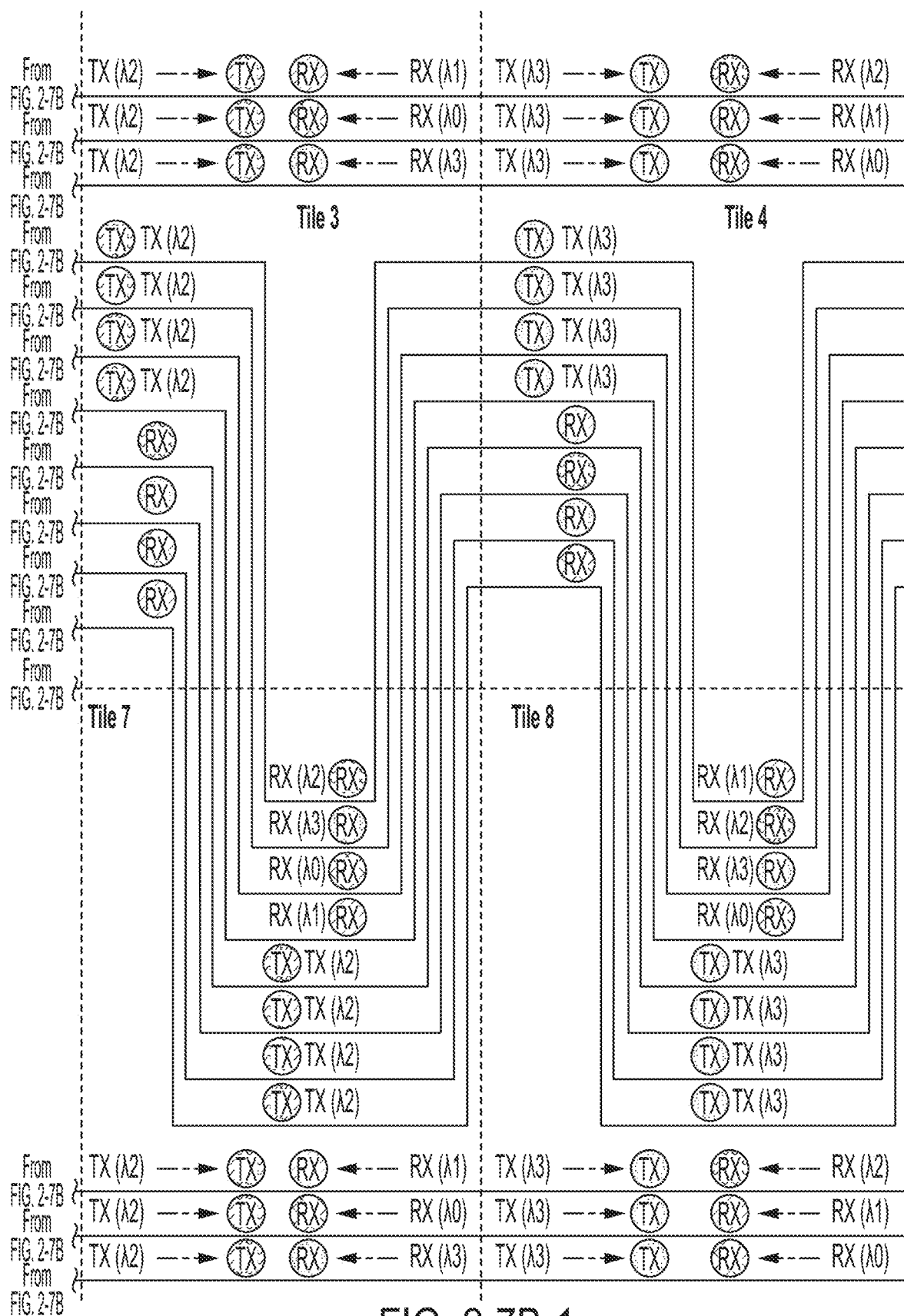
Figures 2, 3, 4, 5, 6, 7, 8, 8A:
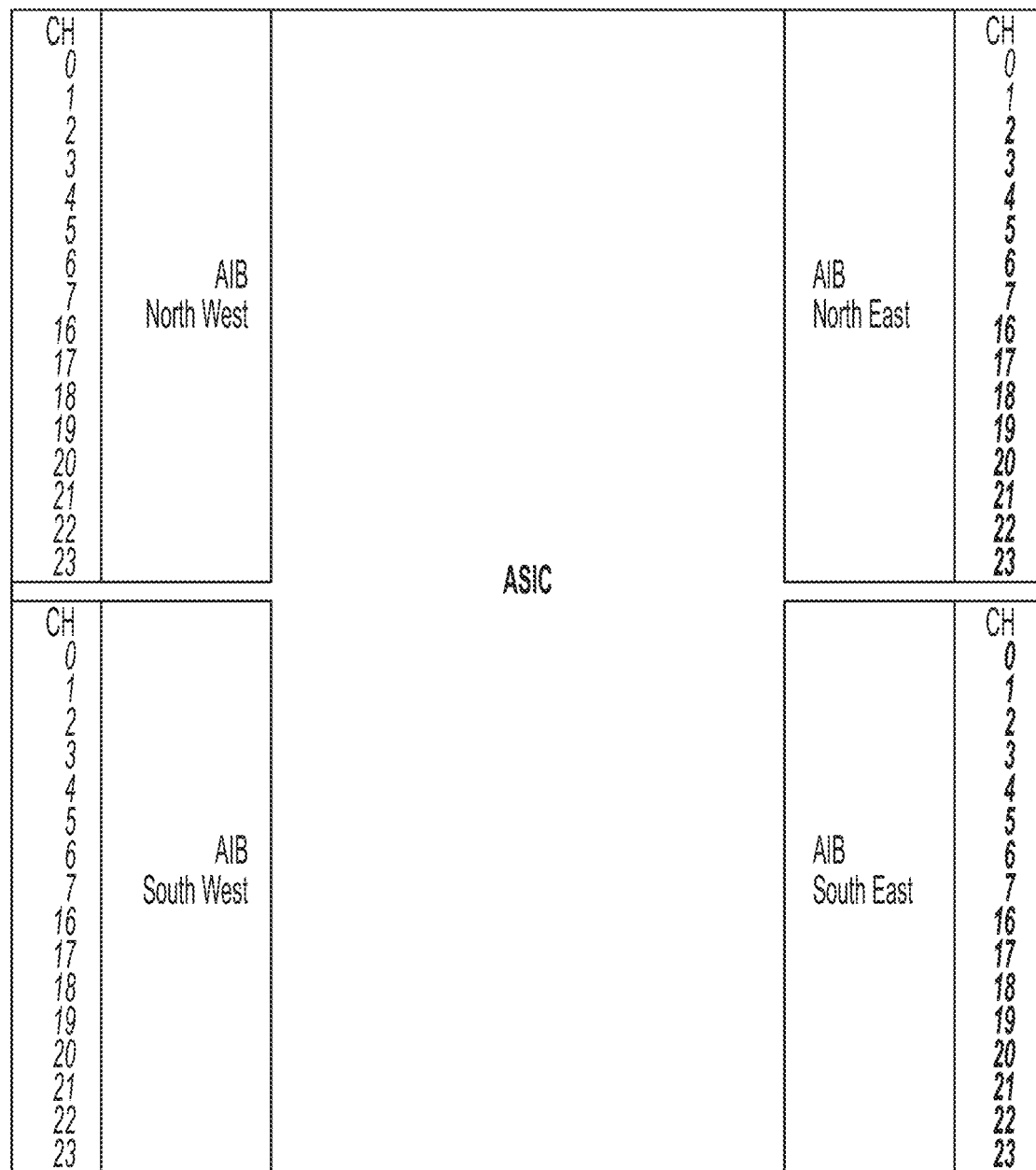
Figures 2, 3, 4, 5, 6, 7, 8, 8B:
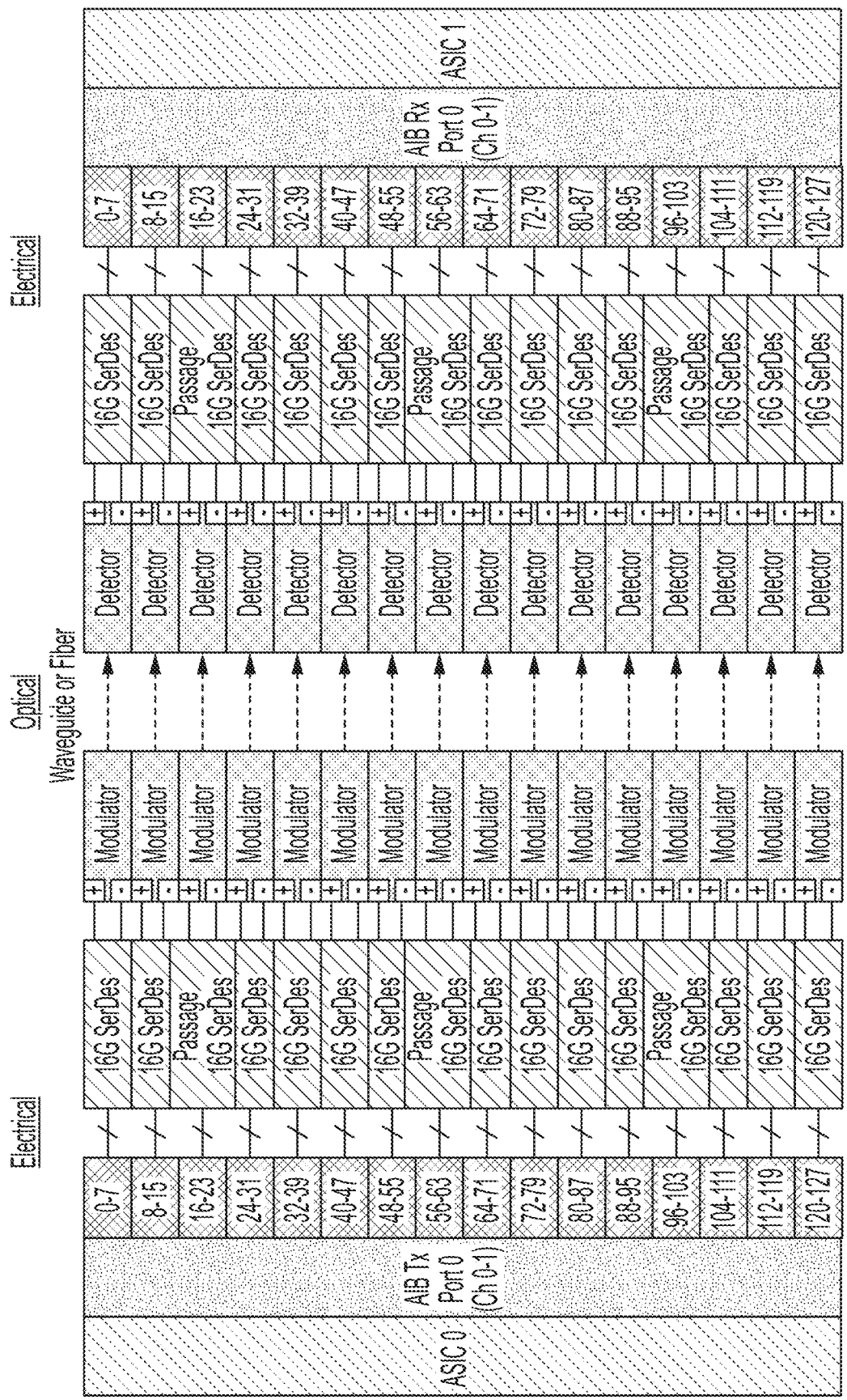
Figures 2, 3, 4, 5, 6, 7, 8, 8C:
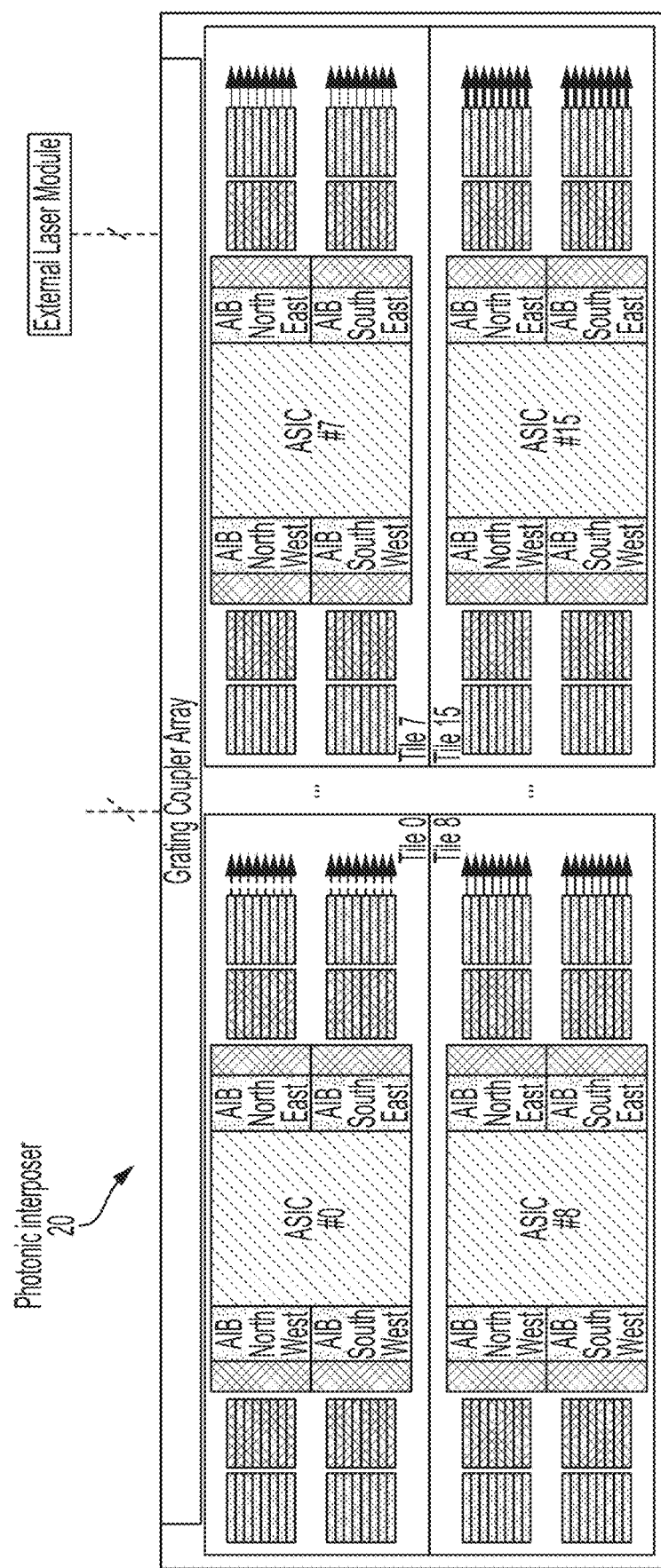
Figures 2, 3, 4, 5, 6, 7, 8, 9, 9A:
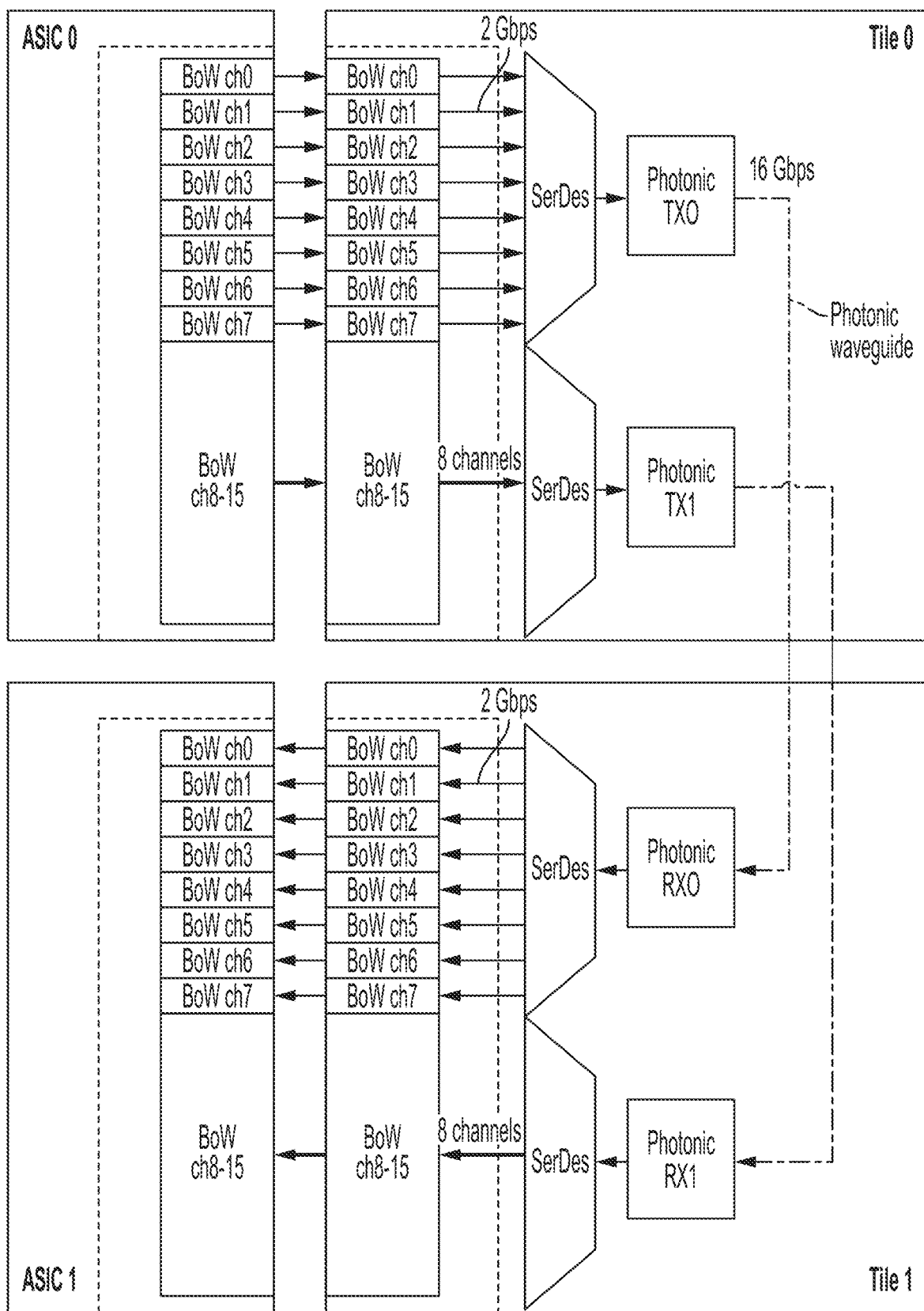
Figures 2, 3, 4, 5, 6, 7, 8, 9, 9B:
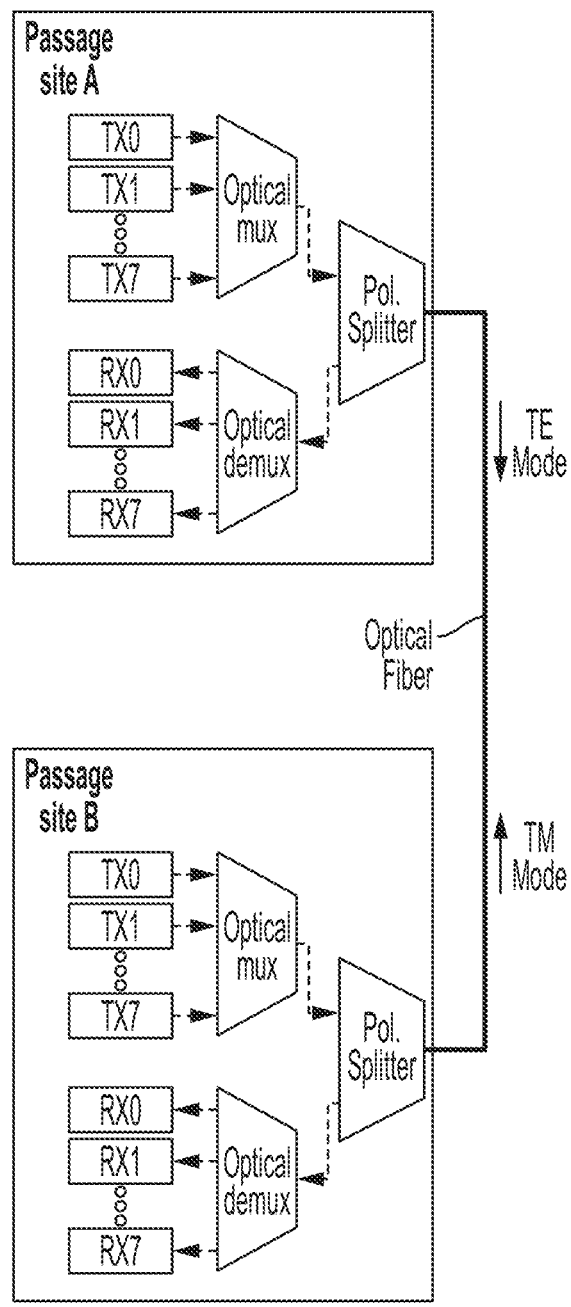
Figures 2, 3, 4, 5, 6, 7, 8, 9, 10, 10A:
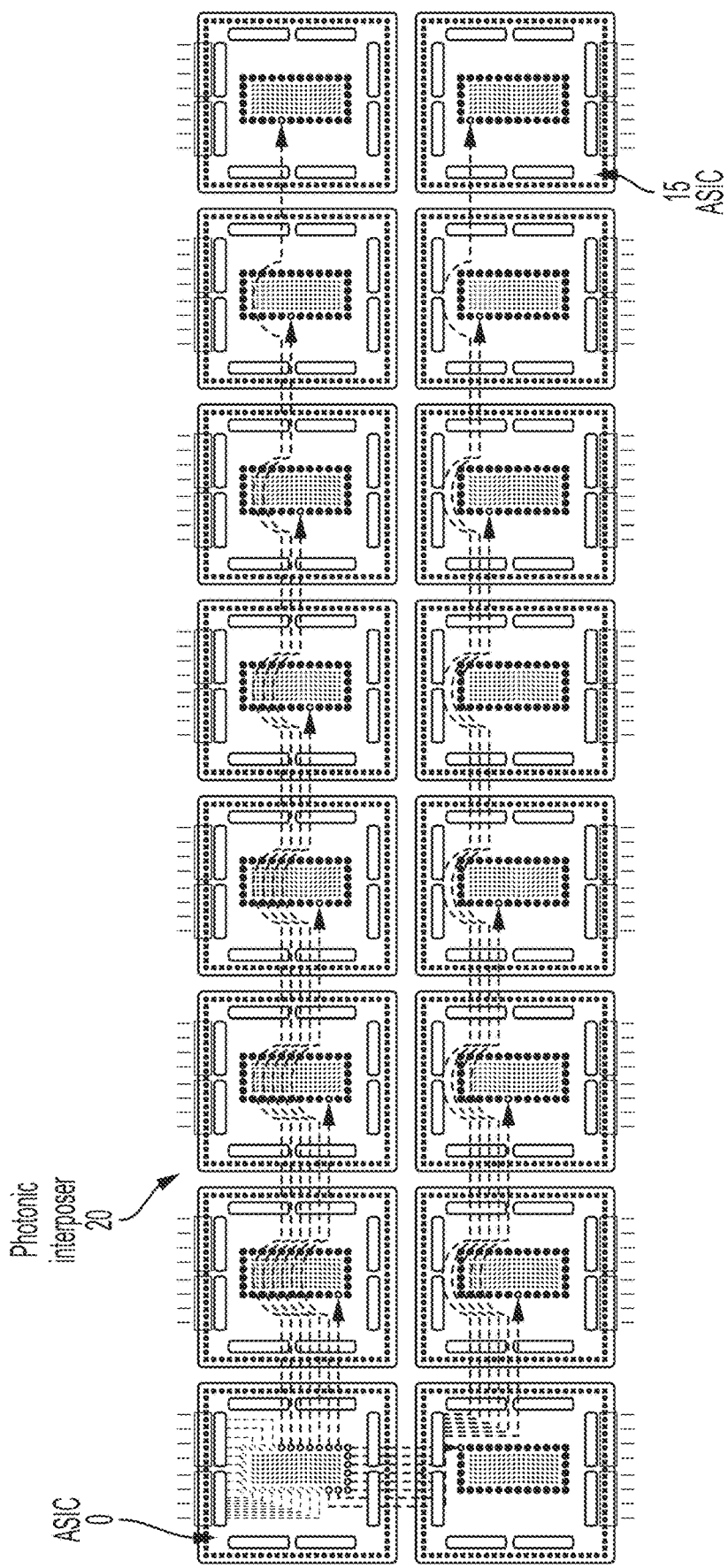
Figures 2, 3, 4, 5, 6, 7, 8, 9, 10, 10B:
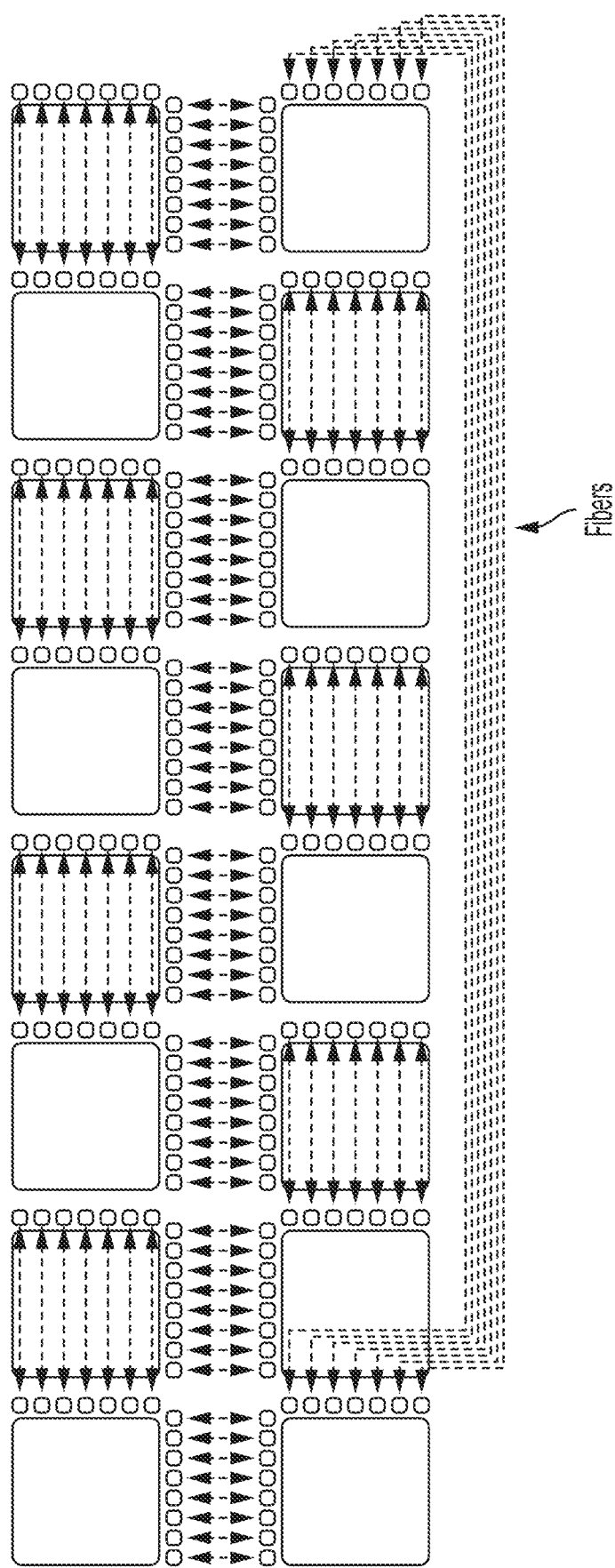
Figures 2, 3, 4, 5, 6, 7, 8, 9, 10, 10C:
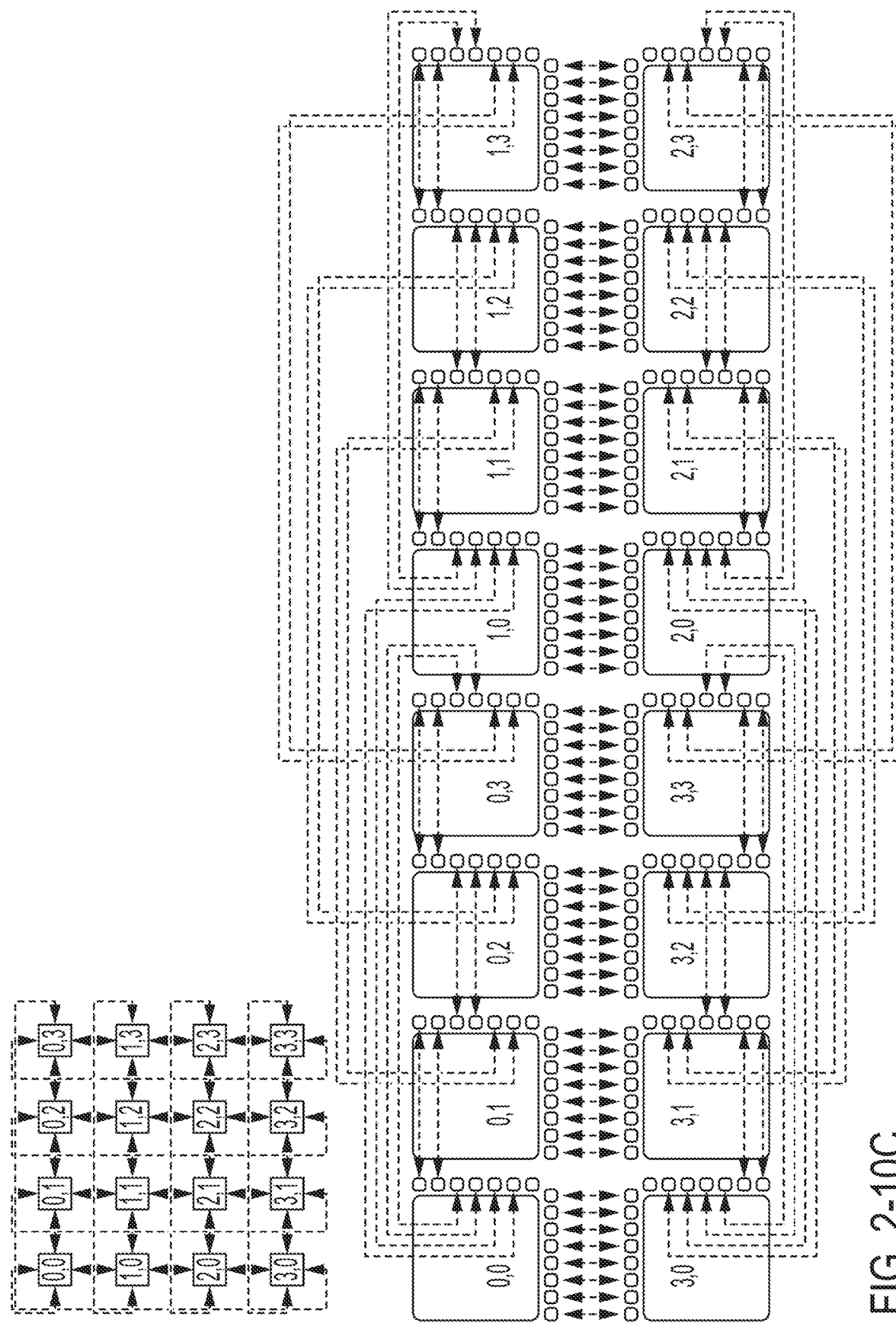
Figures 2, 3, 4, 5, 6, 7, 8, 9, 10, 10D:
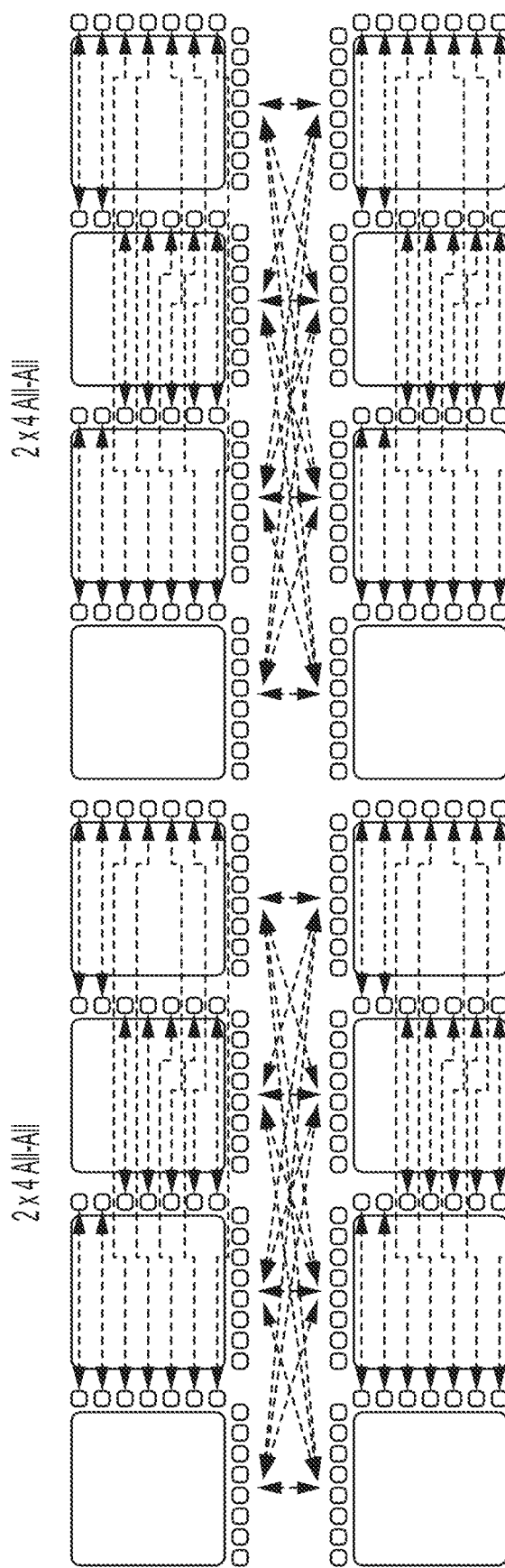

FIG. 5-7 is a cross sectional side view of a photonic package mounted on a circuit board including a power delivery system, in accordance with some embodiments. The package of FIG. 5-7 includes a circuit board 1740, a socket 1730, a substrate 1720, a photonic interposer 1714, electronic chips 1712, a lid 1732, a cold plate 1734, Voltage Regulator Modules (VRM) 1750, connections 1752 and power buses 1754. Photonic interposer 1714 and electronic chips 1712 that are mounted on the photonic interposer have characteristics similar to the interposers and chips described in detail above. Lid 1732 covers the electronic chips and is placed in thermal contact with the electronic chips. Lid 1732 and cold plate 1734, positioned on top of the lid, transfer heat generated by the electronic chips outside the package. As can be seen in FIG. 5-7, photonic interposer 1714 is disposed on substrate 1720 (e.g., an organic substrate), and substrate 1720 is disposed on socket 1730. Socket 1730 is further disposed on the top surface of circuit board 1740.

The package of FIG. 5-7 relies on power buses 1754, VRMs 1750 and connections 1752 to convey power to the photonic interposer and the electronic chips. A VRM receives electric power from the power buses and provides regulated power outputs to electronic components in order to avoid voltage fluctuations beyond the tolerable value caused by the loads resulting from the electronic chip, as illustrated in FIG. 5-8A. The inventors have appreciated that relative to implementations where VRMs and power buses are placed on a circuit board near an interposer, having VRMs 1750 and power buses 1754 mounted on the bottom surface of circuit board 1740 (on the opposite side of the circuit board relative to the interposer) enables a reduction in the lateral extension of circuit board 1740 thereby decreasing the power losses that would otherwise result from the longer lateral paths for power delivery. As a result, the design is more compact and easier to integrate with other electronic systems. In the present configuration, connections 1752 interconnect VRMs and corresponding electronic chips together by traversing multiple layers: interposer 1714, substrate 1720, socket 1730 and circuit board 1740. Connections 1752 involve a series of different types of vias, the nature of which depends upon the substrate being traversed.

FIG. 5-8B is cross sectional side view illustrating how electric power may be delivered from VRMs to the electronic chips. In some embodiments, a VRM conveys power to one electronic chip. In other embodiments, a VRM conveys power to multiple electronic chips. In FIG. 5-8B, one VRM is shown as conveying power to four electronic chips via connections 1752.

XII. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic interposer comprising:
   a bus waveguide;
   a plurality of photonic transmitters coupled to the bus waveguide;
   a plurality of photonic receivers coupled to the bus waveguide; and
   a controller configured to:
      dither a photonic component of a first photonic transmitter of the plurality of photonic transmitters at a first frequency;
      dither a photonic component of a first photonic receiver of the plurality of photonic receivers at the first frequency; and
      lock the first photonic transmitter to the first photonic receiver.

2. The photonic interposer of claim 1, wherein each of the plurality of photonic transmitters comprises a resonant modulator and each of the plurality of photonic receivers comprises a resonant drop filter coupled to the bus waveguide, wherein:
   dithering the photonic component of the first photonic transmitter comprises dithering the resonant modulator of the first photonic transmitter, and
   dithering the photonic component of the first photonic receiver comprises dithering the resonant drop filter of the first photonic receiver.

3. The photonic interposer of claim 1, wherein each of the plurality of photonic transmitters comprises a resonant add filter coupled to the bus waveguide and each of the plurality of photonic receivers comprises a resonant drop filter coupled to the bus waveguide, wherein:
   dithering the photonic component of the first photonic transmitter comprises dithering the resonant add filter of the first photonic transmitter, and
   dithering the photonic component of the first photonic receiver comprises dithering the resonant drop filter of the first photonic receiver.

4. The photonic interposer of claim 1, wherein the first frequency is between 1 KHz and 1000 KHz.

5. The photonic interposer of claim 1, further comprising a plurality of photonics tiles that are instantiations of a template photonic tile, each of the plurality of photonics tiles comprising a photonic transmitter of the plurality of photonic transmitters and a photonic receiver of the plurality of photonic receivers, wherein the bus waveguide traverses more than one photonic tile.

6. The photonic interposer of claim 1, wherein the first photonic transmitter comprises a resonant modulator configured to modulate light received from a laser using input data, wherein the photonic interposer further comprises:
   a Mach-Zehnder interferometer (MZI) coupled to the resonant modulator, the MZI having a first output and a second output; and
   a resonant add filter coupled to the bus waveguide,
   wherein the controller is configured to transmit the modulated light along the bus waveguide either in a first direction or in a second direction by selectively coupling either the first output or the second output of the MZI to the resonant add filter.

7. The photonic interposer of claim 6, further comprising a heater thermally coupled to the resonant modulator and a first monitoring detector coupled to the first output of the MZI, wherein the controller is further configured to lock the resonant modulator to the laser by:
   applying a first ramped signal to the heater; and
   maximizing an output produced by the first monitoring detector.

8. The photonic interposer of claim 7, wherein selectively couple either the first output or the second output of the MZI to the resonant add filter comprises:
   applying a second ramped signal to the MZI; and
   minimizing the output produced by the first monitoring detector.

9. The photonic interposer of claim 8, wherein selectively couple either the first output or the second output of the MZI to the resonant add filter further comprises:
- applying a third ramped signal to the resonant add filter; and
- minimizing the output produced by a second monitoring detector coupled to the second output of the MZI.

10. The photonic interposer of claim 6, wherein the resonant add filter comprises a second order filter.

11. The photonic interposer of claim 1, further comprising:
- an encoder, coupled to the first photonic transmitter, configured to perform an Xb/Yb encoding scheme;
- a decoder, coupled to the first photonic receiver, configured to perform an Xb/Yb decoding scheme; and
- clock recovery circuitry configured to time the first photonic receiver using an output of the decoder.

12. The photonic interposer of claim 11, further comprising a first local oscillator coupled to the encoder and a second local oscillator coupled to the decoder.

13. The photonic interposer of claim 11, further comprising an equalizer coupled to the first photonic receiver, wherein the equalizer is configured to perform a linear combination of the output of the first photonic receiver.

14. The photonic interposer of claim 13, wherein the equalizer is further configured to determine a characteristic of an optical channel during runtime, and is configured to adjust the number of taps associated with the equalizer based on the characteristic of the optical channel determined by the equalizer.

15. The photonic interposer of claim 13, wherein the equalizer is further configured to determine a characteristic of an optical channel during runtime, and is configured to adjust coefficients associated with the equalizer based on the characteristic of the optical channel determined by the equalizer.

16. The photonic interposer of claim 11, further comprising a plurality of photonics tiles that are instantiations of a template photonic tile, wherein:
- the first photonic transmitter is part of a first photonic tile of the plurality of photonics tiles, and
- the first photonic receiver is part of a second photonic tile of the plurality of photonics tiles.

* * * * *